US012792581B1

(12) United States Patent
Audet et al.

(10) Patent No.: US 12,792,581 B1
(45) Date of Patent: Nov. 10, 2026

(54) METHOD OF COLLECTING CONTEXTUAL BEHAVIORAL DATA WITHIN DIGITAL NARRATIVE INTELLIGENCE ENVIRONMENTS

(71) Applicant: VWY1 LLC, Sheridan, WY (US)

(72) Inventors: Mathieu Audet, Orford (CA); Francois Perreault, Frontenac (CA); Remi Cartier, Mercier (CA)

(73) Assignee: VWY1 LLC

( * ) Notice: Subject to any disclaimer, the term of this patent is extended or adjusted under 35 U.S.C. 154(b) by 0 days.

(21) Appl. No.: 19/311,222

(22) Filed: Aug. 27, 2025

Related U.S. Application Data

(60) Provisional application No. 63/813,088, filed on May 28, 2025.

(51) Int. Cl.
*G06F 16/22* (2019.01)
*G06F 16/26* (2019.01)

(52) U.S. Cl.
CPC .......... *G06F 16/2228* (2019.01); *G06F 16/26* (2019.01)

(58) Field of Classification Search
CPC .. G06F 16/2228; G06F 16/2282; G06F 16/26; G06F 40/30; G06F 40/40; G06F 16/36; G06F 16/9024; G06F 16/45; G06F 16/3329; G06F 16/31; G06F 3/0482; G06F 3/0481
See application file for complete search history.

(56) References Cited

U.S. PATENT DOCUMENTS

| | | | |
|---|---|---|---|
| 7,668,691 B2 | 2/2010 | Counts et al. | |
| 7,792,769 B2 | 9/2010 | Kant | |
| 7,899,806 B2 | 3/2011 | Aravamudan | |
| 9,369,536 B1 * | 6/2016 | Holtzclaw | G06Q 10/40 |
| 9,405,792 B2 | 8/2016 | Gross | |
| 9,787,785 B2 * | 10/2017 | Liu | G06Q 30/0251 |
| 10,235,602 B1 | 3/2019 | Vasisht | |
| 10,733,496 B2 | 8/2020 | Wu | |
| 10,969,935 B2 | 4/2021 | Butcher | |
| 10,990,421 B2 | 4/2021 | Kulkarni | |
| 11,087,889 B1 | 8/2021 | Frist, Jr. | |
| 11,115,597 B2 | 9/2021 | Kang et al. | |

(Continued)

FOREIGN PATENT DOCUMENTS

WO 2018125737 7/2018

*Primary Examiner* — Ajay M Bhatia
*Assistant Examiner* — Berhanu Mitiku

(57) ABSTRACT

A computer-implemented narrative intelligence system and method for managing digital artifacts and harvesting contextualized collaborator behaviors to support AI-assisted information management and model training. Content and collaborator interactions are organized into a narrative structure of sequenceable stories rendered on axis-based graphical timelines, where artifacts, events, and collaborator states are indexed, linked, and tokenized. Behavioral signals extracted from the narrative context are used to (i) enrich prompt construction and retrieval-augmented generation, (ii) curate and contextualize training datasets, and (iii) propose context-aware AI agents and interventions. The storytelling interface aligns visual, temporal, and relational cues with machine-learning workflows to produce narratively grounded behavioral data for fine-tuning models and enabling context-sensitive information navigation.

20 Claims, 28 Drawing Sheets

```
BehavioralEvent = {
 "user": U,
 "timestamp": T,
 "action": A,
 "context": C,
 "duration": D,
 "sequence": S,
 "element": E,
 "parameters": P,
 "group": G,
 "composite": X
}
```

```
def collect_behavioral_event(user, action, element, context, parameters, group=None):
        event = {
 "user": user.id,
 "timestamp": current_time(), # Function to get the current timestamp
 "action": action,
 "context": context,
 "duration": parameters.get("duration", None),
 "sequence": get_next_sequence(user),
 "element": element.id,
 "parameters": parameters,
 "group": group,
 "composite": detect_composite_behavior(user, action, element, context)
}
store_event(event) # Persist the event in the database or telemetry service  return event
```

(56) References Cited

U.S. PATENT DOCUMENTS

| | | | | |
|---|---|---|---|---|
| 11,195,516 | B2 | 12/2021 | Liang | |
| 11,250,321 | B2 | 2/2022 | Ebstyne | |
| 11,354,581 | B2 | 6/2022 | Kulkarni | |
| 11,392,751 | B1 | 7/2022 | Szarvas | |
| 11,392,856 | B2 | 7/2022 | Neumann | |
| 11,451,594 | B2 | 9/2022 | Conlin | |
| 11,494,721 | B1 | 11/2022 | Lah | |
| 11,544,502 | B2 | 1/2023 | Deshpande et al. | |
| 11,556,802 | B2 | 1/2023 | Mital et al. | |
| 11,581,094 | B2 | 2/2023 | Neumann | |
| 11,593,413 | B2 | 2/2023 | Vangala | |
| 11,657,209 | B2 | 5/2023 | Li | |
| 11,687,794 | B2 | 6/2023 | Vangala | |
| 11,790,278 | B2 | 10/2023 | Karanth | |
| 11,829,712 | B2 | 11/2023 | Seth et al. | |
| 11,842,172 | B2 | 12/2023 | Hammond | |
| 11,842,204 | B2 | 12/2023 | Ben-Elazar | |
| 11,886,957 | B2 | 1/2024 | Dexter | |
| 11,908,576 | B2 | 2/2024 | Räisänen | |
| 11,962,546 | B1 | 4/2024 | Hattangady et al. | |
| 12,020,179 | B2 | 6/2024 | Kirchhoff et al. | |
| 12,047,704 | B2 | 7/2024 | Daha | |
| 12,079,714 | B2 | 9/2024 | Neumann | |
| 12,088,380 | B2 | 9/2024 | Niu et al. | |
| 12,230,244 | B1 | 2/2025 | Searcy | |
| 2020/0074532 | A1 | 3/2020 | Rotbard et al. | |
| 2025/0139468 | A1* | 5/2025 | Taylor | H04N 21/85 |

* cited by examiner

Fig. 20
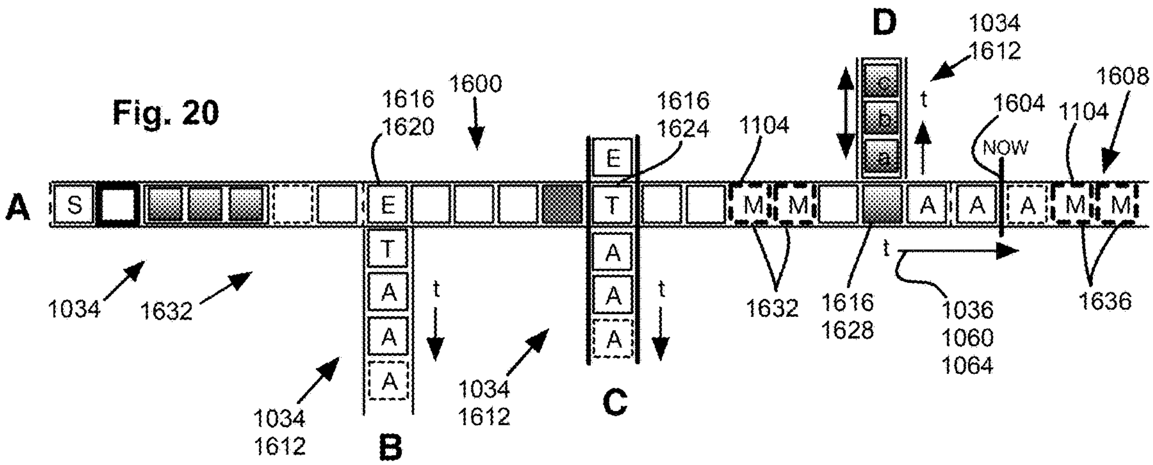
Fig. 21
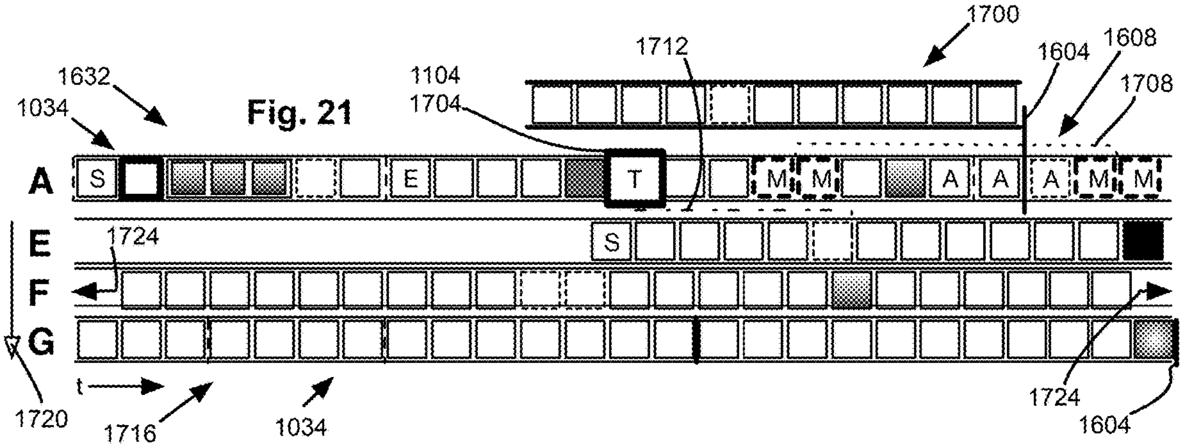
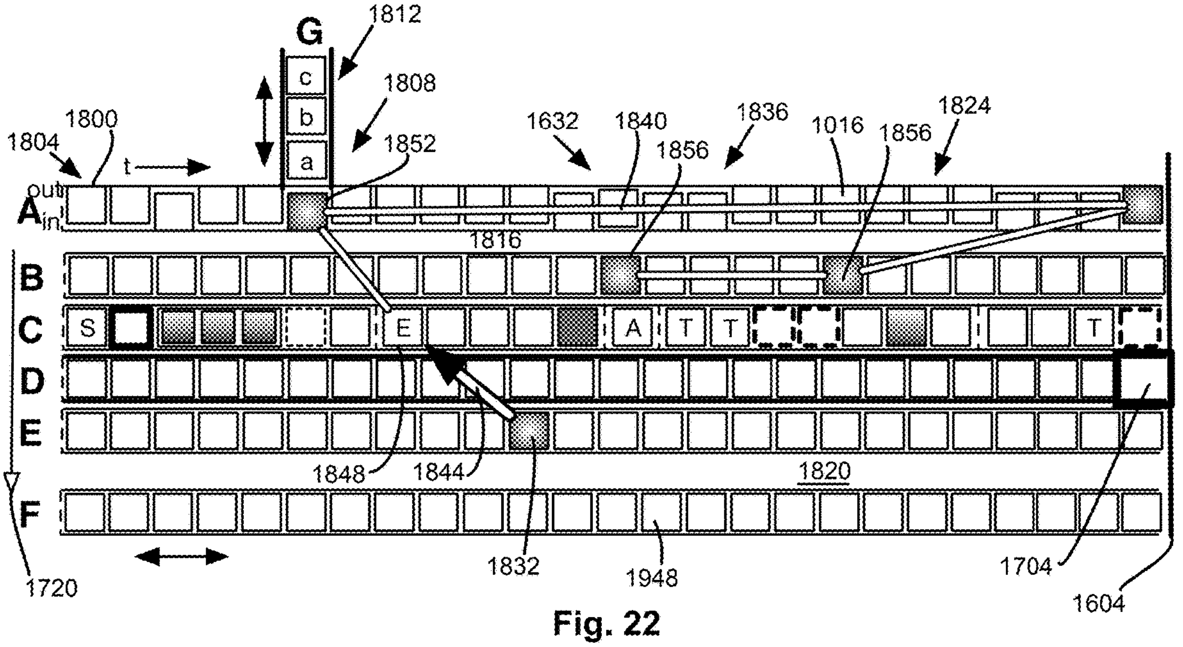
Fig. 22

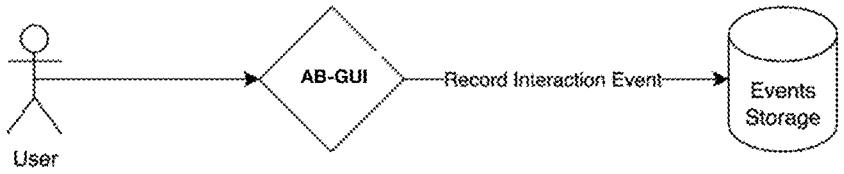

Fig. 29

```
BehavioralEvent = {
  "user": U,
  "timestamp": T,
  "action": A,
  "context": C,
  "duration": D,
  "sequence": S,
  "element": E,
  "parameters": P,
  "group": G,
  "composite": X
}


def collect_behavioral_event(user, action, element, context, parameters, group=None):
        event = {
  "user": user.id,
  "timestamp": current_time(), # Function to get the current timestamp
  "action": action,
  "context": context,
  "duration": parameters.get("duration", None),
  "sequence": get_next_sequence(user),
  "element": element.id,
  "parameters": parameters,
  "group": group,
  "composite": detect_composite_behavior(user, action, element, context)
}
store_event(event)  # Persist the event in the database or telemetry service  return event
```

Fig. 30

| | A | B | C | D |
|---|---|---|---|---|
| 1 | **Category** | **Type** | **Examples** | **How It's Collected** |
| 2 | Collaboration data | Feedback and Control | Real-time shared editing | Logs of collaborative edits, comment timestamps, shared file activity |
| 3 | Input behavior | Input Method | Command Line Input | Command usage logs with timestamp and frequency analysis |
| 4 | Input behavior | Input Method | Gesture-Based Interaction | Gesture detection via motion sensors or computer vision |
| 5 | Search/navigation | Interface Navigation | Menu Selection | Clickstream analysis of menu selections and order of use |
| 6 | Search/navigation | Interface Navigation | Scrolling | Event listeners for mouse wheel, touchpad gestures, touchscreen swipes, or scrollbar interactions |
| 7 | Search/navigation | Interface Navigation | Form Filling | Input field focus logs and dwell time measurement |
| 8 | Search/navigation | Interface Navigation | Magnifier | Event listeners for activation/movement, clickstream analysis, DOM heatmaps, motion sensors |
| 9 | Search/navigation | Interface Navigation | Breadcrumb Navigation | Breadcrumb click tracking, hover delay, and navigation path depth |
| 10 | Search/navigation | Interface Navigation | Exploratory Behavior | Breadcrumb trail tracking, repeated navigation paths |
| 11 | System telemetry | Feedback and Control | Error Recovery Behavior | Undo action logs, error messages, retry click tracking |
| 12 | Usage patterns | Graphical Action | Moving Objects | Drag-and-drop logs for structural reordering patterns |
| 13 | Usage patterns | Graphical Action | Customized Workspace/Axes | Event listeners for drag-and-drop/menu selections, clickstream analysis, DOM heatmaps |
| 14 | Usage patterns | Graphical Action | Direct Manipulation | Mouse or touch tracking for object interaction and repositioning |
| 15 | Usage patterns | Graphical Action | Zooming Interfaces | Zoom level logs with area focus and frequency |
| 16 | Usage patterns | Feedback and Control | Undo/Redo Actions | Undo/redo history logging per document section |
| 17 | Usage patterns | Feedback and Control | Progress Indicators | Session timing logs by section and total interaction span |
| 18 | Usage patterns | Feedback and Control | Error Messages | Form validation logs with repeat attempts and corrections |
| 19 | Usage patterns | Cognitive/Psychological | Safe Exploration | Hover analytics and tool-tip activation records |
| 20 | Usage patterns | Cognitive/Psychological | Instant Gratification | Click latency tracking and skipped section detection |
| 21 | Usage patterns | Cognitive/Psychological | Satisficing | Agreement and confirmation time analysis |
| 22 | Usage patterns | Cognitive/Psychological | Habit Formation | Repeated action pattern detection across sessions |
| 23 | Usage patterns | Conversational | Chatbots and Virtual Assistants | Help/chat usage logs with context mapping |
| 24 | Usage patterns | Conversational | Natural Language Processing (NLP) | Query logs processed with NLP and keyword clustering |
| 25 | Usage patterns | Conversational | User to User | Logs processed with NLP and keyword clustering |
| 26 | Usage patterns | Conversational | User to Team/Group | Logs processed with NLP and keyword clustering |
| 27 | Usage patterns | Cognitive/Psychological | Attention & Focus | Scroll depth tracking, eye dwell time via webcam or AR headset |
| 28 | Usage patterns | Cognitive/Psychological | Multitasking and Context Switching | Monitoring tab switching, active/inactive state logs |
| 29 | Usage patterns | Graphical Action | Inactivity or Idle Detection | Inactivity timeouts, interaction pause tracking |
| 30 | Voice/Video | Input Method | Voice Commands | Voice command analysis using timestamped NLP processing |
| 31 | Voice/Video | Input Method | Motion Tracking | Spatial tracking logs from motion or eye tracking systems |
| 32 | Voice/Video | Conversational | Emotional Feedback | Sentiment analysis from speech tone or chat input |

Fig. 31A

| | E | F |
|---|---|---|
| 1 | **Possible Inputs/Metrics** | **Story point of view / Story perspective** |
| 2 | Co-edit logs | When working with others, the story adapts to reflect group behavior and shared focus. |
| 3 | Keyboard tracking, command parsing, eye-to-type interaction (future input methods) | When commands are used frequently, the story moves important steps earlier to match user priorities. |
| 4 | Motion sensors, computer vision, AR/VR hand tracking (e.g., Apple Vision gloves or holograms) | If certain gestures or touches are repeated, the story keeps those elements in focus longer. |
| 5 | Clickstream, virtual pointer interactions, glove-based selection | Consistent choices result in those paths being emphasized earlier in the story sequence. |
| 6 | Scroll depth, Velocity, Direction, Time spent scrolling, Scrolling frequency | Lingering on a section prompts the system to clarify it next time. |
| 7 | Spatial UI flow, DOM heatmaps, eye-gaze navigation tracking | Spending more time on a section signals importance, causing that part to become more prominent. |
| 8 | Activation frequency, interaction duration, content focus, movement range | Magnifier focus on content signals interest, prioritizing it in future narratives. |
| 9 | Clickstream, virtual pointer interactions, glove-based selection | Revisiting the same content frequently moves it up in the storytelling hierarchy. |
| 10 | Spatial UI flow, DOM heatmaps, eye-gaze navigation tracking | Whether exploring freely or moving quickly, the story shifts to match the user's intent. |
| 11 | Clickstream, virtual pointer interactions, glove-based selection | Struggling with a section prompts the story to simplify or clarify that part next time. |
| 12 | Clickstream, virtual pointer interactions, glove-based selection | Reorganizing sections manually reshapes the story to reflect the user's preferred structure. |
| 13 | Customization frequency, interaction time, element adjustments, setting complexity | Customizing workspace/access highlights priorities, emphasizing related content in narratives. |
| 14 | Clickstream, virtual pointer interactions, glove-based selection | Frequent resizing or interaction with elements pins them for future story emphasis. |
| 15 | View manipulation tracking, field-of-view logs, spatial scale interactions | Zooming into details teaches the system to expand or unfold those layers automatically. |
| 16 | Crash diagnostics, undo telemetry, interface struggle logs | Undoing changes flags areas that may need more clarity or visibility in future narratives. |
| 17 | General usage telemetry, ambient context sensors, predictive UI logging | Spending extra time on a part slows the storytelling pace to allow deeper engagement. |
| 18 | General usage telemetry, ambient context sensors, predictive UI logging | Frequent mistakes point to friction points that the story might highlight or simplify. |
| 19 | General usage telemetry, ambient context sensors, predictive UI logging | Hovering without clicking marks content as confusing, suggesting it needs more explanation. |
| 20 | Clickstream, virtual pointer interactions, glove-based selection | Skipping sections suggests disinterest, so those parts are downplayed or removed later. |
| 21 | General usage telemetry, ambient context sensors, predictive UI logging | Quick agreement indicates trust, prompting a more compact display in future stories. |
| 22 | General usage telemetry, ambient context sensors, predictive UI logging | Repetitive actions prioritize those elements by placing them earlier or more prominently. |
| 23 | Conversational AI logs, NLP token parsing, intent mapping | Help requests or support interactions highlight areas needing more attention in the story. |
| 24 | Keyboard tracking, command parsing, eye-to-type interaction (future input methods) | Typing questions like "budget details" helps the story surface relevant content instantly. |
| 25 | Keyboard tracking, command parsing, eye-to-type interaction (future input methods) | Conversations between users highlight topics that the story brings forward. |
| 26 | Keyboard tracking, command parsing, eye-to-type interaction (future input methods) | Group discussions cause the story to emphasize shared themes or decisions. |
| 27 | General usage telemetry, ambient context sensors, predictive UI logging | Frequent visual focus on specific content causes those parts to appear first in the story. |
| 28 | General usage telemetry, ambient context sensors, predictive UI logging | Signs of distraction or fatigue lead to a simplified and more focused story experience. |
| 29 | General usage telemetry, ambient context sensors, predictive UI logging | When attention drops, the story adapts with re-engagement elements or visual cues. |
| 30 | Microphone input, emotional AI, real-time speech analysis (voice/NLP engines) | Repeated voice queries surface the relevant topic earlier in the story timeline. |
| 31 | Motion sensors, computer vision, AR/VR hand tracking (e.g., Apple Vision gloves or holograms) | Looking at the same spot over time keeps it persistently visible in the narrative. |
| 32 | Microphone input, emotional AI, real-time speech analysis (voice/NLP engines) | Mood signals influence the story's tone or presentation style to better match the user's state. |

Fig. 31B

```
FUNCTION ProcessDocumentClickEvents(rawEvents)
  // Input: rawEvents - list of click event objects {userId, docId, timestamp, clickType}
  // Output: processedData - structured data for AI prompt

  INITIALIZE processedData = {
    userActivity: {},
    documentPopularity: {},
    clickPatterns: {}
  }

  // Aggregate clicks by user
  FOR EACH event IN rawEvents
    IF event.userId NOT IN processedData.userActivity
      processedData.userActivity[event.userId] = {
        totalClicks: 0,
        documents: {},
        timeRanges: {}
      }
    END IF

    // Update user activity
    user = processedData.userActivity[event.userId]
    user.totalClicks += 1
    user.documents[event.docId] += 1 OR 1
    timeSlot = getHourSlot(event.timestamp)
    user.timeRanges[timeSlot] += 1 OR 1

    // Update document popularity
    IF event.docId NOT IN processedData.documentPopularity
      processedData.documentPopularity[event.docId] = {
        totalClicks: 0,
        uniqueUsers: Set()
      }
    END IF
    doc = processedData.documentPopularity[event.docId]
    doc.totalClicks += 1
    doc.uniqueUsers.add(event.userId)

    // Track click patterns
    patternKey = event.clickType + "_" + getDayOfWeek(event.timestamp)
    processedData.clickPatterns[patternKey] += 1 OR 1
  END FOR

  // Format for AI prompt
  promptData = {
    summary: {
      totalEvents: length(rawEvents),
      uniqueUsers: length(processedData.userActivity),
      uniqueDocs: length(processedData.documentPopularity)
    },
    topDocuments: sortBy(processedData.documentPopularity, 'totalClicks', limit=5),
    activeUsers: sortBy(processedData.userActivity, 'totalClicks', limit=5),
    peakHours: extractTopTimeSlots(processedData.userActivity),
    commonPatterns: sortBy(processedData.clickPatterns, limit=3)
  }

  RETURN formatAsPromptString(promptData)
END FUNCTION
```

Fig. 32

```
// Define data structures
STRUCT Document
  file_path: STRING
  file_type: ENUM(PDF, DOC, IMAGE)
  content: STRING OR IMAGE
  metadata: DICTIONARY

STRUCT TrainingExample
  input_text: STRING
  target_text: STRING

// Main fine-tuning function
FUNCTION fine_tune_llm(documents: LIST[Document], model: LLM, hyperparameters: DICTIONARY)
  // Preprocess documents
  dataset = preprocess_documents(documents)

  // Create data loader
  dataloader = DataLoader(dataset, batch_size=hyperparameters.batch_size, shuffle=True)

  // Initialize model and optimizer
  model = load_pretrained_model(model)
  optimizer = initialize_optimizer(model, learning_rate=hyperparameters.learning_rate)

  // Training loop
  FOR epoch IN RANGE(hyperparameters.epochs)
    FOR batch IN dataloader
      inputs, targets = tokenize_batch(batch)
      loss = model.forward(inputs, targets)
      loss.backward()
      optimizer.step()
      optimizer.zero_grad()
    END FOR
    log_metrics(epoch, loss)
  END FOR

  // Save model
  save_model(model, hyperparameters.output_path)

  RETURN model
END FUNCTION

// Preprocess documents
FUNCTION preprocess_documents(documents: LIST[Document]) RETURNS LIST[TrainingExample]
  dataset = []
  FOR document IN documents
    // Extract and process content
    content = extract_content(document)
    text = process_content(content, document.file_type)

    // Format metadata
    metadata_text = format_metadata(document.metadata)

    // Create training example
    example = TrainingExample(
      input_text: f"Metadata:\n{metadata_text}\nContent:\n{text}",
      target_text: text
    )
    dataset.append(example)
  END FOR
  RETURN dataset
```

Fig. 36A

Fig. 36B

```
END FUNCTION

// Extract content by file type
FUNCTION extract_content(document: Document) RETURNS STRING OR IMAGE
  CASE document.file_type
    PDF: RETURN extract_pdf_text(document.file_path)
    DOC: RETURN extract_doc_text(document.file_path)
    IMAGE: RETURN load_image(document.file_path)
  END CASE
END FUNCTION

// Process content
FUNCTION process_content(content: STRING OR IMAGE, file_type: ENUM) RETURNS STRING
  IF file_type == IMAGE
    RETURN perform_ocr(content)
  ELSE
    RETURN clean_text(content)
  END IF
END FUNCTION

// Format metadata
FUNCTION format_metadata(metadata: DICTIONARY) RETURNS STRING
  RETURN JOIN([f"{key}: {value}" FOR key, value IN metadata], "\n")
END FUNCTION

// Tokenize batch
FUNCTION tokenize_batch(batch: LIST[TrainingExample]) RETURNS (inputs, targets)
  inputs = tokenizer.encode([ex.input_text FOR ex IN batch], padding=True)
  targets = tokenizer.encode([ex.target_text FOR ex IN batch], padding=True)
  RETURN inputs, targets
END FUNCTION

// Log metrics
FUNCTION log_metrics(epoch: INTEGER, loss: FLOAT)
  PRINT(f"Epoch {epoch}: Loss = {loss}")
END FUNCTION

// Example usage
hyperparameters = {
  batch_size: 8,
  learning_rate: 2e-5,
  epochs: 3,
  output_path: "fine_tuned_model"
}
documents = [
  Document(file_path="doc1.pdf", file_type=PDF, metadata={"author": "John"}),
  Document(file_path="img1.png", file_type=IMAGE, metadata={"source": "scan"})
]
model = fine_tune_llm(documents, pretrained_model, hyperparameters)
```

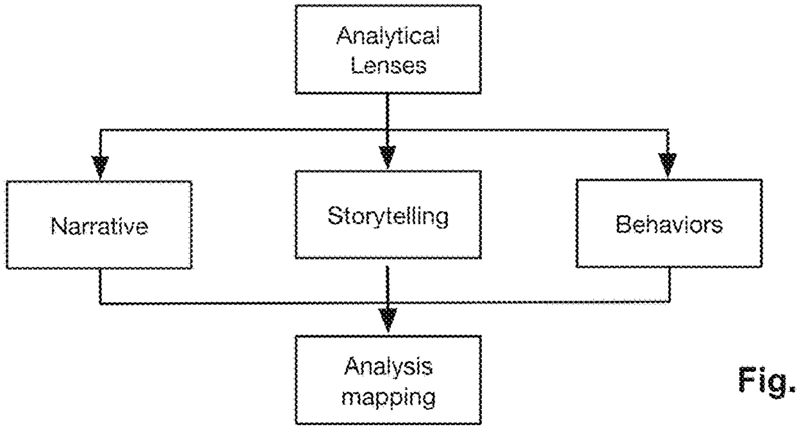

Fig. 37

| | A | B | D | E | F |
|---|---|---|---|---|---|
| 1 | **Model Name** | **Categories** | **Suitability for Story-Building** | **Mathematical Application** | **Ease of Implementation** |
| 2 | Systems Thinking | Element Sequencing | Links documents (e.g., emails to reports) into a narrative network, reflecting user-driven connections for coherent stories | Graph theory: documents as nodes, edges weighted by clicks (e.g., NetworkX in Python) | Moderate |
| 3 | Bayesian Reasoning | General: Weighted elements | Ranks documents by likelihood of driving narrative (e.g., email,role), adapts to user focus for relevant stories | Bayesian networks: Posterior probabilities (P(relevant\|clicks, content)) via Bayes theorem (e.g., pgmpy in Python) | Moderate |
| 4 | Signal vs. Noise | General: Weighted elements | Focuses on documents critical to narrative (e.g., key report vs. routine emails), ensuring concise stories | Statistical filters: Z-scores/thresholds for high-engagement documents (e.g., pandas in Python) | Easy |
| 5 | Pareto Principle | General: Weighted elements | Focuses on high-impact documents (e.g., pivotal emails), making stories efficient and impactful | Cumulative distribution: Rank documents by engagement to identify top 20% (e.g., Numerical Python in Python) | Easy |
| 6 | Mental Model of Relevance | General: Weighted elements | Prioritizes user-relevant documents (e.g., work reports), aligning stories with user context | Ranking algorithms: Weighted scoring by metadata (tags, type) and views (e.g., pandas in Python) | Easy |
| 7 | Narrative Framing | Element Sequencing | Transforms documents into a relatable story arc (e.g., emails as project journey), ensuring engagement | Text analysis: Topic modeling/clustering by themes, ordered by clicks (e.g., Natural Language Toolkit in Python) | Moderate |
| 8 | Chronological Reasoning | Element Sequencing | Structures documents sequentially (e.g., emails to video) for clear timeline-based stories | Sorting: Documents by timestamp via quicksort (e.g., pandas in Python) | Easy |
| 9 | Causal Loop Analysis | Element Sequencing | Maps document cause-and-effect loops (e.g., news article drives emails), adds story depth | System dynamics: Quantify loops, weight by user tags (e.g., pysd in Python) | Moderate |
| 10 | Feedback Loops | General: Weighted elements | Highlights reinforcing/balancing document interactions, complements story dynamics | System dynamics: Model loops, weight by views (e.g., Stella) | Moderate |
| 11 | Scenario Planning | Element Sequencing | Envisions story paths (e.g., project outcomes), engages with possibilities | Monte Carlo simulations: Model paths based on document choices (e.g., Numerical Python in Python) | Hard |
| 12 | Second-Order Thinking | General: Weighted elements | Considers long-term document impacts (e.g., policy effects), adds story depth | Chained probabilistic models: Simulate multi-step outcomes (e.g., PyMC3 in Python) | Moderate |
| 13 | First Principles Thinking | General: Weighted elements | Deconstructs documents into core elements, clarifies story foundations | Graph decomposition: Documents as nodes, isolate core elements (e.g., NetworkX in Python) | Moderate |
| 14 | Mental Model of Prioritization | General: Weighted elements | Weights documents by importance, supports story ranking | Ranking: Score by tags/views (e.g., pandas in Python) | Easy |
| 15 | Pattern Recognition | | Identifies document themes, aids story coherence | Clustering: Group by themes via k-means (e.g., scikit-learn in Python) | Moderate |
| 16 | Mental Model of Context | General: Weighted elements | Interprets documents situationally, supports story relevance | Context analysis: Weight by situational metadata (e.g., pandas in Python) | Moderate |
| 17 | Decision Trees | Element Sequencing | Maps document-driven choices, supports interactive stories | Decision tree algorithms: Branch by choices (e.g., scikit-learn in Python) | Hard |
| 18 | Mental Model of Salience | General: Weighted elements | Highlights attention-grabbing documents, enhances engagement | Saliency scoring: Weight by visual/engagement metrics (e.g., pandas in Python) | Moderate |
| 19 | Anchoring | Element Sequencing | Uses initial documents as story anchors, guides structure | Anchor analysis: Weight early documents (e.g., pandas in Python) | Easy |
| 20 | Design Thinking | Human Interpretation / Prism / Constraints | User-centric story design, improves engagement | Iterative design: User feedback loops (no standard math) | Moderate |
| 21 | Mental Model of Flow | Element Sequencing | Smooth story progression, enhances navigation | Flow analysis: Optimize transitions by engagement (e.g., pandas in Python) | Moderate |
| 22 | Occam, Razor | General: Weighted elements | Oversimplifies narratives, ignoring nuanced behavior for story-building | Model selection: Akaike Information Criterion to choose simplest document explanation (e.g., pandas in Python) | Easy |
| 23 | Inversion | Element Sequencing | Speculative focus on what didn't happen, not practical for document-driven stories | Counterfactual analysis: Decision trees to model missing documents (e.g., scikit-learn in Python) | Hard |
| 24 | Confirmation Bias | Human Interpretation / Prism / Constraints | Analytical for avoiding bias, not directly applicable to story-building | Statistical bias detection: Correlation analysis of user clicks to flag bias (e.g., pandas in Python) | Moderate |
| 25 | Mental Model of Incentives | Human Interpretation / Prism / Constraints | Analyzes motivations, not directly tied to story-building | Utility modeling: Weight document engagement by motives (e.g., pandas in Python) | Moderate |
| 26 | Mental Model of Scarcity | Human Interpretation / Prism / Constraints | Focuses on resource constraints, irrelevant to document-based stories | Resource allocation: Linear programming for limited document slots (e.g., Scientific Python in Python) | Hard |
| 27 | Game Theory | Human Interpretation / Prism / Constraints | Models competitive interactions, too abstract for document stories | Game-theoretic models: Nash equilibrium for document conflicts (e.g., Scientific Python in Python) | Hard |

Fig. 38A

| | G | H | I | J | K |
|---|---|---|---|---|---|
| 1 | User Experience Benefits | Combination with Other Models | Added Value of Other Models | Selected (Yes/No) | Reason for Selection/Rejection |
| 2 | Intuitive UI with clickable document links, engaging and personalized | With Bayesian Reasoning, personalizes document network | Personalizes UI by prioritizing clicked document links, enhancing story relevance | Yes | Selected: Maximizes intuitiveness (navigable User Interface), engagement (exploration), and personalization (adapts to clicks) |
| 3 | Personalized UI with dynamic document rankings, highly engaging | With Signal vs. Noise, clarifies high-probability documents | Reduces UI clutter by filtering probable documents, improving story clarity | Yes | Selected: High personalization (adapts to clicks), engagement (responsive rankings), and story relevance |
| 4 | Clear UI prioritizing user-focused documents, engaging | With Bayesian Reasoning, personalizes filtered document list | Enhances personalization with probability-based filtering, sharpening story focus | Yes | Selected: Enhances User Interface clarity, intuitiveness, and engagement by focusing on user priorities |
| 5 | Efficient UI highlighting key documents, engaging | With Signal vs. Noise, streamlines high-impact document focus | Maximizes UI clarity by filtering key documents, enhancing narrative impact | Yes | Selected: Streamlines interaction (efficiency), engages (user-driven focus), and builds impactful stories |
| 6 | Customized UI with user-prioritized documents, personalized | With Chronological Reasoning, personalizes timeline rankings | Creates personalized UI timeline, aligning story with user priorities | Yes | Selected: High personalization (user-defined context), engagement (customization), and story alignment |
| 7 | Engaging UI with cohesive story arcs, personalized | With Systems Thinking, enhances network-based storytelling | Transforms network into engaging story arc, boosting narrative coherence | Yes | Selected: Boosts engagement (storytelling), personalization (user-focused arc), and narrative coherence |
| 8 | Intuitive UI timeline simplifying story navigation | With Narrative Framing, creates engaging timeline arcs | Presents timeline as compelling story arc, enhancing engagement | Yes | Selected: Enhances intuitiveness (timeline User Interface), engagement (key moments), and story progression |
| 9 | Detailed UI diagrams deepen story, less intuitive | With Systems Thinking, clarifies causal network links | Deepens UI network with causal insights, improving story understanding | No | Not Selected: Complex diagrams reduce User Interface intuitiveness, overlaps with Systems Thinking, less critical for casual users |
| 10 | Dynamic UI diagrams clarify interactions, less clear | With Causal Loop Analysis, deepens dynamic insights | Enhances UI diagrams with reinforcing/balancing loops, clarifying dynamics | No | Not Selected: Overlaps with Causal Loop Analysis and Systems Thinking, less distinct for User Interface simplicity |
| 11 | Interactive UI paths engage, but complex | With Bayesian Reasoning, personalizes story scenarios | Personalizes UI scenarios with probability-weighted paths, boosting relevance | No | Not Selected: High input and computational complexity, less seamless than top models |
| 12 | Strategic UI insights deepen, less dynamic | With Scenario Planning, enhances long-term scenarios | Enriches UI scenarios with long-term impacts, adding strategic depth | No | Not Selected: Static, less behavior-driven, analytical over User Interface-focused |
| 13 | Clear UI foundations simplify, not dynamic | With Systems Thinking, clarifies core network links | Simplifies UI network by highlighting core elements, enhancing clarity | No | Not Selected: Static, not behavior-driven, foundational but not adaptive |
| 14 | Ranked UI list personalizes, less contextual | With Mental Model of Relevance, enhances priority focus | Boosts UI personalization with contextual priority rankings | No | Not Selected: Similar to Relevance, less contextual, redundant |
| 15 | Themed UI grouping clarifies, less dynamic | With Narrative Framing, strengthens story coherence | Enhances UI story arc with cohesive thematic grouping | No | Not Selected: Overlaps with Narrative Framing, less behavior-driven |
| 16 | Situational UI relevance personalizes, less adaptive | With Mental Model of Relevance, boosts contextual focus | Improves UI personalization with situational document prioritization | No | Not Selected: Similar to Relevance, less dynamic, redundant |
| 17 | Interactive UI paths engage, overly complex | With Scenario Planning, enhances interactive paths | Enriches UI with interactive choice-driven story paths, engaging | No | Not Selected: Complex User Interface, high input requirements, less intuitive |
| 18 | Striking UI documents engage, niche focus | With Signal vs. Noise, clarifies salient document focus | Sharpens UI clarity by filtering visually striking documents | No | Not Selected: Niche, overlaps with Signal vs. Noise, less story-focused |
| 19 | Structured UI anchors clarify, less adaptive | With Chronological Reasoning, enhances timeline anchors | Strengthens UI timeline with anchored document structure | No | Not Selected: Static, less behavior-driven, limited dynamics |
| 20 | User-focused UI design engages, not story-specific | With Narrative Framing, designs engaging story arcs | Creates compelling UI story arcs, boosting engagement | No | Not Selected: Broad, not story-specific, less analytical |
| 21 | Fluid UI navigation simplifies, less distinct | With Chronological Reasoning, enhances timeline flow | Improves UI timeline with seamless document transitions | No | Not Selected: Overlaps with Chronological Reasoning, less distinct |
| 22 | Simple UI explanations, minimal personalization | With Mental Model of Relevance, simplifies priorities | Simplifies UI prioritized documents, but lacks narrative depth | No | Oversimplifies narratives, reduces personalization, minimally suitable for story-building |
| 23 | Speculative UI paths, low engagement | With Scenario Planning, explores hypothetical paths | Engages UI with hypothetical story paths, minimally relevant | No | Speculative, low relevance for document-driven stories, minimal engagement |
| 24 | Bias-alert UI clarifies, not story-focused | With Bayesian Reasoning, counters bias in rankings | Balances UI rankings by reducing bias, minimally story-relevant | No | Analytical, not narrative-focused, low story-building relevance |
| 25 | Motive-based UI insights, not story-driven | With Mental Model of Relevance, aligns motive priorities | Personalizes UI with motive-driven document rankings, low relevance | No | Motivation-focused, not story-driven, low narrative relevance |
| 26 | Limited UI slots clarify, irrelevant to stories | With Pareto Principle, streamlines scarce document focus | Streamlines UI with high-impact document focus, irrelevant to stories | No | Irrelevant to narrative construction, minimal user experience benefit |
| 27 | Complex UI conflicts, minimal relevance | With Decision Trees, models competitive choices | Engages UI with competitive choice paths, minimally relevant | No | Abstract, complex, least suitable for story-building and User Interface |

Fig.38B

METHOD OF COLLECTING CONTEXTUAL BEHAVIORAL DATA WITHIN DIGITAL NARRATIVE INTELLIGENCE ENVIRONMENTS

CROSS-REFERENCES

This application relates to and is a non-provisional application claiming priority under 35 U.S.C. § 119(e) and 37 C.F.R. § 1.78(a) for a priority claim to earlier-filed U.S. provisional patent application Ser. No. 63/813,088, filed May 28, 2025, under 35 U.S.C. § 111, entitled INTERPRETATION GAP REDUCER USING STORYTELLING WITHIN DIGITAL ENVIRONMENTS, the specifications of which are hereby incorporated herein by reference in its entirety.

The following U.S. patents are hereby expressly incorporated by reference in their entireties for all purposes, including providing additional details, features, and embodiments related to graphical multidimensional file management, timeline-based document navigation, and user interface methods and systems: U.S. Pat. No. 8,645,826, issued Feb. 4, 2014, titled "Graphical multidimensional file management system and method"; U.S. Pat. No. 9,454,529, issued Sep. 27, 2016, titled "Method of improving a search"; U.S. Pat. No. 7,680,817, issued Mar. 16, 2010, titled "Multi-dimensional locating system and method"; U.S. Pat. No. 8,954,847, issued Feb. 10, 2015, titled "Displays of user select icons with an axes-based multimedia interface"; U.S. Pat. No. 9,251,643, issued Feb. 2, 2016, titled "Multimedia interface progression bar"; U.S. Pat. No. 8,316,306, issued Nov. 20, 2012, titled "Method and system for sequentially navigating axes of elements"; U.S. Pat. No. 8,136,030, issued Mar. 13, 2012, titled "Method and system for managing music files"; U.S. Pat. No. 8,078,966, issued Dec. 13, 2011, titled "Method and system for managing musical files"; U.S. Pat. No. 8,010,508, issued Aug. 30, 2011, titled "Information elements locating system and method"; U.S. Pat. No. 8,151,185, issued Apr. 3, 2012, titled "Multimedia interface"; U.S. Pat. No. 7,606,819, issued Oct. 20, 2009, titled "Multi-dimensional locating system and method"; U.S. Pat. No. 8,893,046, issued Nov. 18, 2014, titled "Method of managing user-selectable elements in a plurality of directions"; U.S. Pat. No. 8,904,281, issued Dec. 2, 2014, titled "Method and system for managing multi-user user-selectable elements"; U.S. Pat. No. 10,282,072, issued May 7, 2019, titled "Method and apparatus for identifying user-selectable elements having a commonality thereof"; U.S. Pat. No. 10,719,658, issued Jul. 21, 2020, titled "Method of displaying axes of documents with time-spaces"; U.S. Pat. No. 11,281,842, issued Mar. 22, 2022, titled "Expandable timeline"; U.S. Pat. No. 11,281,841, issued Mar. 22, 2022, titled "Axis of user-selectable elements with linear timescale and non-linear timescale"; U.S. Pat. No. 11,341,312, issued May 24, 2022, titled "Non-uniform timeline displaying elements of uneven axial lengths"; U.S. Pat. No. 11,392,750, issued Jul. 19, 2022, titled "Multi-dimensional locating system and method including a non-linear timescale ordering"; U.S. Pat. No. 11,550,987, issued Jan. 10, 2023, titled "Timeline for presenting information"; U.S. Pat. No. 11,775,732, issued Oct. 3, 2023, titled "Timeline with timescales for presenting images"; U.S. Pat. No. 11,281,840, issued Mar. 22, 2022, titled "Method of displaying images along timelines"; U.S. Pat. No. 9,348,800, issued May 24, 2016, titled "Method of managing arrays of documents"; U.S. Pat. No. 9,262,381, issued Feb. 16, 2016, titled "Array of documents with past, present and future portions thereof"; U.S. Pat. No.

8,306,982, issued Nov. 6, 2012, titled "Method for associating and manipulating documents with an object"; U.S. Pat. No. 9,690,460, issued Jun. 27, 2017, titled "Method and apparatus for identifying user-selectable elements having a commonality thereof"; U.S. Pat. No. 9,652,438, issued May 16, 2017, titled "Method of distinguishing documents"; U.S. Pat. No. 8,010,892, issued Aug. 30, 2011, titled "Documents notation tool and method"; U.S. Pat. No. 8,788,937, issued Jul. 22, 2014, titled "Method and tool for classifying documents to allow a multi-dimensional graphical representation"; U.S. Pat. No. 8,063,404, issued Nov. 29, 2011, titled "Method of managing expected documents and system providing same"; U.S. Pat. No. 8,701,039, issued Apr. 15, 2014, titled "Method and system for discriminating axes of user-selectable elements"; U.S. Pat. No. 8,984,417, issued Mar. 17, 2015, titled "Method of associating attributes with documents"; U.S. Pat. No. 8,739,050, issued May 27, 2014, titled "Documents discrimination system and method thereof"; U.S. Pat. No. 10,430,495, issued Oct. 1, 2019, titled "Timescales for axis of user-selectable elements"; U.S. Pat. No. 8,607,155, issued Dec. 10, 2013, titled "Method of managing groups of arrays of documents"; U.S. Pat. No. 8,823,123, issued Sep. 2, 2014, titled "Timescale for presenting information"; U.S. Pat. No. 9,733,801, issued Aug. 15, 2017, titled "Expandable and collapsible arrays of aligned documents"; U.S. Pat. No. 9,058,093, issued Jun. 16, 2015, titled "Active element"; U.S. Pat. No. 8,601,392, issued Dec. 3, 2013, titled "Timeline for presenting information"; U.S. Pat. No. 9,582,646, issued Mar. 7, 2017, titled "Selection and operations on axes of computer-readable files and groups of axes thereof"; U.S. Pat. No. 11,281,843, issued Mar. 22, 2022, titled "Method of displaying axis of user-selectable elements over years, months, and days"; U.S. Pat. No. 10,558,733, issued Feb. 11, 2020, titled "Method of managing elements in an information element array collating unit"; U.S. Pat. No. 11,080,465, issued Aug. 3, 2021, titled "Method of expanding stacked elements"; U.S. Pat. No. 11,136,660, issued Nov. 29, 2022, titled "Method of selecting a time-based subset of information elements"; U.S. Pat. No. 10,180,773, issued Jan. 15, 2019, titled "Method of displaying axes in an axis-based interface"; U.S. Pat. No. 9,122,374, issued Sep. 1, 2015, titled "Expandable and collapsible arrays of documents"; U.S. Pat. No. 9,189,129, issued Nov. 17, 2015, titled "Non-homogeneous objects magnification and reduction"; U.S. Pat. No. 10,289,657, issued May 14, 2019, titled "Method of retrieving information elements on an undisplayed portion of an axis of information elements"; U.S. Pat. No. 9,613,167, issued Apr. 4, 2017, titled "Method of inserting and removing information elements in ordered information element arrays"; U.S. Pat. No. 9,646,080, issued May 9, 2017, titled "Multi-functions axis-based interface"; U.S. Pat. No. 10,845,952, issued Nov. 24, 2020, titled "Method of abutting multiple sets of elements along an axis thereof"; U.S. Pat. No. 10,067,638, issued Sep. 4, 2018, titled "Method of navigating axes of information elements"; U.S. Pat. No. 9,519,693, issued Dec. 13, 2016, titled "Method and apparatus for displaying data element axes"; U.S. Pat. No. 10,671,266, issued Jun. 2, 2020, titled "Method and apparatus of aligning information element axes"; and U.S. Pat. No. 11,023,121, issued Jun. 1, 2021, titled "Method of transversally aligning information elements along axes." The entirety of each of the foregoing patents, including all figures, descriptions, and claims, is incorporated herein by reference as if fully set forth herein.

BACKGROUND OF THE INVENTION

1. Field of the Invention

This invention generally relates to a method of collecting contextual behavioral data within narrative intelligence environments. The present invention also relates to curating and creating artificial intelligence models training sets. The present invention more precisely relates to providing a narrative structure adapted to contextualize human behaviors in digital environments.

2. Description of the Related Art

In the fields of information processing, user interface design, and Artificial Intelligence (AI) systems, the manner in which humans perceive and interpret data—such as images, text, and speech—has significant implications for the development of effective computational systems and human-machine interfaces. Human cognition is fundamentally visual; the human brain is highly optimized for rapid, parallel processing of visual information. As a result, individuals can extract meaning, recognize patterns, and interpret complex scenes from images with greater speed and accuracy than from other modalities. Images convey context, emotion, and detail simultaneously, leveraging innate human abilities to process visual cues such as color, shape, and spatial relationships.

In contrast, interpreting text is a sequential and learned process that requires decoding symbolic representations and constructing meaning over time, which is typically more cognitively demanding and slower than visual processing. Speech, while natural and intuitive, is inherently temporal and linear, requiring listeners to process information in the order presented. This temporal nature can limit the speed and efficiency with which complex or detailed information is absorbed—especially when compared to the parallel and holistic nature of image perception.

Storytelling is one of the most natural and effective mechanisms for humans to understand, manage, retain, and transmit information, aligning with the way the human brain processes and stores experiences. Narrative structures organize information into coherent sequences of events, facilitating understanding, memory retention, and recall. This structure engages multiple cognitive processes, including emotional engagement, visualization, and pattern recognition, all of which enhance retention. Storytelling also leverages innate social instincts, as humans have historically relied on stories to share knowledge, teach lessons, transmit instructions and foster social cohesion. By embedding information within relatable contexts or compelling narratives, storytelling transforms abstract concepts into their context providing deeper understanding and meaningful experiences, making it an intuitive and enduring method for knowledge management.

Empirical research demonstrates that delivering information in narrative or story form significantly enhances retention, engagement, and comprehension compared to raw, tacit or fragmented data. Stories improve memory by creating vivid, emotionally compelling experiences, making information far more memorable than non-story formats [Heath, C. and Heath, D., Made to Stick: Why Some Ideas Survive and Others Die, *Random House,* 2007]. Stories foster engagement and persuasion by immersing audiences in their unfolding events, particularly for complex topics [Green, M. C. and Brock, T. C., "The Role of Transportation in the Persuasiveness of Public Narratives", *Journal of Personality and Social Psychology*, vol. 79, no. 5, pp. 701-721, 2000]. Additionally, stories provide a coherent structure that clarifies understanding, whereas fragmented data diminishes impact and coherence [Fisher, W. R., "The narrative paradigm: An elaboration", *Communication Monograph.* 52(4), pp. 347-367, 1985]. In educational contexts, story-based methods markedly improve learning outcomes by integrating cognitive and emotional engagement [Robin, B. R., "The Educational Uses of Digital Storytelling", *Proceedings of Society for Information Technology & Teacher Education International Conference*. pp. 709-716, 2006].

Numerous studies establish that the human brain is highly optimized for processing visual information, which greatly improves retention, engagement, and understanding compared to text-only or fragmented data. The brain can detect meaning from visual stimuli in as little as 13 milliseconds, demonstrating its remarkable speed in processing images [Potter, M. C., Wyble. B., Hagmann, C. E., and McCourt, E. S., "Detecting meaning in RSVP at 13 ms per picture", Nature Neuroscience, vol. 17, no. 6, pp. 825-827, 2014]. Visual aids, such as images and diagrams, markedly improve memory retention and comprehension by integrating textual and visual information [Mayer, R. E., "Multimedia Learning", *Cambridge University Press,* 2001]. Visual storytelling enhances engagement by making complex data more accessible and emotionally resonant, particularly in professional and educational contexts [Smiciklas, M., "The Power of Infographics: Using Pictures to Communicate and Connect with Your Audiences", *Que Publishing,* 2012]. Furthermore, visual presentations reduce cognitive load, enabling more efficient information processing compared to text-heavy formats [Sweller, J., "Cognitive Load During Problem Solving: Effects on Instructional Design", *Cognitive Science*, vol. 12, no. 2, pp. 257-285, 1988]. In educational settings, visual learning methodologies significantly boost student engagement and understanding through structured, multimedia approaches.

In human-machine interactions, the "interpretation gap" refers to the inherent disconnect between how information, instructions, or data are represented, processed, and understood by humans versus computational systems. This gap arises from fundamental differences in cognitive frameworks, semantic understanding, contextual awareness, and representational modalities. As a result, information that is intuitively meaningful or contextually rich to a human may be ambiguous, incomplete, or misinterpreted by a machine—and vice versa. The interpretation gap encompasses challenges related to semantic ambiguity, loss of nuance, and potential misalignment in intent or meaning during the exchange, processing, or presentation of information between human and machine agents. The interpretation gap can also lengthen the time and increase the energy required for a human to understand a product of a computer system.

The challenge of human knowledge retention is exacerbated by the exponential growth in the volume of information generated and disseminated globally. Cognitive overload can be defined as a mental state in which the combined informational and interactive demands of the interface exceed the user's working-memory and attentional capacity, causing a measurable drop in decision-making efficiency, an increase in selection or configuration errors, or a delayed response time. By 2025, the total volume of data created worldwide is projected to reach approximately 175 zettabytes, reflecting a substantial increase from 2020 levels [Reinsel, D., Gantz, J., and Rydning, J., "Data Creation and Replication Will Grow at a Faster Rate Than Installed Storage Capacity", *IDC White Paper,* 2020]. This rapid data expansion intensifies cognitive burden, making it increasingly difficult for individuals to process, retain, and apply relevant knowledge [Sweller, J., "Cognitive Load During Problem Solving: Effects on Instructional Design", *Cognitive Science*, vol. 12, no. 2, pp. 257-285, 1988]. Furthermore, the proliferation of information contributes to organizational inefficiencies, as excessive data overwhelms decision-making processes and reduces knowledge utilization [Eppler, M. J., and Mengis, J., "The Concept of Information Overload: A Review of Literature from Organization Science, Accounting, Marketing, MIS, and Related Disciplines", *The Information Society*, vol. 20, no. 5, pp. 325-344, 2004].

Recent advances in large language models (LLMs) have driven significant progress in natural language processing, content generation, and automated reasoning [Brown, T. B., Mann, B., Ryder, N., et al., "Language Models are Few-Shot Learners", *Advances in Neural Information Processing Systems*, vol. 33. pp. 1877-1901, 2020]. However, the rapid scaling of these models introduces technical and practical challenges that constrain their long-term reliability and effectiveness [Bender, E. M., Gebru, T., McMillan-Major, A., and Shmitchell, S., "On the Dangers of Stochastic Parrots: Can Language Models Be Too Big?", *Proceedings of the* 2021 *ACM Conference on Fairness, Accountability, and Transparency*, pp. 610-623, 2021]. A critical concern is the potential exhaustion of high-quality training data, with projections suggesting that publicly available, human-generated data may be depleted between 2026 and 2032, limiting further model scaling [Villalobos, P., Sevilla, A., Heim, L., et al., "Will we run out of data? Limits of LLM scaling based on human-generated data", *arXiv:*2211.04325, 2022]. This scarcity underscores the need for innovative data curation and synthetic data strategies to sustain LLM performance [Bender, E. M., et al., "On the Dangers of Stochastic Parrots: Can Language Models Be Too Big?", *Proceedings of the* 2021 *ACM Conference on Fairness, Accountability, and Transparency*. pp. 610-623, 2021].

Another critical limitation involves the interpretation of ambiguous or underspecified inputs, which LLMs often misinterpret, producing incorrect, nonsensical, or inconsistent outputs [Liu, J., Shen, D., Zhang, Y., et al., "We're Afraid Language Models Aren't Modeling Ambiguity", *arXiv:*2305.18564, 2023]. Additionally, LLMs exhibit self-inconsistency when processing ambiguous entities, with accuracy dropping to around seventy-five percent under underspecified prompts [Sedova, A., Malmi, E., Barbieri, F., et al., "To Know or Not To Know? Analyzing Self-Consistency of Large Language Models under Ambiguity", *arXiv:* 2402.09613, 2024]. These limitations extend to handling diverse and heterogeneous data types, where LLMs struggle to extract coherent insights, further hindering their reliability in complex real-world applications [Bommasani, R., Hudson, D. A., Adeli, E., et al., "On the Opportunities and Risks of Foundation Models", *arXiv:*2108.07258, 2021].

The phenomenon of hallucination—wherein LLMs generate plausible-sounding but fabricated information—poses significant risks, particularly in scientific and technical domains [Ji, Z., Lee, N., Frieske, R., et al., "Survey of Hallucination in Natural Language Generation", *ACM Computing Surveys*, vol. 55, no. 12, article 248, 2023]. In scientific writing, nearly half (47%) of references produced by LLMs have been found to be entirely invented, undermining the credibility of generated content [Athaluri, S. A., Manoharan, S. V., Varma, S., et al., "Exploring the Boundaries of Reality: Investigating the Phenomenon of Artificial Intelligence Hallucination in Scientific Writing Through ChatGPT References". *Cureus*, vol. 15, no. 7, e42713, 2023]. This tendency to fabricate information erodes trust in LLMs, especially in applications requiring high accuracy and verifiability [Ji, Z., Lee, N., Frieske, R., et al., "Survey of Hallucination in Natural Language Generation," *ACM Computing Surveys*, vol. 55, no. 12, article 248, 2023].

Bias and fairness remain persistent concerns in LLMs. Training predominantly on English-language datasets introduces significant language bias, marginalizing non-English linguistic and cultural perspectives and limiting the models' global applicability [Bender, E. M., Gebru, T., McMillan-Major, A., and Shmitchell, S., "On the Dangers of Stochastic Parrots: Can Language Models Be Too Big?," *Proceedings of the* 2021 *ACM Conference on Fairness, Accountability, and Transparency*, pp. 610-623, 2021]. The reliability of LLM evaluation benchmarks has also come under scrutiny. Analysis of the Massive Multitask Language Understanding (MMLU) benchmark revealed that approximately 6.5% of its questions contain errors, casting doubt on the validity of performance assessments derived from such datasets [Gema, Z., Zhang, Y., Zhang, W., et al., "Are We Done with MMLU?", *arXiv:*2402.00838, 2024]. These challenges, encompassing bias, evaluation reliability, and other limitations, highlight the multifaceted constraints of current LLM technologies and emphasize the need for innovative solutions to enhance fairness and robustness [Bommasam, R., Hudson, D. A., Adeli, E., et al., "On the Opportunities and Risks of Foundation Models", *arXiv:*2108.07258, 2021].

Therefore, systems that rely solely on text or speech for information delivery may not fully leverage the natural strengths of human perception. There is consequently a need for improved methods and interfaces adapted to human cognition that harness the advantages of visual processing, particularly in contexts where rapid comprehension and decision-making are critical. A need has also been felt for a user interface using a narrative structure and storytelling framework that optimize the presentation and management of information, taking into account the comparative strengths of image, text, and speech modalities in human cognition.

Accordingly, there exists a need in the art for an improved information management process that advances beyond the existing state of the art. In particular, there is a need for an information management process that is adapted to improve the collection and utilization of human contextual behaviors for the contextualization of human interactions with machine learning models. Other deficiencies and opportunities will become apparent to those skilled in the art upon consideration of the following summary and detailed description, together with the appended figures.

SUMMARY OF THE INVENTION

The following presents a simplified summary of the invention in order to provide a basic understanding of some possible aspects and objects of the invention. This summary is not an extensive overview of the invention. It is not intended to specifically identify key/critical elements of the invention or to delineate the scope of the invention. The invention encompasses many components, each possibly being an invention by itself. Its sole purpose is to present some general concepts of the invention in a simplified form as a prelude to the more detailed description that is presented later.

At the outset, humans are inherently more adept at interpreting visual information than textual information. Humans are also inherently more adept at understanding and recalling information when it is presented in the form of a narrative. The combined visual narrative presentation is specifically adapted to align with human cognitive architecture, thereby producing a quantifiable cognitive effect: minimizing the interpretation gap. Digital visual narrative hence improves human-machine interface that yields operational performance gains. By presenting information in a graphical narrative format and capturing user behaviors within this context, the system generates contextual behavioral data that is inherently more precise, contextually meaningful, and reflective of true user intent and expertise. This contextualized behavioral data is especially valuable for training AI models, as it reduces noise and ambiguity, thereby enabling the development of more accurate, reliable, and human-aligned AI systems.

It is one aspect of the present invention to alleviate one or more of the shortcomings of background art by addressing one or more of the existing needs in the art.

Aspects of our work provide a way for computational systems to reduce the interpretation gap using a narrative/storytelling, aligning more closely with the natural way individuals interact with information. To minimize the interpretation gap between humans and machines, efforts to improve knowledge transmission prioritize presenting information within a narrative structure/storytelling framework. While advances in machine learning and AI may help reduce the interpretation gap, such technical improvements are inherently constrained by the natural modalities through which humans engage, exchange, process, and internalize information. Accordingly, providing information to human users in the form of narrative/storytelling constitutes the most effective and natural method for reducing the interpretation gap, as it aligns with intrinsic human cognitive, organizational and communicative processes.

Aspects of the invention provides a system and a method for high agency digital narrative that combines chronological sequencing, visual representation, intuitive interconnexions and narrative structuring. This approach yields measurable improvements in comprehension, retention, engagement, productivity and transferability, particularly in environments characterized by high information complexity. The present context-aware user interface may be implemented in various forms, including but not limited to, logical timeline sequences, timeline infographics, distinctive visual features, intuitive artifacts distributions and interactive sharing, thereby rendering complex information more meaningful, accessible and actionable.

Embodiments of the invention favors a visual representation that displays events, milestones, or data points arranged in chronological order along a preferably horizontal or vertical axis. Its purpose is to present information graphically and sequentially, making it easier for viewers to comprehend the progression of time and the relationships between different artifacts, events, stages and user interactions. Timeline renderings are desirable to simplify complex information organization, making it more accessible and engaging by combining text, images, various contents, computer-readable files and design elements necessary for the understanding of something. For example, in a timeline-based graphical user interface (GUI) for information management, the narrative structure may manifest as a sequence of user interventions, events, tasks, actions, artifacts distributions and states, each visually represented and contextually linked. This structure not only facilitates visual anchoring, intuitive navigation and retrieval of information but also mirrors the natural human propensity to process information in a story, to make sense.

Modern digital environments increasingly benefit from digital storytelling techniques to facilitate the communication, comprehension, and retention of complex information. The present invention leverages the principles of narrative structuring, visual augmentation, and chronological sequencing to enhance user engagement and operational efficiency within technology-driven interfaces. Narrative-driven information delivery significantly improves user retention and recall. By embedding the artifacts, technical data, procedural steps, or system workflows within a dynamic story framework, the technology aligns with innate human cognitive processes, thereby facilitating more effective knowledge transfer.

Aspects of our work provide a method for minimizing the interpretation gap using a narrative structure within digital environments. In some aspects, the techniques described herein relate to an axis-based graphical user interface assisted by AI. Some other aspects of our work provide AI systems using a narrative structure to contextualize data and human behaviors in a digital environment. In some aspects, the techniques described herein relate to a user interface adapted to present a plurality of information elements along a chronological order using a narrative structure and a storytelling framework for gathering contextual behavioral data utilized for training AI models.

One aspect of the instant invention provides, in accordance with at least one embodiment thereof, an AI system enabling a method allowing to receive at least one parameter to be prioritized in the displaying of an axis of information elements reflecting a narrative, to generate operating parameters for the construction of the axis of information elements, and to control the layout of axes of information elements using these parameters within a workspace, thereby modifying the layout of axes of information elements according to the prioritized parameter.

In some aspects, the techniques described herein relate to dynamic AI systems interactions with a collaborator within a narrative structure and a storytelling framework. The narrative structure and storytelling framework could include activities of a collaborator monitored by an AI system and activities of a collaborator via a user interface, each providing collaborator's behavioral data.

In some aspects, the techniques described herein relate to AI systems considering users' behavioral data for proposing contextual assistance to the user.

In some aspects, the techniques described herein relate to a method of contextually proposing AI agents based on instant usage and user behavioral data within a narrative structure/storytelling framework.

In some aspects, the techniques described herein relate to a method to train an AI model with narrative intelligence behavioral data sets. In further aspects, combining a narrative structure/storytelling framework with curated human behavioral data for training the AI model.

Aspects of our work provide, in accordance with at least one embodiment thereof, a method and a system allowing to use AI to collect user behavioral empirical data, and to process the user behavioral empirical data into an improved method of managing information.

Aspects of our work provide, in accordance with at least one embodiment thereof, method of providing contextual collaborator behaviors data and a non-transitory computer readable medium storing instructions that, when executed by a processor of a computer system, cause the processor to perform operations comprising generating, within a graphical user interface, a dynamic narrative data structure that organizes a plurality of artifacts, the dynamic narrative data structure being adapted to provide: one or more timelines along which the plurality of artifacts are collated on a basis of a collation function by the computer system, the collated artifacts are disposed on the one or more timelines with respective artifacts temporal references; and graphical relational linkages adapted to reflect temporal relationships between the plurality of artifacts along the one or more timelines; associating at least some of the plurality of artifacts with attributes and displaying the plurality of artifacts in a graphical layout using the dynamic narrative data structure, the graphical layout being adapted to dynamically respond to collaborator interactions and to display constraints to provide an interactive representation of the timelines and of the relational linkages; monitoring, by the computer system, collaborator artifact interactions with respect to the plurality of artifacts to capture collaborator artifacts interaction data in association with respective artifacts temporal references, and collaborator navigation behaviors among the one or more timelines to capture collaborator navigation behaviors data associated with respective collaborator navigation behaviors temporal references following the collaborator navigation behaviors among the one or more timelines; generating, by the computer system, contextual collaborator behaviors data based at least in part on the collaborator artifacts interaction data and the collaborator navigation behavioral data within the dynamic narrative data structure; and storing the contextual collaborator behaviors data in a data repository.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

FIG. 20 is an exemplary schematic visual depicting an axis of information elements with three relational axes associated therewith in accordance with an illustrative embodiment of our work;

FIG. 21 is an exemplary schematic visual depicting a workspace of axes of information elements in accordance with an illustrative embodiment of our work;

FIG. 22 is an exemplary schematic visual depicting a workspace of axes of information elements in accordance with an illustrative embodiment of our work;

FIG. 29 is an exemplary schematic visual depicting interactions between a user and the user interface to record interaction events into a storage in accordance with an illustrative embodiment of our work;

FIG. 30 is an exemplary pseudocode for collecting behavioral events in accordance with an illustrative embodiment of our work;

FIGS. 31A, 31B is a table categorizing a plurality of exemplary behavioral actions/events performed in connection with the user interface with an illustrative embodiment of our work;

FIG. 32 is an exemplary pseudocode for collecting behavioral click patterns in accordance with an illustrative embodiment of our work;

FIGS. 36A, 36B are an example of a high-level pseudocode that outlines fine-tuning of a model in accordance with an illustrative embodiment of our work;

FIG. 37 is an exemplary schematic flow chart depicting a possible analytical lens structure in accordance with an illustrative embodiment of our work;

FIGS. 38A, 38B are illustrating a table depicting examples of analytical lenses in accordance with an illustrative embodiment of our work;

DESCRIPTION OF EMBODIMENT(S) OF THE INVENTION

General

Figure 1:
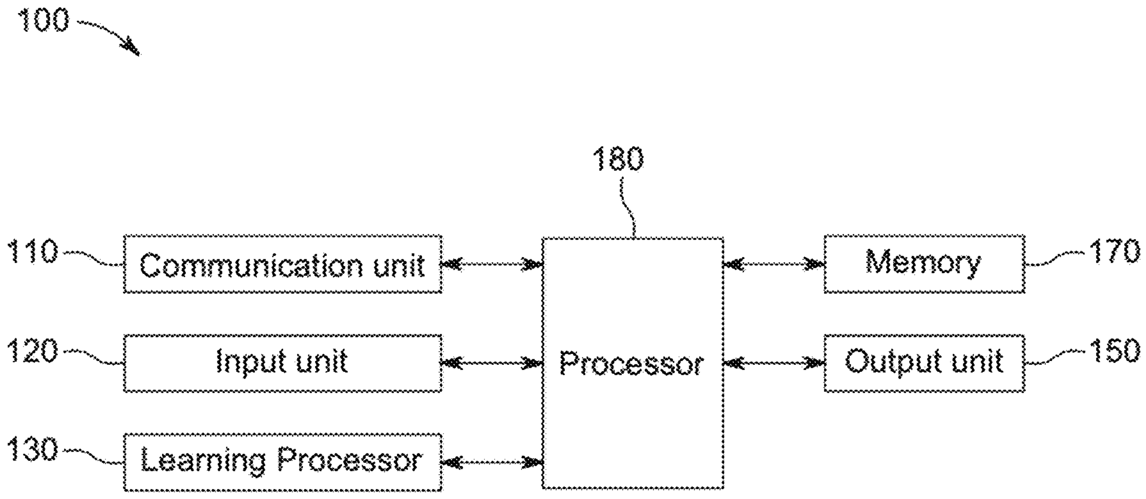
FIG. 1 is a schematical depiction an exemplified AI device in accordance with an illustrative embodiment of our work.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word “may” is used in a permissive sense (i.e., meaning having the potential to), rather than the mandatory sense (i.e., meaning must). Similarly, the words “include,” “including,” and “includes” mean including, but not limited to. When used in the claims, the term “or” is used as an inclusive or and not as an exclusive or, unless otherwise indicated. For example, the phrase “at least one of x, y, or z” means any one of x, y, and z, as well as any combination thereof.

As required, detailed embodiments of the systems, devices, and methods are disclosed herein; however, it is to be understood that the disclosed embodiments are merely exemplary of the graphical interfaces, systems, devices, and methods of use, which can be embodied in various forms. Therefore, specific structural and functional details disclosed herein are not to be interpreted as limiting, but merely as exemplary embodiments of at least part of the claims and as a representative basis for teaching one skilled in the art to variously employ the systems, devices, and methods in virtually any appropriately detailed structure. Further, the terms and phrases used herein are not intended to be limiting; but rather, to provide an understandable description of the interfaces, systems, devices, and methods (hereinafter referred to as ISDM). While the specification concludes with claims defining the features of the ISDM that are regarded as novel, it is believed that the ISDM will be better understood from a consideration of the following description in conjunction with the drawing figures, in which like reference numerals are carried forward when most appropriate. When not most appropriate, the same terminology is attempted to be used for the same component, while the reference numerals are not necessarily carried out with following figures.

In the following detailed description, reference is made to the accompanying drawings which form a part hereof, and in which are shown by way of illustration embodiments that may be practiced. Herein various embodiments of the ISDM are described. It is to be understood that other embodiments may be utilized, and structural or logical changes may be made without departing from the scope of the present application. Therefore, the following detailed description is not to be taken in a limiting sense, and the scope of embodiments is further defined by the appended claims. In many of the different embodiments, features are similar. Therefore, to avoid redundancy, repetitive description and numeral identification of these similar features may not be made in some circumstances. It shall be understood, however, that description of a first-appearing feature applies to the later described similar feature and each respective description, therefore, is to be incorporated therein without such repetition.

Alternate embodiments may be devised without departing from the spirit or the scope of the invention. Additionally, well-known elements of exemplary embodiments of the ISDM will not be described in detail or will be omitted so as not to obscure the relevant details of the systems, devices, and methods.

Before the interfaces, systems, devices, and methods are disclosed and described, it is to be understood that the terminology used herein is for the purpose of describing particular embodiments only and is not intended to be limiting. The terms "comprises", "comprising", or any other variation thereof are intended to cover a non-exclusive inclusion, such that an ISDM that comprises a list of elements does not include only those elements but may include other elements not expressly listed or inherent to such ISDM. An element proceeded by "comprises . . . a" does not, without more constraints, preclude the existence of additional identical elements in the ISDM that comprises the element. The terms "including" and/or "having," as used herein, are defined as comprising (i.e., open language). The terms "a" or "an", as used herein, are defined as one or more than one. The term "plurality", as used herein, is defined as two or more than two. The term "another." as used herein, is defined as at least a second or more. The description may use the terms "embodiment" or "embodiments," which may each refer to one or more of the same or different embodiments without limitation of other possible embodiments.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values and of values herein or on the drawings are not intended to be limiting, referring instead individually to any and all values falling within the range, unless otherwise indicated herein, and each separate value within such a range is incorporated into the specification as if it were individually recited herein. The words "about", "approximately", "substantially" or the like, the symbol "~", or the equivalent, when accompanying a numerical value or other information, are intended to mean "for the most part" or "essentially" depending on the context. They are to be construed as indicating that some deviation from the word it qualifies is acceptable as would be appreciated by one of ordinary skill in the art to operate satisfactorily for the intended purpose. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be functionally reasonable or providing a reasonable tolerance for the elements mentioned. Ranges of values and/or numeric values are provided herein as examples only, and do not constitute a limitation on the scope of the described realizations. The use of any and all examples, or exemplary language ("e.g.," "such as", or the like) provided herein, is intended merely to better illuminate the exemplary realizations and does not pose a limitation on the scope of the realizations. No language in the specification should be construed as indicating any unclaimed element as essential to the practice of the realizations.

For the purposes of the description, a phrase using Boolean logic in the form "A/B" or in the form "A and/or B" or in the form "at least one of A and B" means (A), (B), or (A and B), where A and B are variables indicating a particular object or attribute. When used, this phrase is intended to and is hereby defined as a choice of A, or B, or both A and B, which is similar to the phrase "and/or". Where more than two variables are present in such a phrase, this phrase is hereby defined as including any one of the variables, any combination of any of the variables, and all of the variables, for example, a phrase in the form "at least one of A, B, and C" means any one of (A), (B), (C), (A and B), (A and C), (B and C), or (A, B and C).

Relational terms such as "first" and "second", "top" and "bottom", and the like may be used solely to distinguish one entity or action from another entity or action without necessarily requiring or implying any actual such relationship or order between such entities or actions. The description may use perspective-based descriptions such as "up"/"down", "back"/"front", "top"/"bottom", "right"/"left", "backward"/"frontward" "proximal"/"distal" and "perpendicular"/"parallel". Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent. In the following description, it is understood that terms such as "first", "second", "top", "bottom", "above", "below", and the like, are words of convenience in an attempt to align the reader in a certain direction and are not to be construed as limiting terms. The terms "top", "up", "upper", "bottom", "lower", "down" "vertical", "horizontal", "interior" and "exterior" and the like are intended to be construed in their normal meaning.

It will be appreciated that embodiments of the ISDM described herein may be comprised of one or more conventional processors and unique stored program instructions that control the one or more processors to implement, in conjunction with certain non-processor circuits and other elements, some, most, or all of the functions of the devices and methods described herein. The non-processor circuits may include, but are not limited to, signal drivers, clock circuits, power source circuits, and user input and output elements. Alternatively, some or all functions could be implemented by a state machine that has no stored program instructions, or in one or more application specific integrated circuits (ASICs) or field-programmable gate arrays (FPGA), in which each function or some combinations of certain of the functions are implemented as custom logic. Of course, a combination of these approaches could also be used. Thus, methods and means for these functions have been described herein.

The terms "program," "software," "software application." and the like as used herein, are defined as a sequence of instructions designed for execution on a computer system or programmable device. A "program," "software," "application," "computer program," or "software application" may include a subroutine, a function, a procedure, an object method, an object implementation, an executable application, an applet, a servlet, a source code, an object code, any computer language logic, a shared library/dynamic load library and/or other sequence of instructions designed for execution on a computer system. A "program," "software." "application," "computer program." or "software application" may also interact with AI agents and AI models.

The following detailed description is presented to enable a person skilled in the art to make and use the ISDM of the present disclosure. For purposes of explanation, specific details are set forth to provide an understanding of the present disclosure. However, it will be apparent to one skilled in the art that these specific details are not required to practice the embodiments of the present disclosure. Descriptions of specific applications are provided only as representative examples. Various modifications to the embodiments described herein will be apparent to one skilled in the art, and the general principles defined herein may be applied to other embodiments and applications without departing from the scope of the present disclosure. The present disclosure is not intended to be limited to the embodiments shown but is to be accorded the widest possible scope consistent with the principles and features disclosed herein. Given the extensive description and the many different foreseeable combinations and possibilities, it is understood that a skilled reader having reasonable knowledge in the art could combine different embodiments described herein to shape a different embodiment to achieve a desired result within the scope of the invention.

Lexicon

Analytical lens: generally refers to one or more of processing models, including mental models, applied to a narrative to provide insights and mappings, personality models representing a personality model (e.g., Elon Musk, Steve Jobs, Marcus Aurelius, Marie Curie . . . ) applied to a narrative to provide insights and mappings, and statistical models applied to a narrative to provide insights and mappings.

Artifacts: generally refer to digital materials, such as documents, content, reports, files, images, pictures or forms, inter alia, that provide evidence or context that either are pertaining to, or are characterizing any component of a narrative. Artifacts may be composed of many types of digital element, including multimedia elements (e.g., audio, video). It is worth mentioning that artifacts may be unstructured or tacit, such as documents and images, or may be structured. Artifacts may be user-generated, such as documents, pictures, emails, notes, etc., or system-generated, e.g., as AI-generated summary, prompts, system-generated tags, system-generated weights, docket entries, system-generated connection databases, etc. Artifacts may be intended for display or for background processing only. For instance, provided artifacts may include milestones marking notable portions of evolution in the story.

Augmented Reality Overlays (ARHUI): generally refer to projections of digital information (e.g., holograms, text, images . . . ) onto the physical world via glasses, contact lenses, or implants, blending real and virtual environments. Users can interact through eye tracking, subtle gestures, or voice commands . . . .

Brain-Computer Interaction (BCI): generally refers to means for communicating between the brain and devices using non-invasive (e.g., EEG headsets) or invasive (e.g., neural implants) methods to control interfaces, bypassing physical actions like gestures or speech.

Chronology: generally refers to a temporal sequencing of story-components, e.g. narrative occurrences ordered as a timeline for coherent structured story. Broadly, chronology includes any occurrences ordering, e.g., a timeline rendering occurrences by date, a temporal structure adapted to reflect a time-based evolution.

Curation: generally refers to selection, organization, cleaning, validation, annotation and labeling, preservation, quality control, duplication removal of information elements to transform raw data into a valuable, reliable, and usable asset, especially critical for the training, performance and reliability of AI models.

Elements: generally refer to as encompassing a broad range of data, information, documents and digital content collated and assembled in a story. Elements are generally storytelling components disposed along a graphical timeline.

Events: generally refer to occurrences set at a precise moment in time. Generally enabled by a collaborator or by a computer system. E.g., receiving a filing receipt, a meeting request, crossing a milestone . . . .

Evolution: generally refers to a change of state of a story, e.g., a new story artefact, a collaborator intervention, a change of physical state, a change of location, a change of mental state such as understanding, knowledge, etc.

Gesture-Based Spatial Interfaces (GSI): generally refer to the use of hand, body, or facial movements to manipulate 3D digital spaces, captured by cameras or wearable sensors, eliminating or complementing traditional input devices like mice or keyboards.

Haptic Feedback Immersion (HFT): generally refers to interfaces that use tactile sensations (e.g., vibrations, pressure, temperature, . . . ) delivered through wearables, gloves, seat or skin patches to simulate touch in virtual or remote environments.

Narrative: generally refers to a structured content and flow thereof forming a story. The information elements can be linked within the narrative structure with a variety of possible linkages establishing commonalities (e.g., text, content, creator, commonality . . . ), relations (e.g., attributes, contributors/collaborators, versions, . . . ), causality (e.g., timely occurrence, versions, event-reaction, antecedent, . . . ), timing (e.g., chronological order, sequence of artifacts . . . ), graphical (e.g., connecting lines, distinctive visual features, workspace structure, . . . ), hierarchical (e.g., sequential, alphabetical, progression, workflow . . . ), among others. A narrative can have different points of views. A single point of view can be provided by a single contributor. Multiple points of view could be collectively provided from many contributors.

Narrative framework: generally refers to a structured framework, implemented as a data model, based on which storytelling takes place in a comprehensive manner for the user. Objects of the narrative structure are to enhance user comprehension, retention, and recall through engaging storytelling. Broadly, narrative framework includes any story framework; e.g., a linked event chain processed for display. According to embodiments, a narrative structure may involve an element sequencing to build the story in a chronological sequence.

Narrative intelligence: generally refers to the capability of a system, through e.g., an interface, to understand, organize, present, interpret, analyze narratives—stories or storylines—that shape perception, disclosure discourse, and decision making. This concept goes beyond simply telling stories; it encompasses recognizing how narratives form, spread, and influence audiences across various media platforms. Narrative intelligence also interrelates information elements in a manner that reflects the structure and logic of human narrative/storytelling. Key aspects of narrative intelligence include: Listening and detection—monitoring conversations, news, and social media to detect emerging narratives in real-time. Understanding and analysis—interpreting the structure, themes, and emotional resonance of narratives and identifying influential actors, patterns of information flow, and the dynamics within online communities. Contextual enrichment—adding context to detected narratives to better understand their origin, evolution, and potential impact. Threat assessment and response—evaluating the risk posed by harmful and manipulated narratives (such as disinformation or narrative attacks) and taking proactive steps to mitigate reputational or operational harm. Further aspects include the ability to sequence, link, and contextualize data or documents so that users can intuitively follow, reconstruct, and understand the interrelations, significance and evolution of events, tasks, or other types of knowledge elements as a coherent narrative, generally over an intuitive collation function, like a time sequencing function providing a chronology. Narrative intelligence can also relate to the application of machine learning models and artificial intelligence to understand, generate, and manage information using storytelling frameworks and human behaviors, particularly when navigating a graphical user interface with timelines. It's about how AI can process and present data in a way that mimics human narrative understanding, making complex information more accessible and intuitive, especially in the context of document management and user interaction with interfaces. Narrative Intelligence can also be considered a multidisciplinary field drawing from cognitive science, psychology, linguistics, anthropology, and data analytics to provide a comprehensive understanding of how stories influence behavior and social trends.

Occurrence: generally refers to anything taking place in the story, with the occurrences generating evolution of states of participants in the story. Broadly, the occurrences are driving story progression, including e.g., user interaction, dialogues, addition of artifacts, change of state, . . . . The number and the pace of occurrences can also be material for understanding the narrative.

Outlier model and other models, algorithms for defining framework: generally refer to as a tool of storytelling, a statistical outlier model can be applied to a set of narrative components with content and metadata by analyzing numerical features extracted from both, such as content length, word frequency, time distribution or metadata attributes like timestamps or user IDs. The model can calculate statistical measures (e.g., mean, standard deviation, or z-scores) to identify elements that deviate significantly from the norm in some cases. For instance, in a dataset of social media posts, an outlier model might flag posts with unusually high engagement metrics or anomalous posting times. By combining content-based features (e.g., sentiment scores) and metadata (e.g., geolocation or device type), the model can detect irregularities, such as spam or fraudulent activity, with greater precision.

Participant: generally refers to any entity having a role in the story, the role being either active or passive, depending on the participant initiating an event, participating in an event, or being subject of the event. Broadly, participants may include characters, groups, objects, etc.

State (of participant): generally refers to conditions in which participants to a story are at any moment in the story. States refer also to any contexts that may provide improved understanding of the story, such as statement of conflicts, etc.

Status (of a workflow item): generally refers to a level of completion of a workflow item or a story component. Status typically refers to a descriptor or indicator of the current condition, progress, or outcome related to an object, process, or entity. Status might be used to indicate: the progress of a document (e.g., 50% complete, pending approval, rejected); the result of an action (e.g., upload successful, error, processing); the health or operational condition of a system (e.g., online, offline, error, maintenance); the legal or administrative standing of a patent application (e.g., filed, published, granted, under examination), etc.

Story: generally refers to a coherent sequence of story-components organized into a narrative, implemented as a data structure in a system.

Storytelling: generally refers to the process of organizing story-components and providing information relative to a story into coherent structure, generally executed according to timelines and algorithms, leveraging contextual distribution of information, engagement and pattern recognition to enhance user comprehension, interaction and retention. Storytelling can also be referred to as the action of telling a story that could be performed by AI via an avatar.

Storytelling customization: generally refers to any process through which the storytelling is customized to the user, through story processing preferences and visual delivery preferences, e.g., though filtering, analytical lenses, selection of subjects or topics, of theme, of files, of customization preferences, of a perspective selection, of a covered time period, of visual preferences, of a narrative voice, of a level of abstraction, of a level of relevance of proximity, of a granularity, etc. According to an embodiment, storytelling tone, at least some of the customization parameters are available to the user. Some storytelling customizations may result from feedback loops though which the narrative framework may be refined over multiples steps.

Storytelling interface: generally refers to all elements perceptible by the collaborator through which a story can be provided to the collaborator. Storytelling interface is intended to include elements used to provide references to the story, such as timelines, and elements specific to the story, such as artifacts, emotions and tone.

User: generally refers to any human, contributor, collaborator, person, virtual agent, e.g., AI agent, or system being presented a narrative, and capable of interacting with the narrative, selecting, navigating, modifying parameters influencing the way the narrative is provided thereto or influencing the behavior of a machine learning model. According to a general point of view, since the narrative is designed to be narrated to an audience, the user could be by default the intended audience of the storytelling.

Storytelling objectives: generally refer to for evaluating storytelling, objects of the storytelling are bringing additional cues to the narrative structure to perform storytelling that matches the user's goals. Therefore, a specific effectiveness evaluation framework has been developed in relation thereof. The evaluation framework comprises at least some of the following parameters: Engagement: generally refers to for evaluating storytelling, engagement refers to the emotional and cognitive involvement of users in the storytelling, facilitated by features like interactive visuals, improving retention and satisfaction. Broadly, any measurable user involvement; specifically, real-time story interactions, tracked by the system. It may include evaluation of the impact of the pace associated with the storytelling. Immersion: generally refers to for evaluating storytelling, immersion refers to the deepness of absorption of users in the storytelling, driven by a system features like multimedia and interactivity, enhancing emotional connection. Interactivity: generally refers to for evaluating storytelling, interactivity refers to the capability of users to actively customize the storytelling through inputs, processed by a system, enhancing engagement and personalization. Truthfulness: generally refers to for evaluating storytelling, truthfulness refers to the level of skewness of the perception of the users relative to the story. The higher the truthfulness, the less skewed the storytelling generates, and thus the more consistent the interpretation of a user interpreting directly all artifacts or the story versus the perception of the user of the storytelling. Such parameter may include, e.g., determination if the perceptible purpose of the storytelling matches the intended purpose of the storytelling. Retention: generally refer to for evaluating storytelling, retention refers to the ability of users to remember a story, facilitated by structures like visual timelines, which enhances long-term engagement.

Voice-Driven Contextual Systems (VCS): generally refers to natural language interfaces that process spoken commands in context, using AI to interpret intent and deliver responses via audio, visuals, or haptic feedback, integrated into environments like homes or vehicles.

Artificial Intelligence

With respect with artificial intelligence, hereinafter referred to as AI, generally refers to the simulation of human intelligence processes by machines, especially computer systems. These processes include learning (i.e., the acquisition of information and rules for using the information), reasoning (i.e., using rules to reach approximate or definite conclusions), and self-correction. In the context of the present invention, AI encompasses machine learning models, deep learning networks, expert systems, natural language processing, computer vision, and other computational techniques that enable systems to perform tasks that typically require human intelligence. This includes, but is not limited to, the ability to analyze data, recognize patterns, make decisions, and adapt behavior based on new information or experiences, particularly in the context of document management and ordering, narrative structures, storytelling and user interface navigation. An AI system generally provides a digitally generated, dynamically optimized, or adjusted method for executing an activity to meet a condition(s) of, for instance, a project with different phases, events, actions, tasks among other workflow separation items. Exemplary activities in the field of intellectual property could include a project of preparing and filing a patent application with different steps that could be exemplified as follows: a) Performing a prior art search; b) Drafting the application; c) Filing the application; and d) Receiving the filing receipt. A first condition would be to start phase b) once phase a) is completed. A second condition could be to begin step c) when step b) is completed. A third condition would be step d), which is conditional to step c). This exemplary logic can be applied to different fields, like for instance, the field of construction including clearing, grading, excavation, drilling foundation, pouring concrete, woodworking, system buildout, melting, pouring, cooling, transporting, melting materials, filtering materials, heating materials, transporting materials, laminating, forging, casting materials, and the like. Exemplary conditions include temperatures, pressure, speeds, time, time/schedule condition(s), budget/cost condition(s), a quality condition, a health condition and the like. The AI system can be configured to receive inputs in the form of a plurality of input datasets that impact the project. The AI system can be configured to process input datasets using one or more different ensembles of machine learning models. The AI system can be configured to general digital models executable to accomplish in an optimized fashion the method in view of variable conditions to reach the conditions while considering values, weights, preferences, proximity and the like.

For the purpose of the present description, when not specified, AI and AI systems are generally intended to refer to, inter aa, any one of the following types of AI that are: Vector ML model networks that refer to a machine learning (ML) process, called deep learning, that uses interconnected nodes or neurons in a layered structure that resembles the human brain. Rule-Based Systems that use predefined rules and logic for decision-making. Examples of such AI may be expert systems like decision trees for medical diagnosis. Genetic Algorithms (GAs) that refers to evolutionary algorithms inspired by natural selection, and that is most commonly used for optimization problems where traditional methods fail. Support Vector Machines (SVMs) that refers to supervised learning models for classification and regression, which is effective in high-dimensional spaces. Bayesian Networks that refer to probabilistic graphical models that represent variables and their dependencies, and that is good for reasoning under uncertainty. K-Nearest Neighbors (KNN) that is an instance-based learning algorithm, and that is used for classification or regression by comparing data points to their nearest neighbors. Decision Trees and Random Forests that are tree-structured models for decision-making, which use random forests that are an ensemble of decision trees for better accuracy. Linear and Logistic Regression that refers to statistical models for regression and binary classification. Such AI is most commonly used for processes such as predicting sales trends or credit default risk. Reinforcement Learning (without Deep Learning) that refers to agents learn by interacting with an environment and receiving rewards. An example of such as AI is a game-playing AI like early versions of AlphaGo. Fuzzy Logic that refers to models with uncertainty and imprecision using "degrees of truth". Markov Models that refer to models using sequential data where the future state depends only on the current state. Clustering Algorithms that refer to unsupervised learning methods like K-means or hierarchical clustering, which can be used for example for grouping customers based on purchase behavior. Symbolic AI can use symbols and logic to represent and solve problems.

For the purpose of the present description, the following terms and definitions related to AI are used: A large language model (LLM) generally refers to a type of computational model designed for natural language processing tasks such as language generation. As language models, LLMs acquire these abilities by learning statistical relationships from vast amounts of text during a self-supervised and semi-supervised training process. Other types of models are equally contemplated like Small Language Models (SLM).

A generative pre-trained transformer (GPT) is a type of large language model (LLM) and a prominent framework for generative AI. It is an artificial neural network that is used in natural language processing by machines. It is based on the transformer deep learning architecture, pre-trained on large datasets of unlabeled text, and able to generate novel human-like content. As of 2023, most LLMs had these characteristics and are sometimes referred to broadly as GPTs. While transformers dominate, some frontier or near-frontier models are exploring alternative or hybrid architectures to overcome limitations like quadratic computational complexity ($O(n^2)$ for sequence length n) and high memory demands. Below are notable alternatives being researched or deployed, particularly in open-source or experimental contexts: State Space Models (SSMs) such as the Mamba architecture, offer linear computational complexity (O(n)), making them more efficient for long sequences compared to transformers. They are related to recurrent neural networks (RNNs) and convolutional neural networks (CNNs) but use a selective state mechanism to model long-range dependencies effectively.

Mamba, a pure SSM that achieves linear-time sequence modeling, showing up to 50% reduction in inference latency and improved scalability for long contexts compared to transformers. It has been tested in open-source settings and performs competitively on benchmarks but lags slightly behind top transformer models in some tasks. Jamba: A hybrid model from AI21 Labs combining transformer layers with Mamba-like SSM components. It offers a 256K context window and fits 140K tokens on a single GPU, addressing memory bottlenecks. Jamba is one of the first production-grade SSM-based models, though it still incorporates transformer elements for performance.

LangChain generally refers to a software framework that helps facilitate the integration of large language models (LLMs) into applications. As a language model integration framework, LangChain's use-cases largely overlap with those of language models in general including document analysis and summarization, chatbots, and code analysis. Key Features of LangChain could be separated in categories and sub-categories. 1) Modular Design: a) Prompt Management: Tools for constructing, templating, and optimizing prompts. b) Chains: Sequences of actions where LLMs are combined with other functions (e.g., API calls, database queries, internet access). c) Memory: Frameworks for incorporating short-term and long-term memory into applications, enabling context awareness across conversations. d) Integration: Connects with APIs, databases, and custom functions to process, retrieve, or transform data. e) Supports tools like Python functions, search engines, and document loaders. 2) Document QA and Retrieval: Offers modules for retrieving and querying information from large text corpora or external data sources using vector databases. 3) Versatility: Suitable for tasks such as summarization, question-answering, chatbot development, and more. 4) Customizability: Allows users to fine-tune workflows and incorporate specific logic based on their application needs. LangChain is commonly used with libraries like OpenAI®, Hugging Face®, or other LLM providers and can be deployed for diverse use cases across industries.

An Intelligent Agent (IA or AI agent) can be defined in some instances as an agent that perceives its environment, takes actions autonomously in order to achieve goals, and may improve its performance with learning or acquiring knowledge. An IA may be simple or complex: A thermostat or other control system is considered an example of an intelligent agent, as is a human being, as is any system that meets the definition, such as a firm, a state, or a biome. An agent has a "condition function" that encapsulates all the IA's goals. Such an agent is designed to create and execute whatever plan will, upon completion, maximize the expected value of the condition function. Key Characteristics of AI Agents: 1) Perception: Agents receive input from their environment, which could be data, user inputs, or sensor readings. 2) Processing: They analyze the input using algorithms or models to decide on the best course of action. 3) Action: Agents interact with their environment by performing tasks or making changes, often through actuators or commands. 4) Autonomy: Agents operate with a degree of independence, making decisions without requiring constant human intervention. 5) Learning: Many agents incorporate machine learning to improve their decision-making capabilities over time. Types of AI Agents: 1) Reactive Agents: Respond to current perceptions without storing past states (e.g., simple chatbots). 2) Proactive Agents: Make decisions based on both current and predicted future states (e.g., recommendation systems). 3) Interactive Agents: Engage with users or systems through dialogue and can adapt based on interactions (e.g., conversational AI like ChatGPT™). Agents are foundational in AI for tasks ranging from robotics and automation to virtual assistants and decision-making systems.

Retrieval Augmented Generation (RAG) is a technique that grants generative AI models information retrieval capabilities. It modifies interactions with a LLM so that the model responds to user queries with reference to a specified set of information elements, using this information to augment information drawn from its own vast, static training data. This allows LLMs to use domain-specific and/or updated information. Use cases include providing chatbot access to internal company data, giving factual information only from an authoritative source, summarization and reporting and question answering systems.

The realizations will now be described more fully hereinafter with reference to the accompanying figures, in which realizations are illustrated. The foregoing may, however, be embodied in many different forms and should not be construed as limited to the illustrated realizations set forth herein. Our work is now described with reference to the figures. In the following description, for purposes of explanation, numerous specific details are set forth in order to provide a thorough understanding of the present invention by way of embodiment(s). It may be evident, however, that the present invention may be practiced without these specific details. In other instances, when applicable, well-known structures and devices are shown in block diagram form in order to facilitate the description of embodiments of the present invention.

Referring now to FIG. 1 that illustrates a general AI device 100 according to possible embodiments of the present description. The AI device 100 may be implemented by a stationary device or a mobile device, such as a TV, a projector, a virtual reality headset, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, inter alia. The AI device 100 may include a communication unit 110, an input unit 120, a learning processor 130, a sensing unit 140, an output unit 150, a memory 170, and a processor 180. The communication unit 110 is adapted to transmit and receive data to and from external devices such as other AI devices and an AI server 200 (FIG. 2) by using wire/wireless communication technology. For example, the communication unit 110 may transmit and receive sensor information, a user input, a learning model, and a control signal to and from external devices.

The communication technology that may be used by the communication unit 110 includes, inter alia, GSM (Global System for Mobile communication), CDMA (Code Division Multi Access), LTE (Long Term Evolution), 5G, WLAN (Wireless LAN), Wi-Fi (Wireless-Fidelity), Bluetooth®, RFID (Radio Frequency Identification), Infrared Data Association (IrDA), ZigBee, NFC (Near Field Communication), and the like. The input unit 120 is adapted to acquire various kinds of data, including model learning data, and operation data. The input unit 120 may include sensor(s), including a camera for inputting a video signal, a microphone for receiving an audio signal, a user input unit for receiving information from a user, bio feedback, etc.

The learning processor 130 is adapted to learn a model using LLM of: e.g. an artificial neural network, by processing learning data. The learned artificial neural network may be referred to as a learning model. The learning model may be considered an inferred result that may be used as a basis for determination to execute operation(s). The output unit 150 is adapted to transmit an output, e.g., a machine-processable output, a visual output, graphical interface output, an auditory output, or a haptic output. The memory 170 is adapted to store data that supports various functions of the AI device 100. For example, the memory 170 may store executable code, input data acquired by the input unit 120, learning data, a learning model, a learning history, information elements, user behavior data and the like. The processor 180 is adapted to execute operations of the AI device 100. The processor 180 may control the components of the AI device 100 to execute the determined operation. To this end, the processor 180 may request, search, receive, or utilize data of the learning processor 130 or the memory 170. The processor 180 may control the components of the AI device 100 to execute operation(s).

Figure 2:
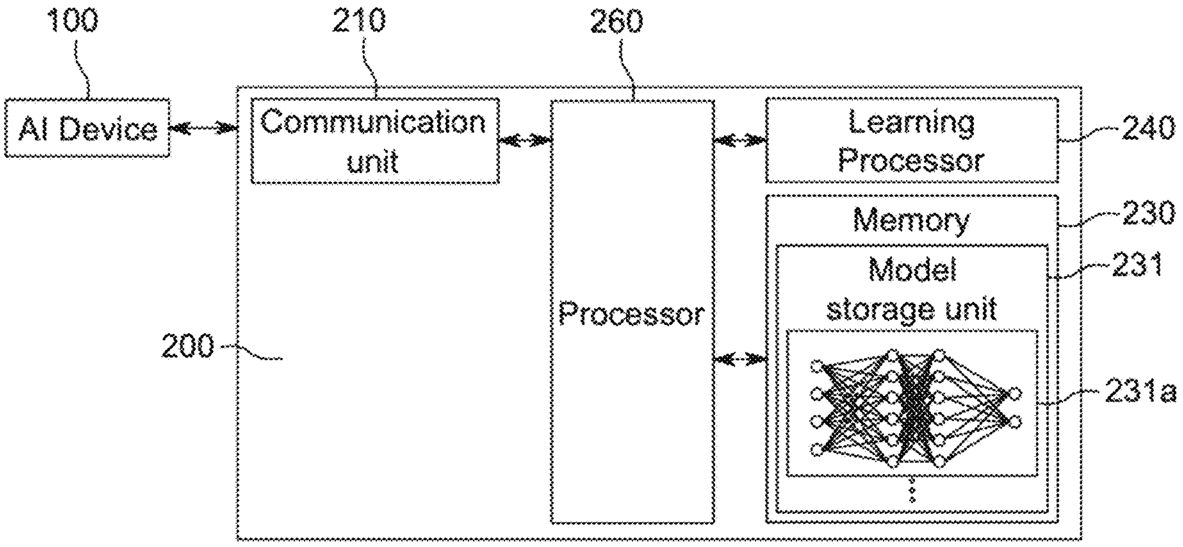
FIG. 2 is a schematical depiction an exemplified AI server in accordance with an illustrative embodiment of our work.

FIG. 2 illustrates an exemplary AI server 200 according to an embodiment of the present invention. The AI server 200 may refer to a device that learns e.g., an artificial neural network, by using a machine learning algorithm or uses a learned artificial neural network. The AI server 200 may include one or a plurality of servers to perform distributed processing. The AI server 200 may include a communication unit 210, a memory 230, a learning processor 240, a processor 260, and the like. The communication unit 210 is adapted to transmit and receive data to and from an external device such as the AI device 100. The memory 230 may include a model storage unit 231. The model storage unit 231 may store a learning or machine learning model or an artificial neural network 231*a* through the learning processor 240. The learning processor 240 is adapted to learn the machine learning model stored in the model storage unit 231 by using learning data. The learning model may be implemented in hardware, software, or a combination of hardware and software, with the latter involving executable code stored in memory 230. The processor 260 is adapted to execute operations outside the operations executed by the learning processor 140, including control of components of the AI server 200. According to embodiments, the processor 260 and the learning processor 240 may be distinct or physically integrated into a common processor, sharing or sequencing processing time and capabilities.

Figure 3:
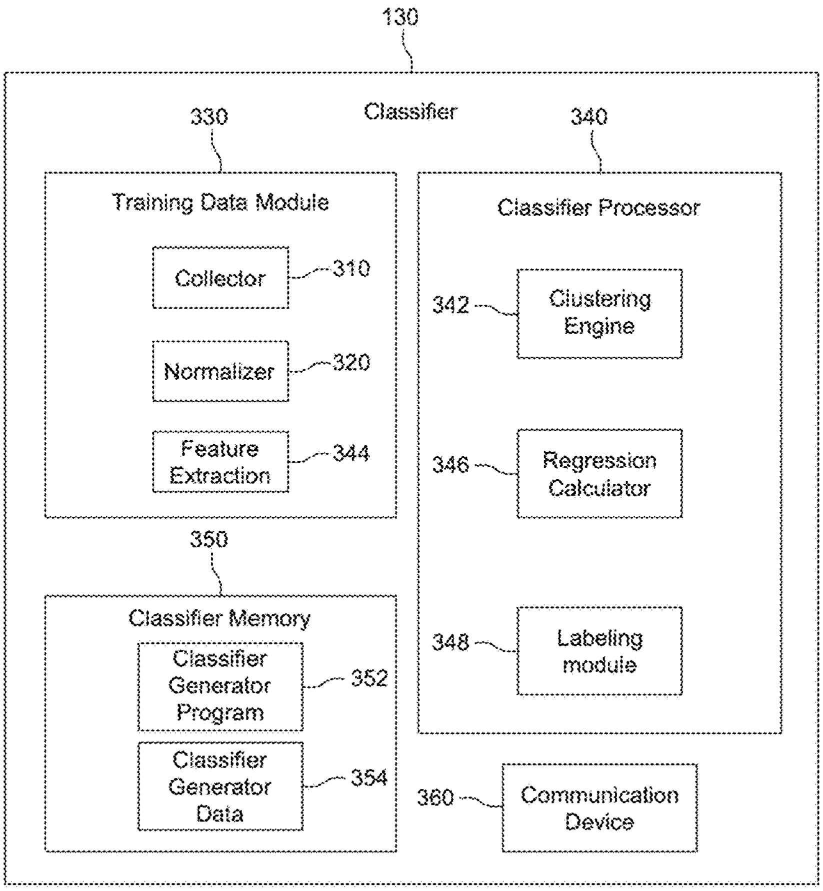
FIG. 3 is a block diagram of an exemplary AI system in accordance with an illustrative embodiment of our work.

FIG. 3 schematically illustrates a block diagram of an illustrative AI system, AI system 300 may include a training data module 350, a classifier processor 340, a memory 350, and a communication module 360. In some embodiments, AI system 130 may be configured to generate a data to be used as a training dataset by model generator. The data module 330 may include a data collector 310, a data normalizer 320, and a feature extraction module 344. The classifier processor 340 may include a clustering engine 342, regression calculator 346, and labeling module 348. The classifier memory 350 may include one or more storage devices configured to store instructions used by classifier processor 340 to perform functions related to disclosed embodiments. For example, classifier memory 350, persistent or not, may store software instructions, such as classifier generator program 352 and classifier generator data 354 that may perform one or more operations when executed by classifier processor 340.

Figure 4:
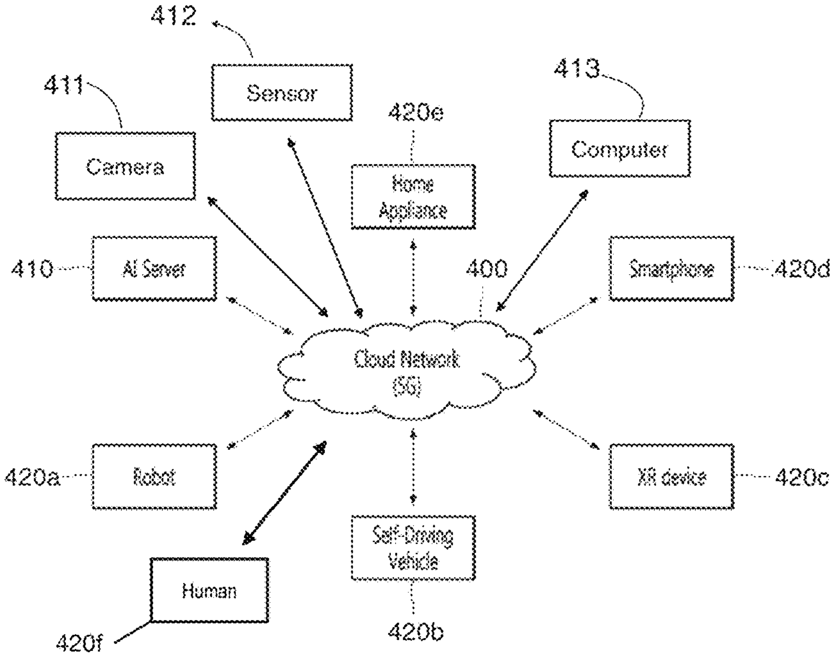
FIG. 4 is a schematical depiction of an exemplified AI system in accordance with an illustrative embodiment of our work.

Referring to FIG. 4 that illustrates an AI system according to an embodiment of the present invention. In the AI system one or more, AI server 410 (depicted as a single server for illustrative purposes) is in communication through a, e.g., cloud network 400, with a plurality of AI devices 420 involved in the execution of a process. Examples of devices include a computer 413, a sensor 412, a camera 411, robot 420*a*, a self-driving vehicle 420*b*, an VR device 420*c*, a smartphone 420*d*, a home appliance 420*e* or other VR devices. It is to be noted that according to the nature of the process to be performed, and specific conditions, the nature and number of AI devices 100 may vary. It is further to be noted that FIG. 4 is a schematic illustration, and AI processing devices should not be considered mandatorily limited to the AI server(s), but may involve e.g., edge AI processing closer to the end AI devices 100. Given the state of technology, it is also contemplated that a human 420*f* is now adapted to be connected to the cloud network.

Figure 5:
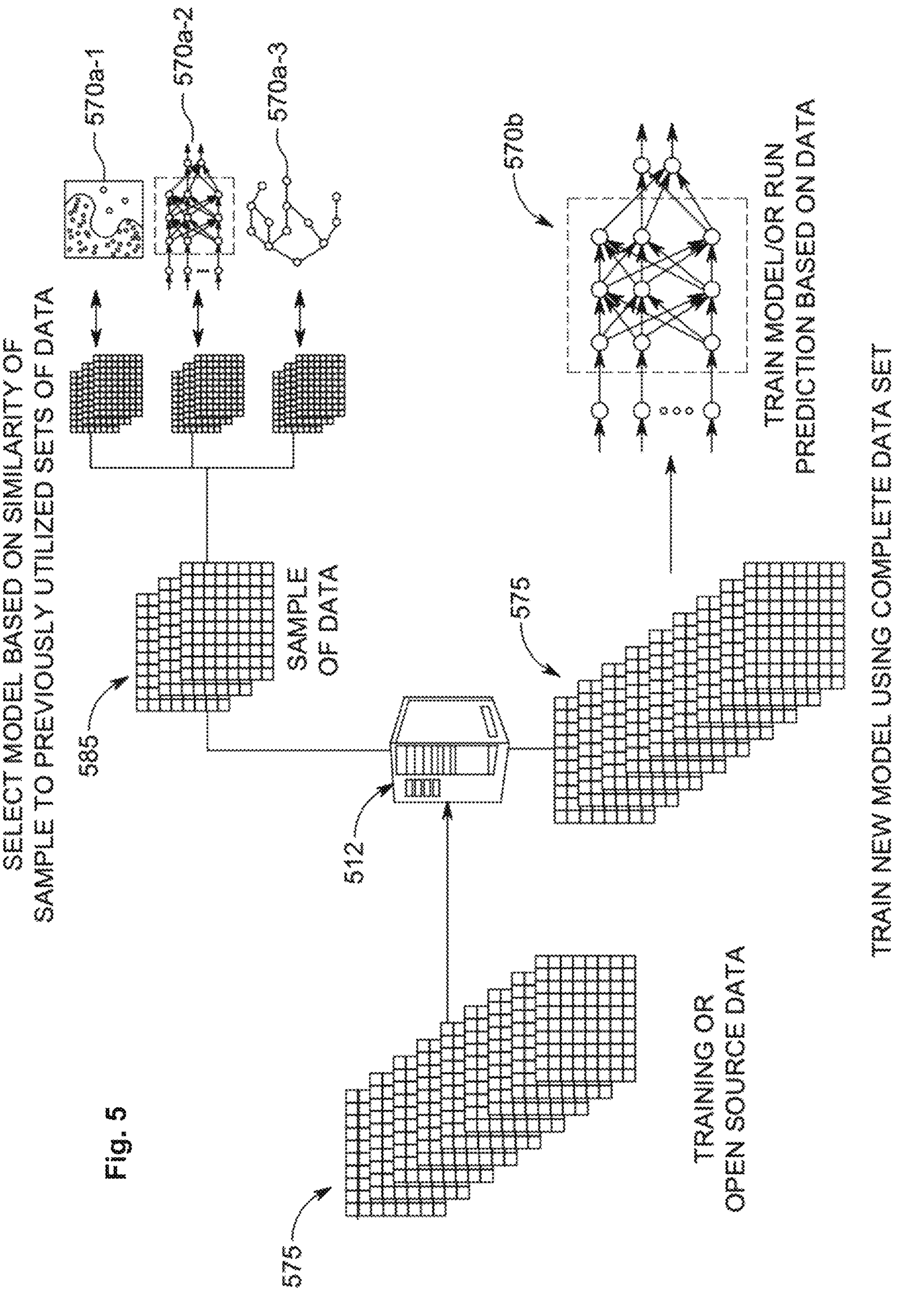
FIG. 5 is a schematical depiction of an exemplified AI training system in accordance with an illustrative embodiment of our work.

Referring to FIG. 5 illustrating views of aspects of one exemplary system in accordance with embodiments of the present disclosure. A system includes an AI server 512 or other computer device or machine associated with an AI engine. Where the AI server 512 receives data 575 (e.g., training data) from an end user, including user behavioral data or another source for the purpose of training a machine learning model, a sample 585 of the data 575 may be extracted on any basis and compared to sets of data that were previously utilized to generate or train machine learning models 570*a*-1, 570*a*-2, 570*a*-3. If the sample of the data is sufficiently similar to one of the previously utilized sets of data, then one of the models 570*a*-1, 570*a*-2, 570*a*-3 that was trained using the sufficiently similar one of the sets of data may be selected and provided to an end user for use in performing the task. Alternatively, where none of the sets that was previously used to train one of the models 570*a*-1, 570*a*-2, 570*a*-3 is sufficiently similar to the sample 585, the server 512 may train a machine learning model 570*b* using the data 575 and, upon validating and testing the model 570*b*, distribute the model 570*b* to one or more end users.

Where an AI engine trains a machine learning model for the performance of a given task by one or more end users, a baseline machine learning model may be distributed to the end users for use in performing the task. The end users may further continue to refine the trained machine learning model, based on data captured or obtained by any of the end users during the performance of the task. Each of the end users may return data, including e.g., a summary of the differences between their respectively trained models and the baseline model, to the AI engine, which may consider such differences, and any newly available data, when training and further updating the baseline model for use in the performance of the given task. Accordingly, machine learning models may be continuously evolving and distributed among connected end users.

Figure 6:
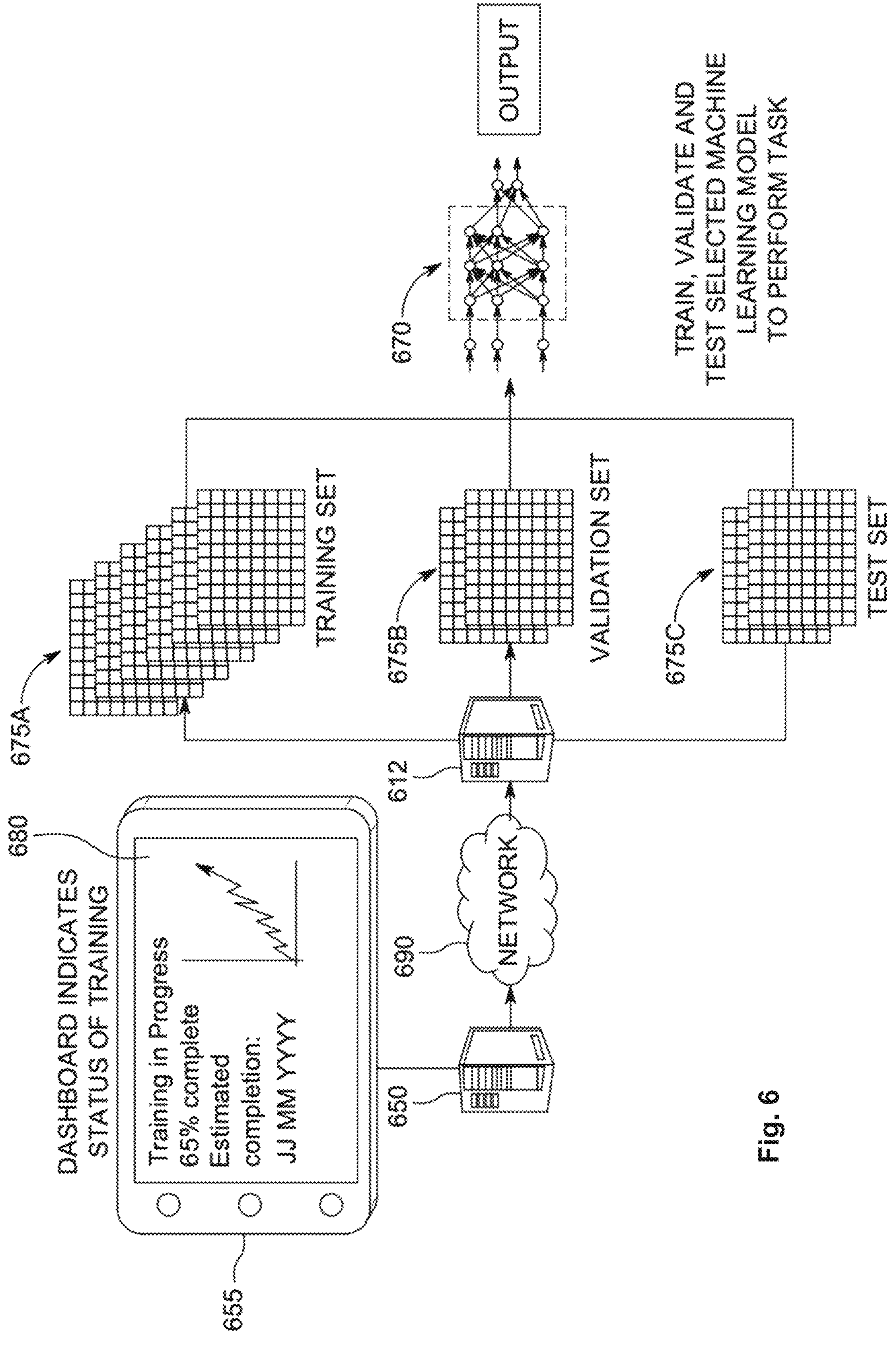
FIG. 6 is a schematical depiction of an exemplified AI training system in accordance with an illustrative embodiment of our work.

Referring to FIG. 6, generation and refinement of machine learning models may involve a system that includes a server 612 associated with an AI engine or other data processing system. The training data 675 may include any type or form of data (e.g., raw data obtained or generated by the end user or a plurality of collaborators, or open-source data and contextual behavioral data) for generating a machine learning model for performing a given task, as well as any annotations, labels or other identifiers associated with the performance of the task. The server 612 is configured to receive the training data 675, and to select one of e.g., a plurality of machine learning models 670, for performing the task on any basis. For example, in some embodiments, the server 612 may select one of the machine learning models 670 based on a sample of the training data 675, or the task to be performed, or on any other basis.

A dashboard 680 or other user interface on a device 655 may show information or data regarding a status of a transfer of the training data 675 to the server 612 over the network 690. Upon receiving the training data 675, the server 612 may split or parse the training data 675 into a training set 675A, a validation set 675B and a test set 675C, and uses the respective sets of data 675A, 675B, 675C to train a selected machine learning model 670. For example, the server 612 may provide data points of the data 675A, 675B, 675C to the machine learning model 670 as inputs, and compare outputs received from the machine learning model 670 to annotations, labels or other data associated with the data point. Whether the machine learning model 670 is sufficiently trained may be determined based on a difference between outputs generated in response to the inputs and the annotations, labels or other data. When the machine learning model 670 is complete, the trained model 670 (e.g., a matrix of weights, of correlation factors, or other attributes of layers or neurons of an artificial neural network) may be transmitted to an end server 650 to process data that is specific to the end user during the performance of the task. A machine learning model may be selected to perform a computer-based task on any basis. For example, where training data is received from an end user for use in training a model to perform a task, and the training data is similar to data that was previously used to train a model, the model that was trained using the similar set of data may be provided to the end user for use in performing the task, and, alternatively or additionally, further trained by the end user.

Figure 7:
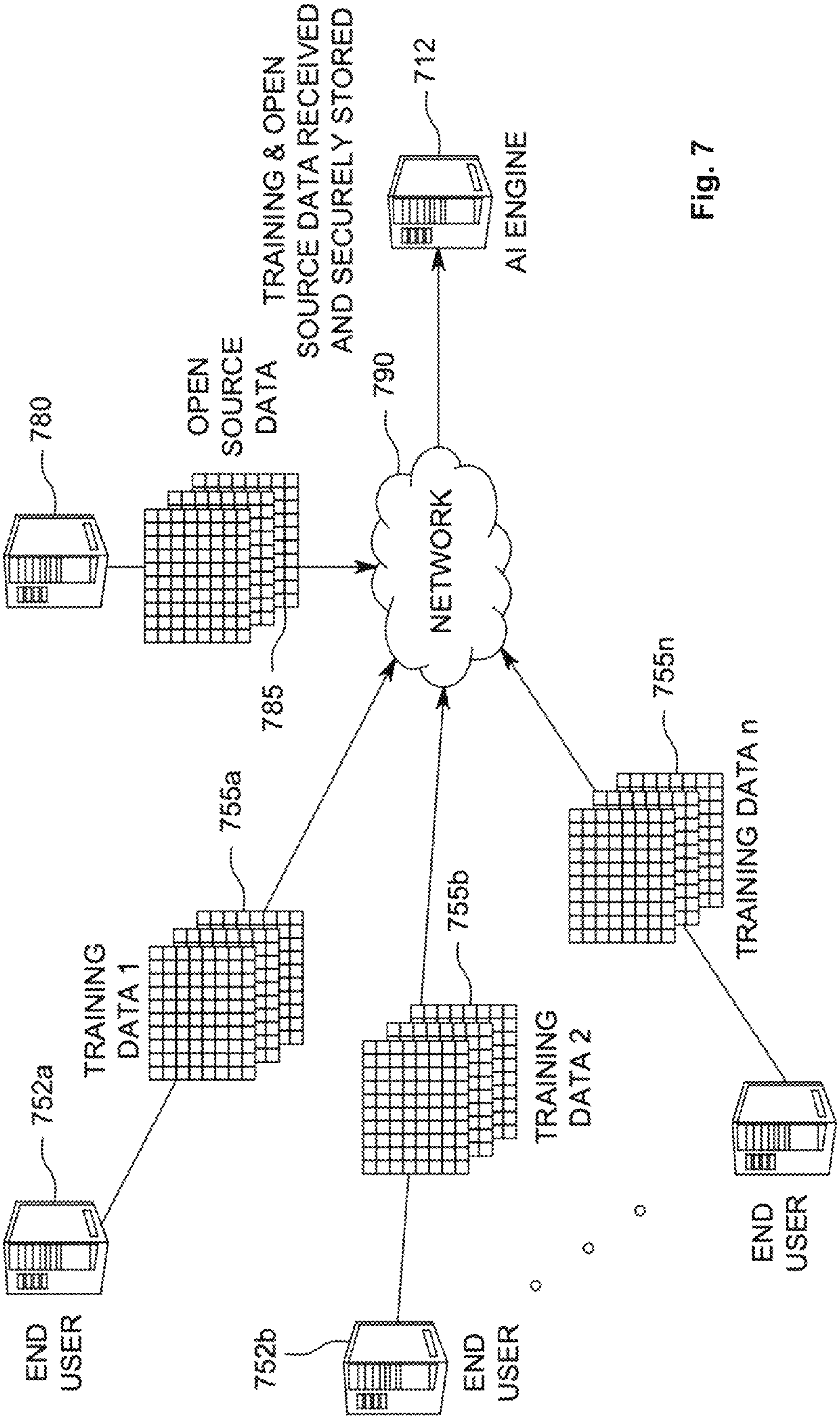
FIG. 7 is a schematical depiction of an exemplified AI training system in accordance with an illustrative embodiment of our work.

Referring to FIG. 7 illustrating that the other sources of data of variables sources may be used to improve machine learning models over time. FIG. 7 illustrates that over time data 775 from end users 752 may be transmitted over a network 790 to the server storing an AI Engine 712 and used to validate and improve the machine learning models, as data 785 from third-party 780 such as studies and tests.

Figure 8:
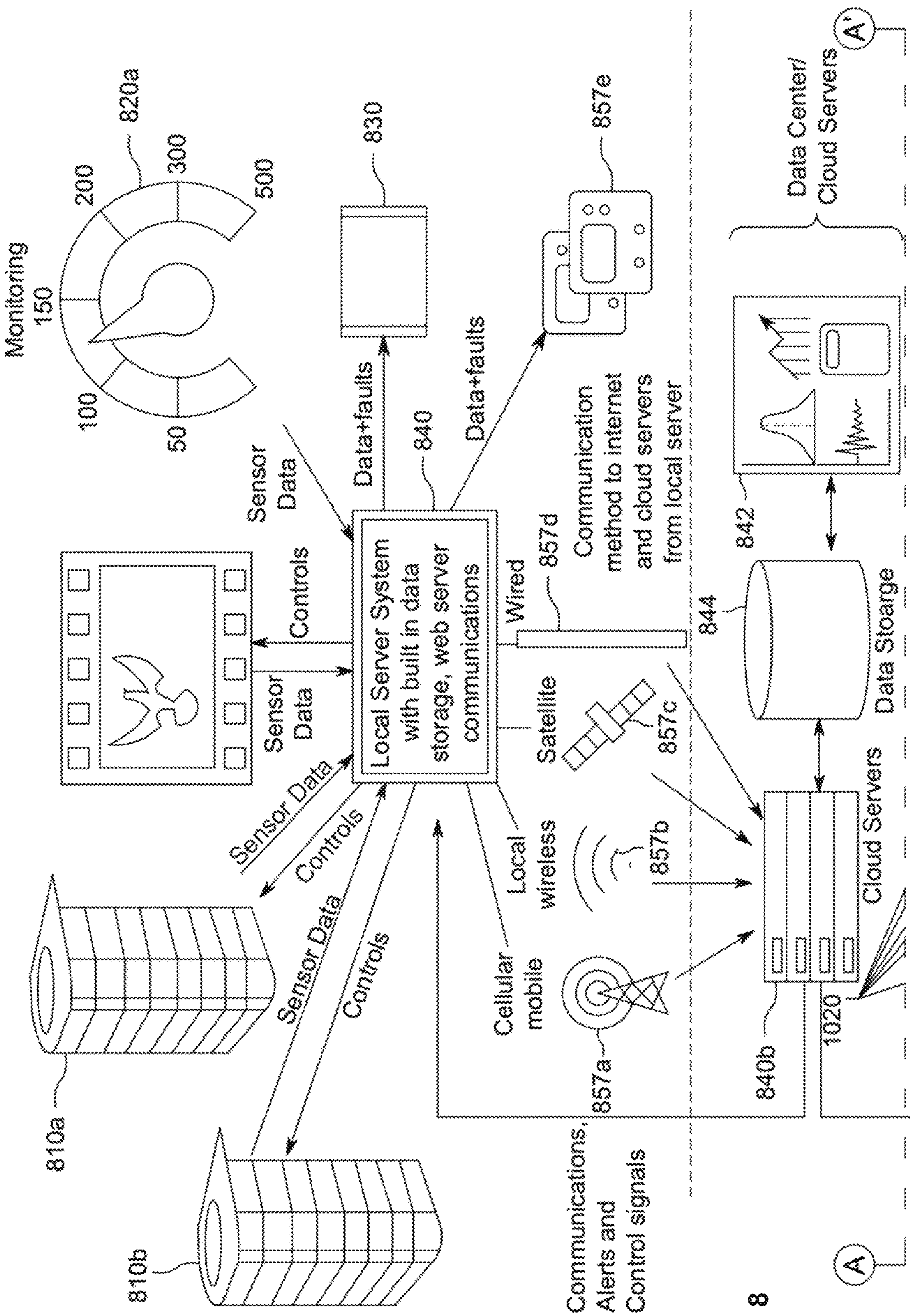
FIG. 8 (on two pages) is an illustrative of an ecosystem including an AI system in accordance with an illustrative embodiment of our work.
Figure 8:
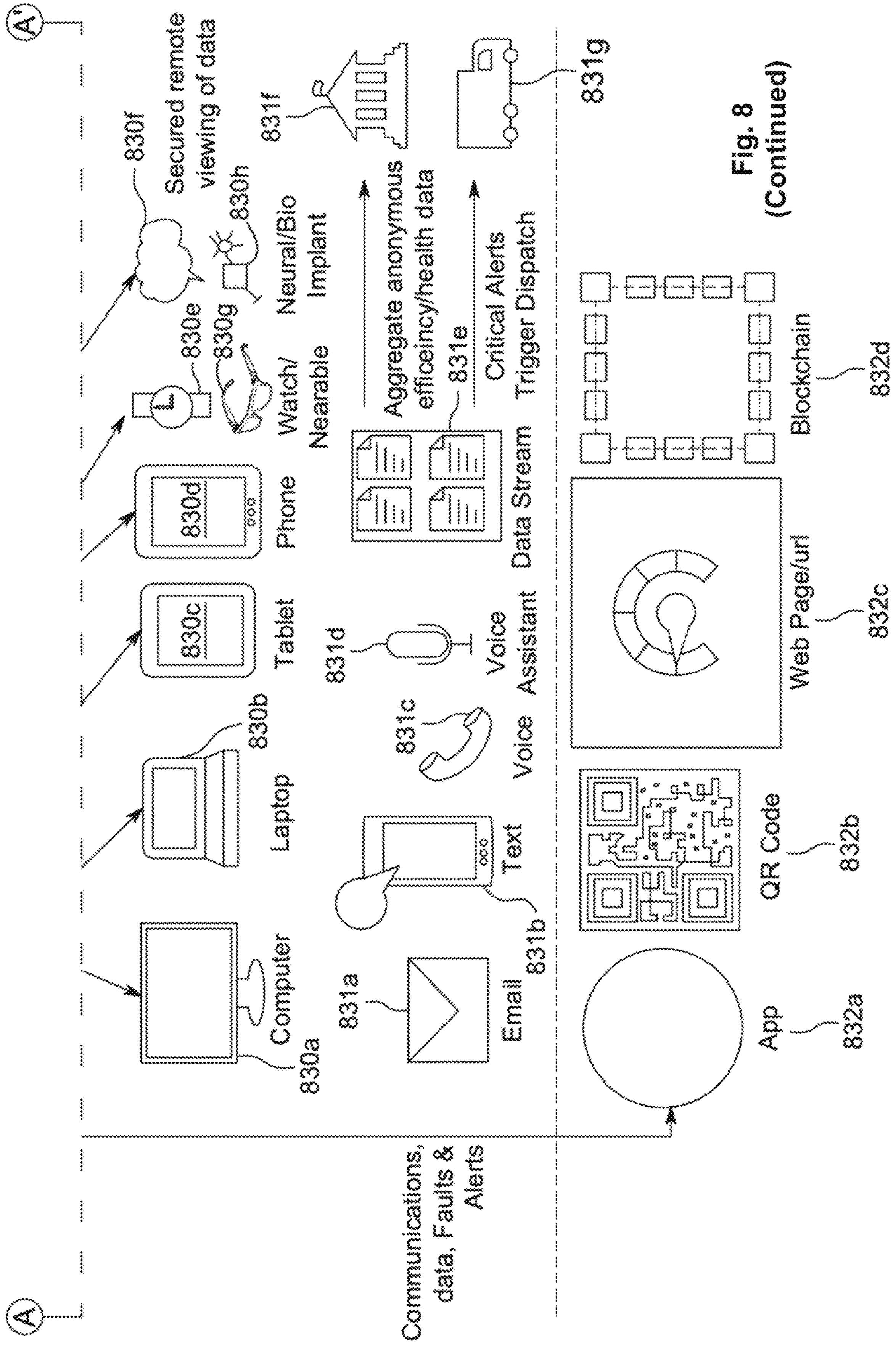

Referring to FIG. 8 that illustrates an ecosystem that may include a local server 840*a*, one or more operating units 810*a*, 810*b* potentially of different types, sensors 850*a* monitoring unit 820*a*, a computing device 830*a*, sensors 857*e*, communication hubs 857*a-d* to connect to a cloud server 840*b* comprising or connected to a file storage 844 and an analytic module 842. The illustrative ecosystem may comprise client computing devices 830*a-f*, and communication modes 831*a-f* such as emails and SMSs. The illustrative ecosystem may comprise other mode of fault transmission and correction such as apps 832*a*, QR code 832*b*, web page 832*c*, and blockchain 832*d*. Elements of the Internet of Body (IoB) bio-cyber interface and other cybernetic system with relation to the human body, is also contemplated and can provide a series of sensors, such as the electroencephalography (EEG) sensor, visual sensor, blood pressure sensor, electrocardiogram (ECG) sensor, respiratory sensor, glucose sensor, temperature sensor, electromyography (EMG) sensor, pressure sensor, and accelerometers among other possible personal sensors to provide contextual information related to the state of a user. The IoB could use IEEE 802.15.0-6 communication standards or the like. Alternatively, Wireless Intra-Body Communication could use Wireless Body Area Network (WBAN) architecture with Tier-1 WBAN communication, Tier-2 WBAN communication, and Tier-3 beyond WBAN communication in a wireless body area network.

Figure 9:
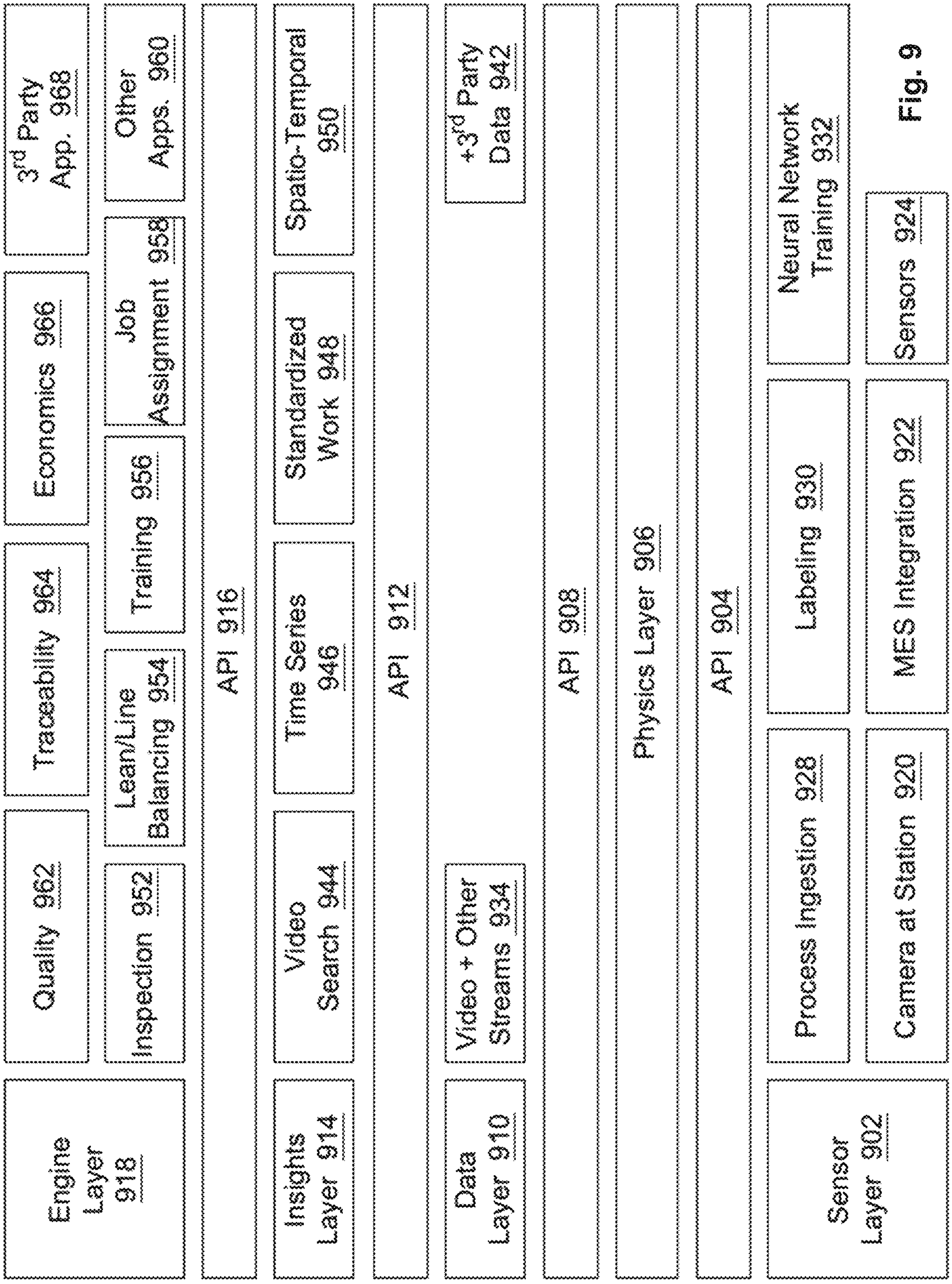
FIG. 9 is a diagram depicting an exemplified layered depiction of an AI system in accordance with an illustrative embodiment of our work.

Referring to FIG. 9 that schematically illustrates division of an illustrative system into layers, may comprise one or more sensor layers 902, a first Application Programming Interface (API) 904, a physics layer 906, a second API 908, data layer 910, a third API 912, one or more insights layers 914, a fourth API 916 and one or more engine layers 918. The sensor layer 902 can include, for example, cameras 920, Manufacturing integration systems (MES) 922, sensors 924, process ingestion 928, labeling 930, neural network training 932 and/or the like. The physics layer 906 captures data from the sensor layer 902 to passes it to the data layer 910. The data layer 910, can include but not limited to, video and other streams 934, and third-party data 942. The insight layer 914 can provide for search 944, time series data 946, standardized work 948, and spatio-temporal 950. The engine layer 918 can be utilized for inspection 952, lean/line balancing 954, training 956, job assignment 958, other applications 960, quality application(s) 963, traceability application(s) 964, economics application(s) 966, and third party application(s) 968, for examples.

Storytelling Framework and Narrative Structure

Figure 10:
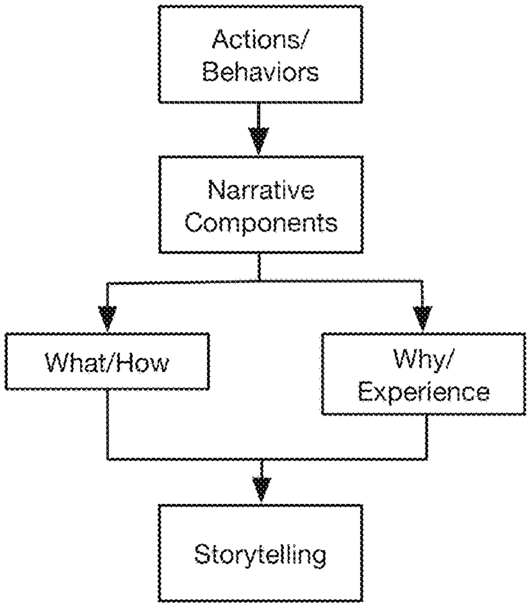
FIG. 10 is a flow chart of an exemplified storytelling framework in accordance with an illustrative embodiment of our work.

Machine learning models are generally better used and trained within a contextual framework. A suitable contextual framework for human/users is considering collaborators actions and behaviors applied to narrative components from which are associated the what/how and the why/experience to support a narrstorytelling framework as roughly illustrated in FIG. 10. The storytelling framework can be implicit within daily users' activities supported by Augmented Reality (AR)/Virtual Reality (VR) and other sensors without requiring a formal user interface to interact with the data, however gathering and organizing user's data and behaviors. Alternatively, a graphical rendering (UI) of the story timeline would improve the viewer's cognition leveraging the natural abilities of humans to comprehend images and interact with the graphical rendering within a logical flow of information elements. Various illustrative embodiments are providing advanced management and presentation of information elements, artifacts, constituents and contextual data generally by leveraging respective temporal references along a time-based structure. Although time can be a general basic framework of storytelling, other elements such as the distribution of information elements, events, communication recipients, sequence of prompts and answers, procedural flows or, inter alia, the size of files, or the time of their last use could be used to build the framework of a story. The timeline context generally operates as a foundational rational supporting a narrative structure generally focused on the what and the how for collating narrative components, enabling users to anchor projects elements in stories within specific temporal frameworks thus improving intuitiveness and providing a sense of evolution that makes sense to a user. A narrative structure and a storytelling framework can be shared among many collaborators or contributors who can add or remove information elements and can also provide information or insights influencing the narrative. The temporal frameworks could be applied to different field of use like project management and data classification, evolving user interactions, archives storage and retrieval, due diligence analysis, email communications and internet searches, among other applications, hence using storytelling/narrative as a contextual rational basis for structuring and indexing documents and other numerical content. Temporal anchoring can be achieved by associating narrative components with defined time periods, such as historical eras, past/present/future portion of the narrative, or other relevant chronological markers. By specifying the time period, the system can automatically adjust contextual cues, including relevant background, actors/users, related information elements, associated files, behavioral data, procedural norms, and relationship factors, thereby enhancing the clarity, coherence, and immersion of the narrative experience.

The system further supports the definition and manipulation of story duration, permitting users to specify the length of time over which a project narrative unfolds. This duration may range from brief, high-intensity intervals/units of time (e.g., a week, a single day or hour) to extended, multi-project sagas. The system can dynamically adapt pacing and event sequencing based on the selected duration, providing tools for both rapid progression and gradual development of workflow, including the actions, events, and developments that occur as the story progresses with associated information elements. Users may configure the sequence of events as strictly chronological, non-chronological (e.g., incorporating flashbacks, achronological elements, or parallel timelines), or even in reverse chronological order, thereby offering flexibility in how causality and narrative flow are perceived by the audience.

Key past events, related files, or other information elements, which precede the main narrative, may be explicitly modeled and linked to present story components. Such events may include personal milestones, archived projects, documents distribution, user interactions or work-altering occurrences that shape human perception and establish narrative stakes, thereby creating a sense of significance by establishing the potential consequences of user's actions. Some embodiments enable seamless integration of such backstory elements, ensuring that their relevance is contextually apparent to the user or a wider audience. The now present moment, or narrative entry point, is generally clearly delineated within the timeline, providing a coherent starting context and clarifying the temporal significance of ongoing events, users interactions and document exchanges.

Additionally, the system can incorporate mechanisms for controlling the pacing of time within the narrative. Users may designate projects, phases or segments thereof in which time is either compressed or expanded, thereby modulating the level of detail and perceptual impact. Foreshadowing expected documents or communications, upcoming agenda elements and other coming implications can also be located in a future portion of the timeline, allowing for the embedding of hints, deadlines, or predictive elements that tie present actions to anticipated outcomes. These features collectively ensure that the user is consistently aware of its temporal position within a project, the importance of events timing, and the narrative context within a temporal progression.

Background events and project-building activities are further enhanced through the use of data visualization and linked content, enabling users to explore backstories, associated timelines, and causal, logical and hierarchical relationships at their own pace. This interconnected approach ensures that narrative depth and complexity are accessible without overwhelming the user. Relevant context may be surfaced contextually through interactive timelines or knowledge graphs, wherein information is represented as a network of real-world entities—such as objects, events, geographical locations, situations, or structural project components—and the relationships between them. Knowledge graphs, typically stored in graph databases, are designed to capture not only data but also the context and semantic meaning of interconnections, thereby enabling advanced data analytics, integration, and reasoning. The use of storytelling framework, organizing schema or ontology further distinguishes knowledge graphs from traditional structures, allowing both human users and machine agents to derive new insights and knowledge from the evolving data landscape. Knowledge graphs can unify data from multiple sources, organizing it in a way that both humans and machines can understand. By capturing not just facts but also the context and meaning behind data, knowledge graphs might enable more advanced data analysis, search, and AI applications.

The timeline context may be revealed through multiple modalities, including but not limited to communications between collaborators, documents distribution, descriptive metadata, and project workflow items that are temporally anchored. The system can be configured to present this information in a seamless manner, avoiding overt exposition and instead integrating temporal cues naturally within the information elements flow. This approach enhances user intuitive and predictable comprehension, engagement and global understanding, supporting both manual and automated storytelling composition, including those driven by AI agents or machine learning models Digital Contextual Elements In the context of digital storytelling—particularly as applied to content management systems, graphical user interfaces, and AI-driven environments—the narrative structure and storytelling framework comprise a set of interrelated components that collectively structure, contextualize, and enhance the user's experience of making sense of the information. A number of components plays a distinct role in organizing content, guiding user interaction, optimizing cognitive engagement and contextually formulating knowledge.

Chronological sequencing refers to the assisted arrangement of narrative components along a timeline often embodied as a temporal axis. This sequencing ensures that events, actions, information artifacts or data points are timely presented using proper temporal references along the temporal axis in a logical order possibly using general time portions such as past, present, and future mirroring the natural human perception of time. The chronological sequencing can be graphically represented along a timeline with respective units of time. In digital systems, this may be implemented via interactive timelines, workflow structures, events logs, or animated progressions, enabling users to track the evolution of a document, a process, a project, a file or a story. Chronological sequencing supports causality, facilitates recall, and enhances decision-making by providing dynamic temporal context.

The relational structure can define the logical, causal and hierarchical linkages between narrative components. This includes relationships such as cause and effect, dependency, hierarchy, and associations, among others. In digital storytelling, relational structure may be visualized through one or more timeline axes adapted to display documents, graphs, linked nodes, attributes or contextual overlays that illustrate how different documents, events, entities or actions are interconnected. These components enable users to understand not only the sequence of events, actions and tasks but also the underlying logic and dependencies that drive the narrative forward. Thematic layering involves the integration of overarching themes, files, subjects, projects, motifs, perspectives or objectives that unify disparate storytelling and narrative components.

In digital environments, themes may be represented by attributes identifications, metadata, tags, sequence of prompts, color coding, or other visual distinctive features that persist across different sections of the timelines or workspaces. Thematic layering can provide coherence, reinforce key messages, and allow users to identify patterns or recurring concepts within complex datasets or information elements collections.

Visual and multimodal cues encompass the use of graphical, auditory, and interactive elements to reinforce the narrative structure. This can include icons, thumbnails, images, videos, animations, sound effects, visual distinctive features and interactive widgets that highlight important events, transitions, or relationships. In digital storytelling, such cues are critical for improving information retention, guiding user attention, and making abstract concepts more tangible. They also support accessibility by providing alternative modes of engagement. Emotional and contextual anchors are narrative components designed to evoke user engagement, empathy, or personal relevance. These may include user-driven storylines, user avatars, personalized content, biometric data, video face patterns recognition, or contextual prompts that relate the narrative to the user's own experiences or objectives.

In digital systems, emotional anchors can be dynamically implemented through adaptive content, feedback mechanisms, or gamification elements, among other, thereby increasing association and retention. Interaction and navigation mechanisms define how users engage with and traverse the narrative structure. This includes user interface controls such as scrolling an axis/timeline/story, clickable elements, timeline selections, information elements magnification, change in zoom level, branching project paths, search and filter tools, and contextual menus. Effective navigation mechanisms empower users to explore the narrative at their own pace, revisit prior events, navigate related stories, or delve deeper into specific documents, thereby supporting both linear and non-linear time distribution within storytelling paradigms. Data provenance and state tracking generally refer to the mechanisms by which the system records, displays, and manages the history and current state of narrative components. This can include versions history, audit trails, user interactions, urgency level and state indicators that inform users of changes, updates, or the current status of documents and other story components. Provenance tracking is desirable for transparency, accountability, and collaborative workflows whereas ethical guidelines are appropriate. Collectively, these components form a comprehensive narrative structure and storytelling framework that transforms raw data, bulk documents, tacit knowledge or unstructured content into coherent, engaging, and actionable digital stories. By integrating graphical chronological sequencing, relational connection, thematic layering, visual cues, emotional anchors, interaction mechanisms, other graphical or logical linkages and provenance tracking—potentially governed by models—digital storytelling AI systems can significantly enhance user comprehension, retention, and motivation.

In the context of digital storytelling, contextual elements are fundamentally transformed by technological advancements, enabling the creation of immersive, adaptive, and interactive narratives usable by one or many collaborators. The narrative setting is no longer limited to static or predetermined descriptions; rather, it may be dynamically generated and potentially rendered at least in part through graphical interfaces, virtual and augmented reality systems. This is permitting users to experience environments that evolve in real time in response to workflow milestones, information elements distribution and classification, user interactions or preferences, future events and third-party relationships or simply following the current moment. Whether the narrative unfolds within a simulated project environment, a procedurally generated patent application prosecution workflow, for example, that can be shared among many contributors to make sure the file is complete and also to collect tacit information that could help figure out clients' instructions and comments for directions that could influence the prosecution. Such procedural structure could be equally applied to a medical record or a data-driven digital workspace since technology enables the setting to function as a dynamic responsive and integral component of the overall narrative structure.

Users within technologically enhanced storytelling frameworks are not merely passive recipients of information. The user interactions can be appreciated within the context of the project workflow, focused information elements and other user interactions among possible interaction-enabling features. Leveraging advancements in machine learning and natural language processing, AI agents, AI models or AI-generated avatars may exhibit adaptive behaviors, acquire new competencies, and evolve in response to user interactions within contextualized workflows. This confers a heightened sense of agency and perception, as the context, relationships, user actions, autonomous AI agents work are shaped by both pre-programmed logic and real-time data inputs, thereby facilitating a more meaningful and personalized user experience.

The events, conditions, extrapolations or inquiries related to a project narrative may be algorithmically generated or dynamically personalized, thereby ensuring ongoing relevance and increased user engagement. For instance, in interactive narrative structure, projects management or serious games, a challenge may adapt in real time to the user's work position, access level, emotional state, or historical decision patterns, rendering the stakes both immediate and meaningful. Contextual data—such as user location, device usage patterns, or biometric feedback—may be utilized to inform the project narrative arc, ensuring that project progression or decision points resonate on an individualized basis.

Geographical locations might be used for specifying cultural and social norms within technologically mediated narratives. These norms may be dynamically adjusted, facilitating compatibility with cultural organizational structures or ethical scenarios, and providing an environment adapted for the optimization of human-machine interactions in work contexts. Tone and mood can convey not only through linguistic elements but also via multimodal cues—such as ambient soundscapes, adaptive lighting, biosensors, facial recognition and haptic feedback—all orchestrated by underlying algorithms to reinforce the emotional undercurrent of the narrative. Storytelling-based models may analyze user responses and adjust the mood in real time, thereby creating a more personalized and emotionally resonant experience. Alternatively, geographical locations could be used to adjust different workspaces of different collaborators based on their physical proximity providing timelines that have commonalities among the collaborators. One collaborator can get communications with other collaborators located in a workspace, putting emphasis on the physically closest other collaborators.

A project's purpose, goals or theme of a technologically enabled narrative may be subtly integrated to improve the user experience through design choices, feedback mechanisms, and the emergent properties of interactive systems. Rather than being explicitly stated, the user experience may emerge organically from the user's journey, shaped by their decisions and the adaptive responses of the system.

Audience awareness can be further enhanced through the application of analytics and user modeling, enabling the system to tailor the contextual delivery and granularity of information based on individual user needs. By monitoring engagement metrics and contextual interaction patterns, a narrative engine can dynamically balance exposition and immersion, ensuring that users receive sufficient context to remain oriented and engaged without experiencing information overload.

This, contextual collaborator behaviors data could be generated using different variables. For example, contextual collaborator behaviors data could be a combination of collaborator artifacts interaction data and collaborator navigation behaviors data in the context of the dynamic narrative data structure. In that example, the collaborator artifacts interaction data could be generated by the combination of collaborator artifact interactions and respective artifacts temporal references. Collaborator navigation behaviors data could be a combination of collaborator navigation behaviors and respective collaborator navigation behaviors temporal references.

Narrative Intelligence and LLMs

Figure 11:
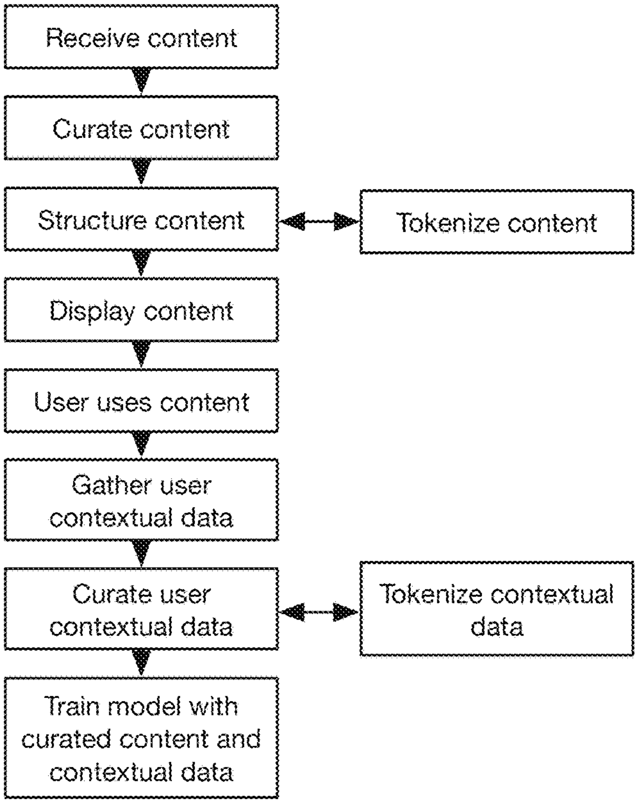
FIG. 11 is a frow chart of an exemplified process for taking content to training a model in accordance with an illustrative embodiment of our work.

Referring now to FIG. 11 summarizing and exemplifying a way to process new content to curate, structure and tokenize the content according to the type, size and, inter alia, value of each item of content. Once structured and tokenized, the content can be displayed, and the user can interact with it. From there, it's possible to gather user contextual data and further curate the user contextual data to tokenize this contextual data. Once the content is structured and tokenized, and the user's contextual data is structured and tokenized, such content and contextual data can be used to train models. Curation and tokenization are going to be detailed later in this description.

In order to obtain an appropriate and contextually relevant response from a LLM, it is generally necessary to provide the LLM with a comprehensive and detailed prompt. The prompt may be constructed from a plurality of curated and tokenized information sources, each contributing to the overall context and specificity required for optimal LLM performance.

Figure 12:
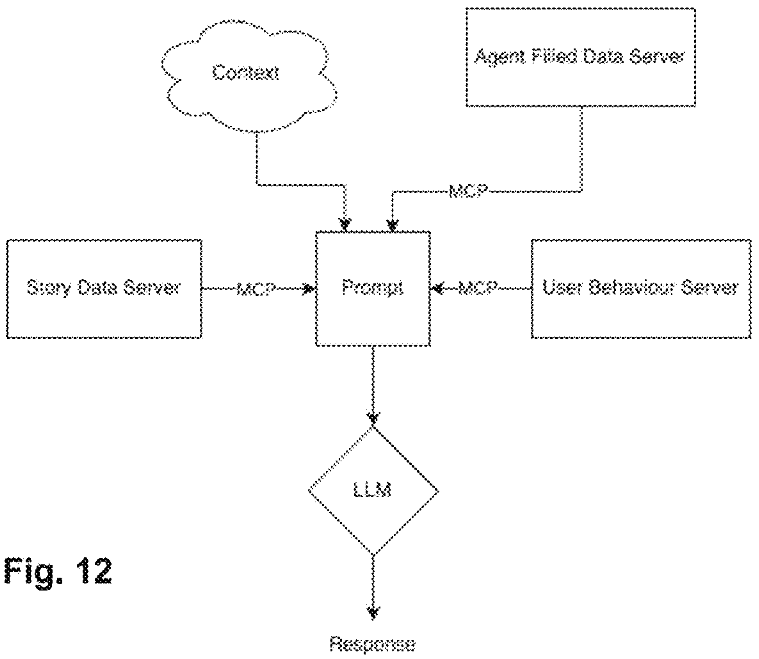
FIG. 12 is a frow chart of an exemplified process for connecting MCP to a prompt in accordance with an illustrative embodiment of our work.

Within the context of an Axes-Based Graphical User Interface (hereinafter referred to as AB-GUI) providing axes as a graphical support representing a story or a narrative, the prompt can incorporate data and metadata associated with each information element along one or more stories of the AB-GUI. These stories may represent different dimensions of user interactions, such as tasks, timelines, and inter-users communications. Resources and the corresponding data and metadata for each information element can be programmatically appended to the initial prompt provided to the LLM. An example of a prompt interconnections with a story data server, user behavior server, and an agent field data server through Model Context Protocols (MCPs) and further connected to the context to feed the LLM in order to get a response is exemplified in FIG. 12. The prompt may be supplemented with information obtained asynchronously by AI agents. Such agents may operate in the background to retrieve relevant contextual data, external resources, or updates, which are then integrated into the prompt to further enhance the LLM's ability to generate accurate and context-aware responses. Contextual behaviors of users within the AB-GUI are material for contextually providing AI agents and AI models to the user within the actual work context, without having the user search for AI agents or models, pay a fee for each of them and learn how to use them with limited certainty of their applicability. The contextual behaviors of users are also used for AI model training to support more accurate reasonings. Furthermore, as the system monitors user activity to identify and characterize work habits, behavioral information derived from such usage patterns can also be incorporated into the prompt. This behavioral data may include, for example, frequency of access to certain features, typical workflows, story and attribute selections, or preferred interaction modalities, thereby enabling the LLM to tailor its responses to the specific habits and preferences of the user. A comprehensive prompt suitable for use with an LLM in this context may include: the initial user query, information regarding the elements along the relevant stories represented through axes of the AB-GUI, additional contextual information obtained from one or more AI agents, and behavioral information reflecting the user's interaction patterns with the application.

Figure 13:
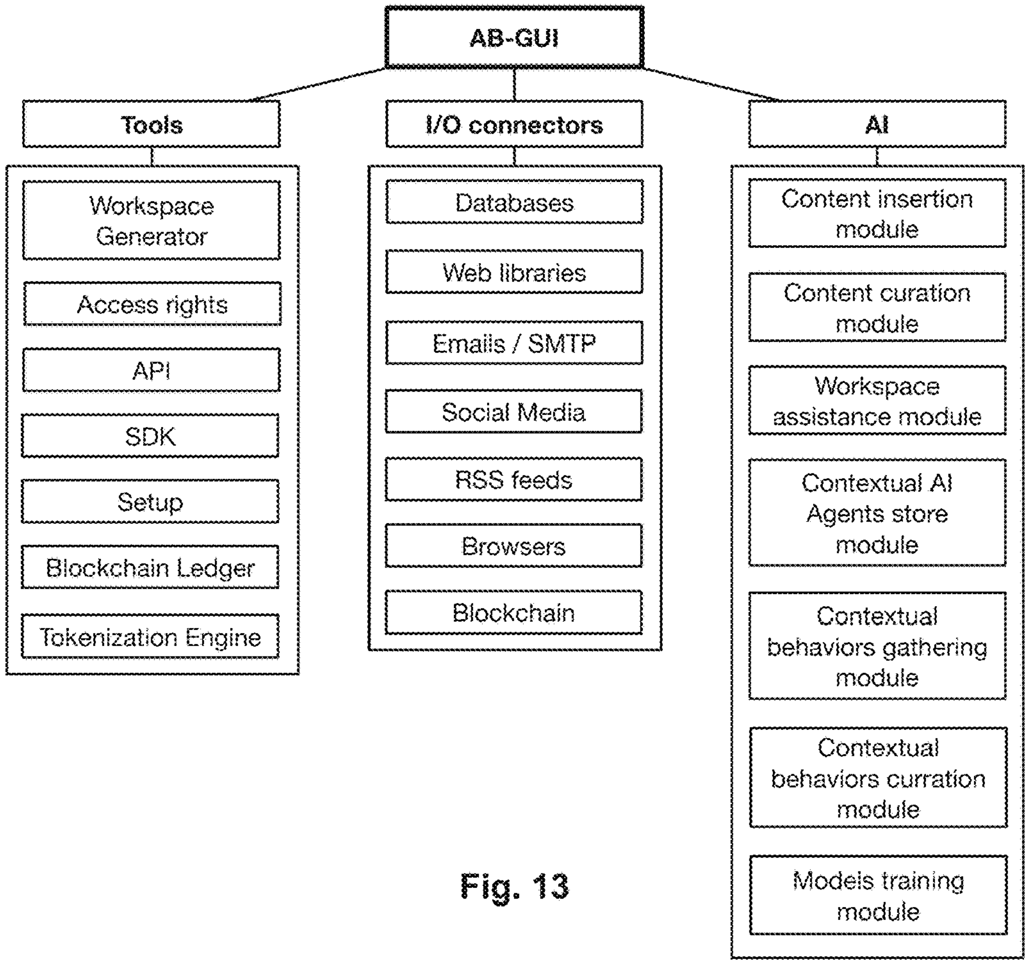
FIG. 13 is a diagram of an exemplified AB-GUI with various interconnections with tools, processes, and modules in accordance with an illustrative embodiment of our work.

With reference to FIG. 13, the AB-GUI typical connections with tools, input/output connectors, and AI modules are exemplified. The tools associated with the AB-GUI are adapted to provide the interface with a variety of functions to manage workspaces, set access rights, provide an API, an SDK, performing different set-ups, managing blockchain ledger and a tokenization engine if required. The AB-GUI is also provided with input/output connectors to connect to: databases, web libraries, emails, social media, RSS feeds, browsers and blockchain. AI has a significant role with the AB-GUI that is using different AI modules to interact with collaborators, the computer system, and the different AI components. The AI models comprise a content insertion module, a content curation module, a workspace assistance module, a contextual agent store module, a contextual behavior gathering module, contextual behaviours curation module and a model training module. The structure exemplified in FIG. 13 is adapted to expand with other possibilities without departing from the scope of the present invention.

Timeline Axis Structure

Figure 14:
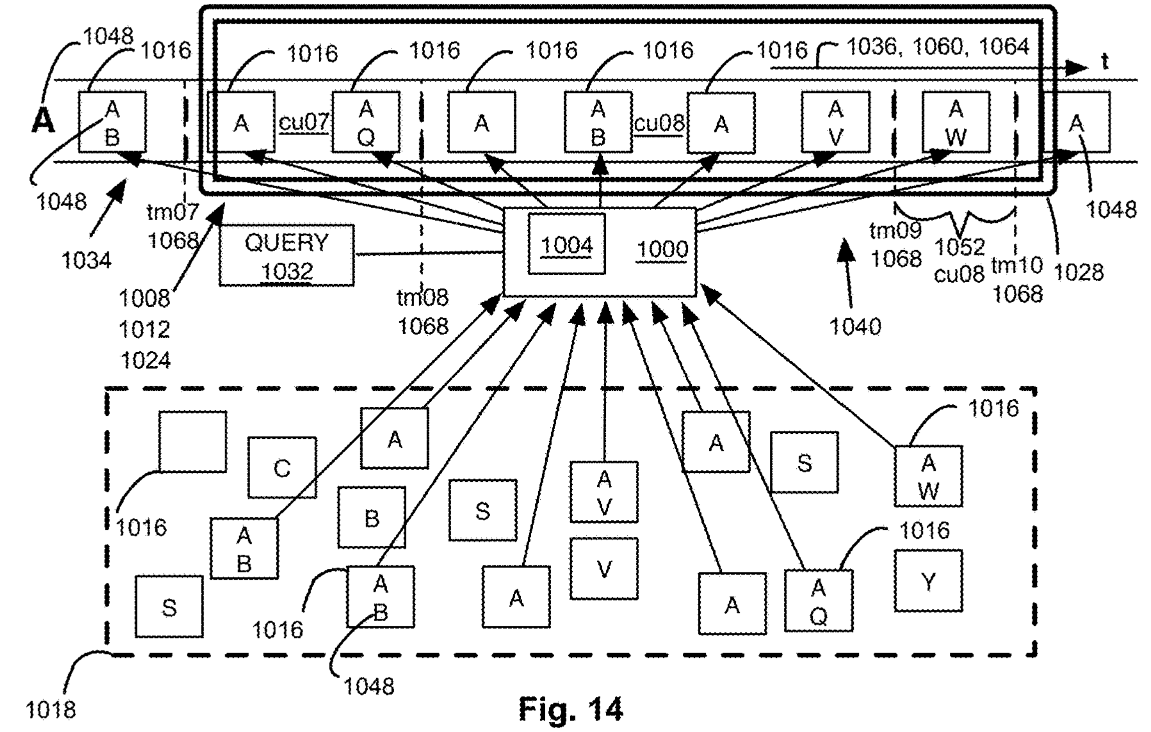
FIG. 14 is an exemplary depiction of an axis of information elements along a timeline in accordance with an illustrative embodiment of our work.

It is possible to graphically represent storytelling framework in a graphical user interface. A timeline would generally be the backbone of a narrative and would receive a plurality of information elements thereon. The plurality of information elements would be sequentially disposed on the timeline with, inter alia, time distribution, a beginning, milestones, events and an end. A user could appreciate the evolution of the story tiled with information elements along the timeline. FIG. 14 illustrates the interaction between a computer system 1000, a software system 1004 and an interface program 1008 providing a graphical user interface 1012 for displaying and managing information elements 1016. The graphical user interface 1012 is illustratively enabled through a computing device 1020, better illustrated in FIG. 8, which may include traditional computers 830*a* and other applicable devices 830*b-f* with their respective limitations, some of them could be just sensing without displaying. The devices could be wearable devices such as a watch 830*e*, connected glasses 830*g* and neural bio implant 830*h* that might be used for Internet of Body (IoB). The user interface 1012 is adapted to present unstructured documents 1018 in an array format, like an axis, providing a structured and intuitive visual arrangement for a set of information elements 1016. It is desirable the information elements 1016 be graphically distinctive as they are exemplified in FIG. 14 with a standardized square shape although other shapes or forms could be used. The standardized thumbnails might be borderless when desirable, like in virtual environments (e.g. VR, AR) or with spatial computing, to favor a more fluid visual rendering. Thumbnails of information elements 1016 may represent various types of content like documents, images, emails, text messages, multimedia content, prompts, AI agent results, AI models reasoning, menu items, icons, threads, browser's results or other narrative elements and computer files, all of which can be hereafter referred to as documents 1016 for simplicity without limiting the scope of the invention. It can also be appreciated the user interface 1012 is adapted to display many types of computer files, if not most computer files, to offer a rather complete an integrated view/workspace of the information landscape and the workflow of the user's project. This allows to gather comprehensive user actions and behaviors with relation to a project's narrative. In some embodiments, the information element 1016 can be embodied to display applications such as a web browser, a text application or a spreadsheet application among other actionable content.

In accordance with possible embodiments, the user interface can use one or many axes 1034 for displaying documents and content along intuitive frameworks or structures. The AB-GUI 1024 is displayable on a means to display and is suitable for screen-less Virtual Reality (VR) display environments such as smart glasses **830*f* or Augmented Reality (AR) headsets, as depicted in FIG. 8. The AB-GUI 1024 may be implemented using different programming languages, such as C++, Java, Python, or other suitable languages, and may leverage AI frameworks to assist documents management and enhance user interactions. The executable instructions can be stored on a machine-readable medium (transitory or not) and executed by the computer system 1000**, which may include specialized hardware for VR, AR and AI processing. The implementation details of such programming are known in the art and will be readily recognized by those skilled in software and AI development; therefore, they are not detailed herein.

The AB-GUI 1024 may operate through an operating system and hardware of the computer system 1000, or alternatively, through a network-based system such as a client-server architecture or cloud computing architecture **840*b* as exemplified in FIG. 8. The AB-GUI 1024 could alternatively be embodied as an operating system, integrating the complete user experience, further interconnecting different applications, AI models and AI agents, among other components related to AI and operating systems. In the context of display monitors, the AB-GUI is adapted to structure, display and manage documents 1016 within a display area 1028. Alternatively, monitor-less displays are also contemplated, including holographic display, avatars, and the user's field of view with VR and AR means. The AB-GUI is typically displaying documents and other content in response to a query 10. The documents 1016** may be stored in one or more databases, which can be distributed across multiple locations (e.g., cloud, edge, or local storage).

The AB-GUI 1024 is adapted to graphically structure documents 1016 in an array thereof, embodied as an axis 1028, as illustrated, arranging documents in perceivable rows and/or columns in a substantially regular fashion to enable easy and intuitive user navigation. Navigation with the AB-GUI, along an axis or among different axes, can be achieved via user inputs by movement of a pointing device, selection, keyboard actuation, or, alternatively, via gestures, sensors, gaze tracking, bio markers, voice recognition and other AR/VR/AI-enabled input methods. The AB-GUI layout provides contextual information about and/or context to each document 1016 such as its location in the timeline chronology, the meaning of the query, its relationships to other documents 1016, its location on the display, its owner, inter alia. The display of documents 1016 on an axis 1034 enables their management contextual as a story, a flow or a logical sequence prone to support natural human collation perception (e.g. chronological).

In a simplified exemplary form, an array of documents 1016 may be embodied as an axis grouping documents 1016 in a single row or column. Axes 1028 may be disposed horizontally, vertically, or in other spatial arrangements on a display depending on the type, size, orientation and shape of the display without departing from the scope of the present invention. The axis 1034 may preferably be rendered in a rectilinear fashion with documents 1016 positioned along this axis 1034. Alternatively, the axis 1034 can be bent or curved within the user's field of view for VR/AR display tools or follow any shape suitable for maximizing the display capabilities and may be oriented accordingly. With VR/AR, or screen-less display embodiments, axes may be rendered in a three-dimensional space, enhancing the user's ability to organize and interact with a plurality of axes and workspaces. The illustrated embodiments generally show a foundational horizontal axis layout although a vertical foundational axis or other axes configurations are possible depending on the circumstances. Other spatial graphical layouts may become apparent to those skilled in the art, particularly as VR/AR/AI technologies evolve. A key aspect of embodiments is that the axis 1034 provides a sequence of documents (or any type of elements indicative of, or relative to events, including generation and communication of information) providing a document-based storytelling from which a user can infer meaning, logical connections, key elements, contextual location, chronological position and relationships supporting an interpretable narrative. AI can also assist improving the narrative for the user contextualizing key elements, summarizing relevant content, proposing additional axes offering other perspectives or providing contextual support and assistance with AI agents and models throughout the AB-GUI.

The axis 1034 exemplified in FIG. 14 is represented as a single axis without disclaiming other alternate axes configurations including groupings of multiple axes presented in various layouts or workspaces. According to some aspects, axes 1034 may be graphically independent or graphically connected to illustrate logical connection documents and axes relationships. An axis preferably uses a collation function 1032, such as chronological ordering in the present embodiment. Similarly, grouped axes could be sharing the same collation function 1036. More complex arrangements of axes are going to be presented later in this description.

Still referring to FIG. 14, when only a portion of the axis 1034 is visible on a display or in the limited field of view of AR/VR smart glasses, zoom, pan, and scrolling movements can allow the user to navigate the axis and move the set of documents 1016 displayed in the display area 1028 and bring undisplayed virtual documents or other format of information within the display area or perceptible in another way. The system may adaptively adjust the display of the AB-GUI based on the number of axes, the level of zoom, user behavior, workflow context, or other criteria. Documents 1016 may overlap or be resized on the axis to maximize the use of the available display area 1028. Selected documents can be magnified for greater detail, while others may be minimized or hidden. With small or limited display areas, only one document, a portion of document(s), or only a few documents may be shown at a time, with undisplayed remaining documents 1040 accessible via scrolling or navigation along the axis 1028. The AB-GUI preferably maintains the respective virtual position of the documents along the axis, enabling efficient access to remaining undisplayed documents 1040 and ensuring contextual awareness even when documents are not all simultaneously visible.

In some embodiments, documents are selected for display on an axis 1028 based on one or more attributes 1048, herein referred to as capital letters in the appended figures, exemplified by the letter "A" 1048 in FIG. 14. For instance, attribute A could mean "project A". The documents are ordered according to a collation function 1036, such as a chronological order using a time scale 1044 graphically pacing time along the axis. Attributes 1048 selection and collation function 1036 parameters may be specified by the user or determined by AI-driven analysis of user behavior, context, or related content. Each axis is further adapted to group document sets according to selected tags, categories, keywords, creators, owners, time duration or other attributes 1048. In some circumstances, the term "attribute" 1048 is to be construed broadly to encompass properties or commonalities used to establish subject matter or relationship among documents. Attributes 1048 may be specified by the user using Boolean logic or automatically assigned by the system, potentially using AI techniques such as identified commonalities, statistical probabilities, natural language processing, image recognition, behavioral analysis, mental model analysis or other AI-driven context-based specification. Documents may have multiple attributes simultaneously associated therewith, including user-assigned (e.g., keywords, projects) and system-assigned (e.g., file type, creation time, usage statistics). The attributes may be intrinsic system-based or extrinsic user-based. The configuration of attributes is broad and adaptable to different domains or user needs and may evolve as AI capabilities expand.

According to embodiments, the selection of one or more attributes in a query 1020, or a prompt, determines which documents are displayed on the axis. If no specific attribute is selected, a default order (such as the creation date of each document) may be used to represent progressive time-based evolution of inserted documents. All documents on the same axis are typically associated with the selected attributes since they matched the query. Third-party data, such as targeted information or advertisements, may also be added to an axis, either arbitrarily or based on select the attributes, user behaviors, targeted subjects, or specified collation. Documents illustrated in FIG. 14 feature exemplary attributes 1048 individually represented by a capital letter thereon (A, B, C . . . ), or none, in which case the exemplified documents are left blank. Letter attributes are used in the present application for illustrative purposes only; while letter attributes are theoretically possible, more descriptive attributes such as those described above are used in real life embodiments of the technology. As shown in FIG. 14, documents can simultaneously feature multiple attributes preventing multiple copies of the same document. In a preferred embodiment, a plurality of attributes is assigned to documents hence improving the classification granularity of documents and therefore searching and management capabilities. Documents without any associated extrinsic attribute could nonetheless be managed and found in a general query based on intrinsic attributes.

FIG. 14 further illustrates documents selected from a database by the query are located on the axis in chronological order although other parameters could be specified in the query or the prompt to further refine the results (e.g., chronological order, alphabetical order, statistical order, increasing file size, original user, etc.). A collation function 1036 can divide the axis into successive collation units 1052 (e.g., time units 1052 in the case of a chronological order, which can illustratively be hours, days, months, years, etc.). The collection function 1036 can be graphically illustrated with collation unit separators 1068, embodied as time marks tm07, tm08, tm09, tm10, dividing the collation function along the axis hence separating collation units cu07, cu08, cu09. The collation function precisely disposes each document along the axis according to a value of a specified attribute in relation to the corresponding collation units of the axis. Documents are therefore associated with a respective collation position in a respective collation unit. In addition to documents, the chronological distribution of any action or event that takes place at a specific time and usually in sequence with other events or actions, can be combined with related documents and are collectively shaping a comprehensive narrative.

Figure 15:
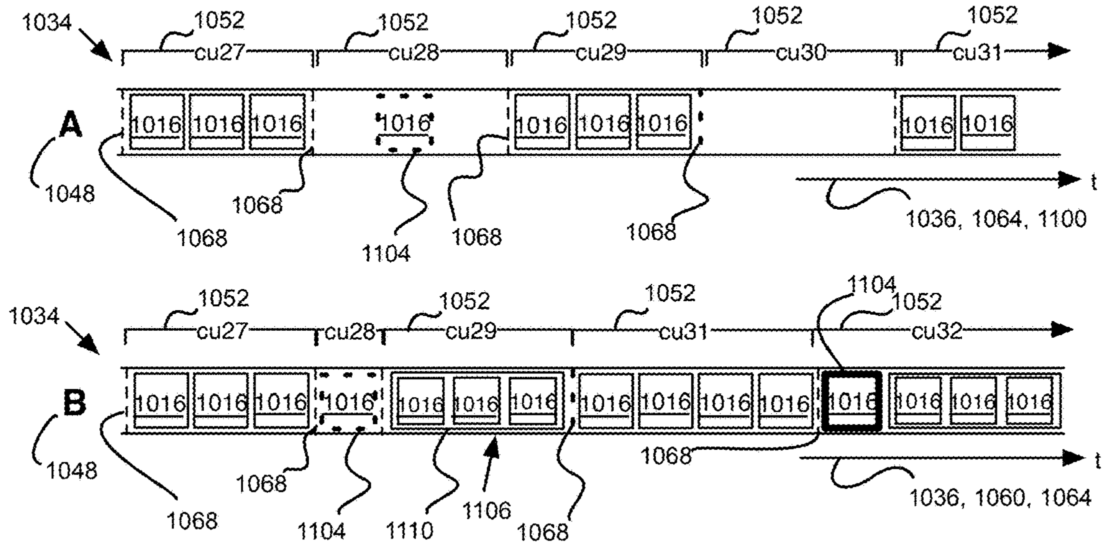
FIG. 15 is an exemplary schematic visual depicting two axes of information elements along timeline, one using a linear time configuration and the other axis is using a non-linear time configuration in accordance with an illustrative embodiment of our work.

A chronological distribution of documents using a non-linear time configuration 1060 is depicted in most illustrated embodiments because of its compact arrangement of documents along the timeline 1064. An axis 1034, or a group of axes 1500, may be embodied with a timeline 1064 using a linear time configuration 1100, or the non-linear time configuration 1060 described above. Both configurations are illustrated in FIG. 15 in a generic example. The linear time configuration 1100 displays collation units 1052 of the similar graphical longitudinal/axial length along an axis regardless of the number of documents 1016 contained in each collation unit 1052, cu27, cu28, cu29; hence the linearity of the time distribution of the timeline 1064. In other possible embodiments, the axial length of the collection units 1052 could also be adapted to a different number of documents therein or be dynamically adjusted with respect to the highest number of documents to be displayed in a collation unit that is visible on the display area 1028. The collation units 1052 are illustratively designed with a constant axial length to accommodate three documents 1016 therein on axis "A" in FIG. 15. The size of the documents located within a given collation unit 1052 can optionally be adjusted in accordance with the number of documents located therein. For instance, documents could be larger if there are few documents in the collation unit and smaller if many documents are found therein. Alternatively, the documents can remain the same size and might overlap each other, or be stacked on top of each other, when their quantity exceeds the available space in collation units. Another possible way of making large numbers of documents fit into a fixed-size collation unit is to equip the collation unit with a scroll bar (not illustrated), allowing the user to navigate within the collation unit to reveal documents located outside the axial length of the collation unit. Documents in the linear time configuration 1100 may be displayed as an unevenly distributed sequence along the axis that could match a precise collation position for each document within the collation unit. In another embodiment, collation unit 1052 cu30, using the linear time configuration 1100, containing no documents therein will appear empty on the axis although the collation unit will remain the same size as other collation units to maintain the linearity of the time distribution. Conversely, in another possible embodiment, a hybrid linear time configuration, not illustrated, would be axially collapsing, compressing or omitting an empty collation unit cu30 along the axis 1034 to reduce the space along the axis that is not displaying a document. The hybrid linear time configuration provides collation units displaying documents therein with the same longitudinal axial length along the axis despite empty collation units are visually absent from the axis.

Still referring to FIG. 15, the non-linear time configuration 1060 displays collation units 1052 of uneven longitudinal/axial lengths because an even distribution of documents along axis "B" prevails over the variable graphical time linearity of the collation. In other words, a generally constant distribution of documents along the axis are given primacy over having collation units of equal graphical length along the axis. Relative equidistance between adjacent documents along an axis can also be a metric enabling a non-linear time configuration 1060. The non-linear time configuration 1060 provides a more efficient use of the space along the axes but may provide less meaning to illustrate the evolution of workflow and documents distribution along the timeline. One can appreciate that documents are generally equidistantly disposed along the axis in the non-linear time configuration 1060 to provide a more structured graphical rendering. Documents displayed with the non-linear time configuration 1060 could alternatively be spaced apart with different distances therebetween in another unillustrated embodiment. Time units that have no document therein could be omitted or compressed along the axis. For example, collation unit cu30 on axis "A" using the linear time configuration 1064 has no documents therein. The sequence of collation units using the non-linear configuration 1060 is reading cu27, cu28, cu29, cu31, skipping empty collation unit cu30 to favor even documents distribution. Some possible visual distinctive features are illustrated in FIG. 15. Some documents 1016 are displayed with a distinctive border 1104 that can be used to graphically emphasis additional meaning or commonality associated with specific documents. Further, documents 1016 could be grouped together 1106, as exemplified with a grouping frame 1110 to graphically associate them with a predetermined collective meaning.

Still referring to FIG. 15, one can appreciate that the collation units, embodied as time units given the chronological collation, are separated by collation unit separators 1068 along axis 1034 A disposed at predetermined axial positions separating different time units 1052. These collation unit separators 1068 are used in embodiments to graphically identify a change between adjacent collation units along the axis and are graphically identifying and metering the time distribution along the axis 1034. The collation function is chronological in the illustrated embodiment therefore, collation unit separators 1068 can be considered time unit separators 1068. These separators 1068 can have different visual appearances depending on the type of time separation including hours, days, months, years, or other suitable time separation to further emphasize the evolution of time along the axis.

Figure 16:
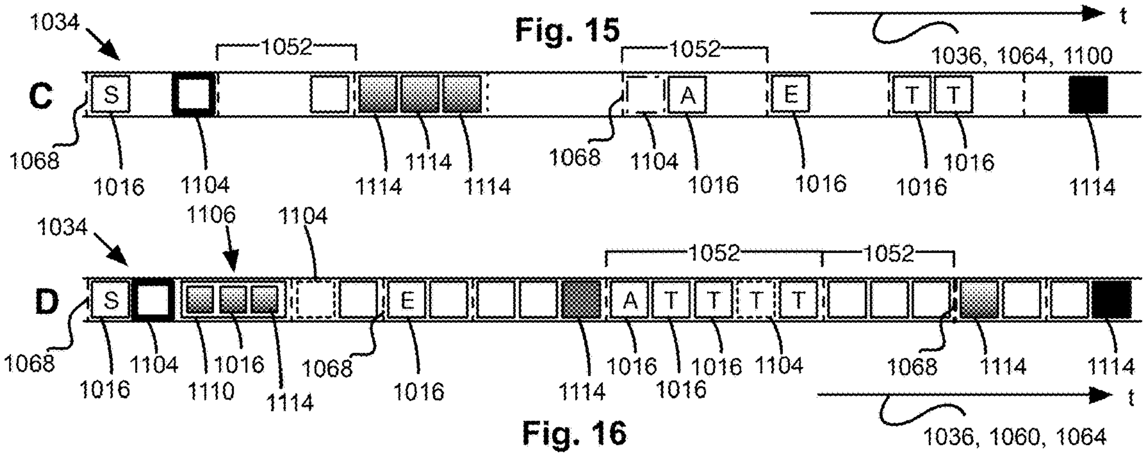
FIG. 16 is an exemplary schematic visual depicting two axes of information elements along a timeline, one using a linear time configuration and the other axis is using a non-linear time configuration in accordance with an illustrative embodiment of our work.

Moving now to FIG. 16 illustrating axes C and D exemplifying two small projects that can be metaphorically seen as stories. Each project narrative is including different constituents identified with different labels. Label 'A' is representing actions, elements with label 'E' represent events, and elements labeled with a T are representing tasks. Axis C illustrates a plurality of information elements disposed along a timeline 1064 in accordance with a linear time scale configuration 1100. Each collation unit 1052, embodied as a time unit in the present example, is sized to display therein three information elements 1016. Axis D is displaying a number of information elements 1016 along a non-linear time scale 1100. Each "story" begins with an information element identified with the letter S (start) and ends with a black information element at the right of the axes. Visual distinctive features, including a grouping frame 1110 and texture 1114, inter alia, can be selectively associated with the information elements 1016 to bring further visual distinctions that could be reflecting some specifics of these stories (e.g., urgent, completed, new . . . ) raising further awareness of the user. Assuming time units for axes C and D is a day, one can appreciate the linear time configuration 1100 can provide insights like figuring out when nothing happened a day: where there's an empty time unit.

Figure 17:
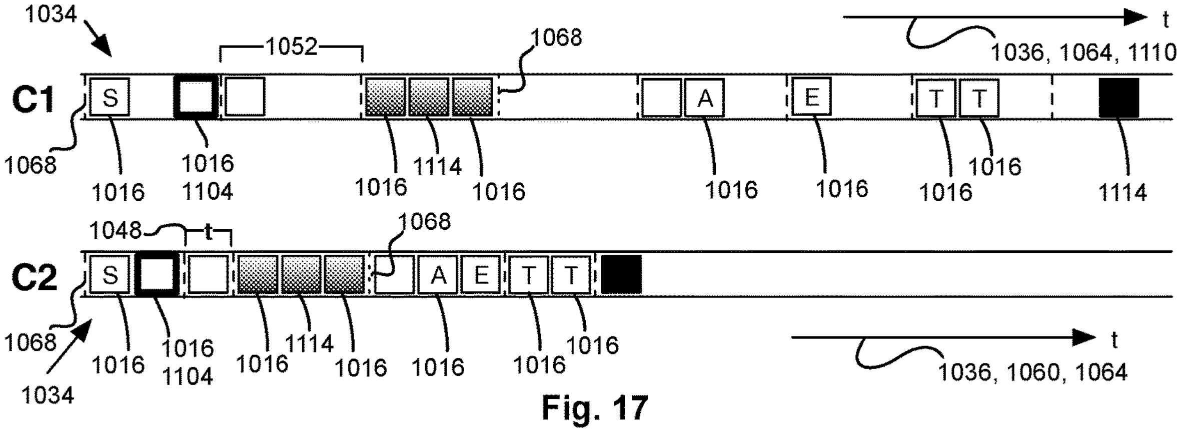
FIG. 17 is an exemplary schematic visual depicting two axes of information elements along a timeline, one using a linear time configuration and the other axis is using a non-linear time configuration in accordance with an illustrative embodiment of our work.

One can appreciate in FIG. 17 that axis C1 is illustrated with a linear evenly time-distributed configuration 1100 and axis C2 with a linear unevenly time-distributed configuration 1060. Axis C1 shows the distribution of documents along the timeline, inferring evolution of the project over time. Whereas axis C2 favors the compactness of the linear unevenly time-distributed configuration. It some realizations, it is possible to switch between both time scales while keeping the same story/project in sight.

Figure 18:
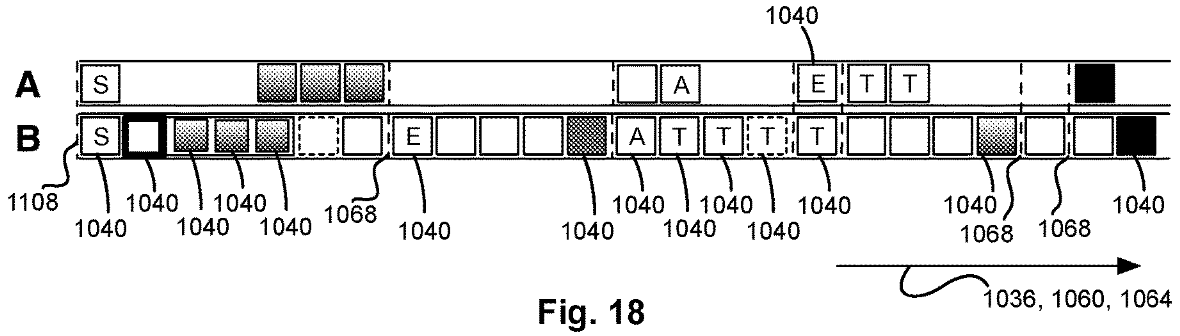
FIG. 18 is an exemplary schematic visual depicting two axes of information elements along a timeline forming a group of axes in accordance with an illustrative embodiment of our work.

It is sometimes desirable to create a group of axes 1500 sharing one common timeline. This is what is illustrated in FIG. 18 with an example of a group of axes including axis A and axis B. The time unit separators 1068 are shared through all the axes from the group sharing the same timeline. The number of elements present in axis B exceeds the number of elements displayed on axis A. The common non-linear time scale applied to the group of axes 1500 is setting the length of each time unit to match the maximum number of elements to be displayed in that time unit, either in axis A or axis B. This is why there are portions of axis A without information elements therein.

Figure 19:
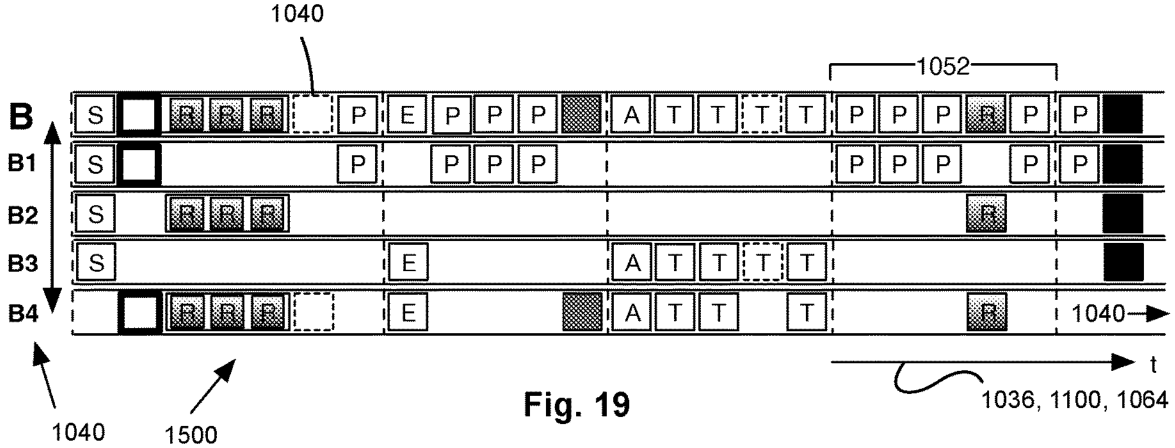
FIG. 19 is an exemplary schematic visual depicting two axes of information elements along a timeline forming a group of axes in accordance with an illustrative embodiment of our work.

It is possible to configure different arrangements of axes to create workspaces adapted to a specific purpose. Each workspace can display a pre-arranged layout of axes that provides meaning for a user who can switch from one workspace to another. FIG. 19 depicts a group of axes 1500 that are representing subsets of documents present in axis B displayed on top of the series of other axes. Let's assume that axis B is a short medical record, it contains all the documents and the information pertaining to the medical record. Whereas all the other subsequent axes (B1, B2, B3, and B4) are respective subsets of the information elements displayed on axis B. Axis B1 could be representing all the prescriptions. Axis B2 could represent all the X-rays. Axis B3 could represent all the events, and the provided treatments. Axis B4 contains the X-rays and other documents required for the radiologist to make the analysis of the X-rays. Note that there is no start icon and no dark element at the end of axis B4. This is because axis B4 belongs to the radiologist, who is sharing a specific portion of his timeline for sharing and accessing the requested shared documents for his work. It would be possible to add an additional axis with all the emails and another one displaying only professional notes since any query could be made about displaying a set of results based on attributes and other considerations. All the axes are part of a group of axes 1500, allowing a better perception of the evolution of different portions of a medical record along a pre-determined portion of time. The axes could be individually or collectively hidden or expanded from axis B as presented in this illustrative embodiment.

One can appreciate horizontal axis A is including a plurality of documents 1016 from FIG. 20. Attributes 1048, or other properties associated with the relational elements 1616, can be used by an AI system to create additional, subsidiary relational axes B, C, D from foundational subject axis A. These subsidiary axes B, C, D may be temporary, serving to display or highlight contextual elements 1016 having a relation with relational element 1616, the topic of foundational subject axis A, the behaviors of the user with axis A without altering the main workspace 1632. The subsidiary axes B, C, D may be positioned orthogonally, or at another angle to foundational subject axis A, and may be scrollable in graphical connection or not with foundational axis A. Additional subsidiary axes can be timely and dynamically created as needed, supporting the user's work while providing "relational navigation" among axes. It can be appreciated axis A is illustrating a timeline 1064 including a past portion 1600 chronologically before a present now portion 1604, and a future portion 1608 chronologically after the present now portion 1604. In the illustrated embodiment, every axis has its own timeline illustrated by the direction of their respective arrow. The relational axes 1612, B, C, D are displayed at an angle from parent axis A and are connected via respective relational elements 1616. The relational axes 1612 are depicted at a 90-degree angle from axis A in a planar configuration although they could be disposed at a non-zero angle from axis A without departing from the scope of the present application. It is also contemplated relational axes 1612 can be embodied in a three-dimensional environment where relational axis 1612 could expand in different directions, including depth; this embodiment is not illustrated in FIG. 20.

Still referring to FIG. 20, relational axes 1612 are contextually connected to foundational axis A using a relational element 1616 to display additional documents for the user's benefit. For example, still within the context of a project, relational axis B is stemming from relational element 1616, 1620 identified with letter E representing an event. This event 1620 is part of a workflow that includes tasks and actions as it can sequentially be appreciated later on axis A. Relational axis B is thus displaying a subset of workflow elements from foundational axis A that is meaningfully associated with relational element E 1620. Relational axis C is using a similar logic, although using relational task element T 1624 within the same subset of elements used for relational axis B. This is an example of a subset of elements being used at different location in relation with different relevant relational elements 1616. Relational axes 1612 could be provided using different queries, generally using a commonality between the relational element 1616 and the elements displayed in the relational axis 1612. For instance, an email 1628 is present on axis A. Relational axis D stemming from relational element 1616 email 1628 could display attachments a, b, and c, illustrated in relational axis D. Relational axes 1612 could be generated on demand by a user to create a workspace 1632 based on selected attributes or properties, and could alternatively be timely generated by an AI system using commonalities, prompt or context to support the user within the workflow illustratively presented on axis A. Relational axes 1612 can be expanded or collapsed with its respective relational element. Relational axes can be disconnected from their relational element to allow scrolling of the relational axes without moving foundational axis A. Many meaningful relational axes could be generated based on commonalities, prompt or context and be switched therebetween to further additional perspectives.

Axis A in FIG. 21 is embodying a past portion 1600, a now present portion 1604, and a future portion 1608. The past portion is intended to display elements that have been dated in the past portion of the timeline. The now present portion 1604 could be embodied to display current work made by the user, applications currently used by the user, prompts prepared by the user, AI agents working for the user, files or else relevant for what the user is currently doing. The future portion could serve as an agenda, timely indicating future events and optionally displaying information artifacts expected in the future. Elements identified with the letter M 1632 are representing meetings that did not occur as planned in the past, and had to be postponed in the future, as illustrated on the future portion of axis A and still identified with letter M 1636. These elements include a visual distinctive dotted border 1104 associated with the attribute "Postponed" in the present example.

FIG. 21 is depicting a workspace displaying axis A with the now present portion 1604 mark associated with a present portion axis 1700 providing a space for gathering elements currently used by a user. The present portion axis 1700 could use its own collation function to order elements based on the most recently element used should that be helpful for the user. The present portion axis 1700 length can be adjusted to receive therein the number of elements relevant to the work of the user. It could be collapsed or expanded when needed, disposed at an angle from foundational axis A or not, graphically connected to the now portion of another axis (axis G for instance) or displayed otherwise on the AB-GUI to contextually support the work done by the user. It is possible to appreciate from FIG. 21 that elements disposed along an axis can be graphically interconnected using a connector 1708 to create a graphical connection among elements on a single axis or between different axes, like shown with connector 1712. By the system to support the user's perceptions of relationships. These connectors 1708, 1712 can be dynamically generated by an AI system based on commonalities, attributes, context, user behaviors and workflow steps among different possibilities. Foundational axis A is surrounded by contextual axes E, F, and G presenting additional elements supporting the user's work. These contextual axes 1716 (E, F, and G) can be manually generated by the user or could be dynamically presented to the user based on user contextual behaviors and contextual content analyzed by AI systems. The relational axes are not sharing the same timeline because of their different nature but could alternatively be displayed as a group under other criteria. In the illustrated example, focused element 1704, labeled T, with a bold border 1104 representing the actual element on focus for the user. Focused element 1704 is used by the system to understand what the user is focused on and could use the attributes, the element content including text, images, metadata, relation with other users possibly involved with this focused element 1704 to contextually analyze what the user is up to. Further, the context provided by surrounding elements displayed along the timeline of axis A and contextual axes 1716 (E, F, and G) can be used by the AI system to analyze the context of what the user is doing to dynamically provide insightful contextual axes 1716. Proximity 1720 of a contextual axis 1716 to foundational axis A can also be considered by the AI system as a metric for usefulness. Insightful contextual axis 1716 would be closer to foundational axis A, while axis G would be considered to be less relevant, although it brings additional useful context rendered available immediately to the user. In this exemplified embodiment, contextual axis E is graphically connected 1712 with foundational axis A and is displaying elements pertaining to the task associated with the focused element 1704. Contextual axis F exemplifies different search results provided by the system based on the overall context of the focused element including the subject of axis A. The user can scroll axis F to the right or to the left by selecting the navigation tools 1724 screening the different results provided by the system and indicating to the system with the navigation behaviors how to refine the search parameters based on the displayed elements. Axis G is displaying the latest AI prompts created by the user to provide additional contextualized information to the user within the workspace. The proximity ordering of the contextual axes 1716 can be dynamically managed by an AI system in accordance with the user's behaviors among other considerations.

Workspaces 1632 displaying axes layout can be prepared and saved for easy retrieval. Workspaces can be AI-assisted to be dynamically adapted and provide various axes layouts indicative of relevant narratives for insightful support to the user. FIG. 21 illustrates an exemplary workspace 1632 for a project management engineer displaying six horizontal axes A, B, C, D, E, F and one orthogonal axis G. Axis A is displaying emails 1800 along the timeline using some distinctive visual features including a transversal offset 1804 of email elements 1016, illustrating elements offset above when it is a sent email, and received emails offset below. The user can thus easily perceive the sequence and the direction of the emails. Email 1808 is a relational element from which its attachments a, b, c can be expanded in orthogonal relational axis 1812. A noticeable distance 1816 between axis A and axis B is provided to indicate axes B, C, D, and E are bringing context to the emails although they are not of the same nature. An increased noticeable distance 1820 can be appreciated between axes E and F exemplifying axis F is even less related to axis A although providing information thereon that is considered useful within the context of the workspace 1632. It can be appreciated how all these axes are ending to the right with the now present moment 1604. Axis B is displaying maintenance documentation, axis C is displaying the workflow of the project, axis D is displaying the latest documents filed in the project from the technicians of which the most recent document is the one in focus 1704 by the user. Axis E is illustrating elements detailing the latest defects found in the project. Axis F is a listing of the AI agents that are proposed by the systems to do support work for the user within the present situation. The AI system has the possibility to create a layer 1824 (or multiple layers) superposed on top of the workspace 1632 for picturing specific correspondences among the displayed elements on a topic.

A defect 1828 has been identified by an AI system on axis E in FIG. 22. The defect is represented with a shaded visual distinctive feature 1832 that is representing a particular mechanical system, for instance, the clutch system for the sake of the present explanation. The clutch system defect has been identified by the AI system, creating a layer 1836 of connectors 1840 interconnecting the sequence taken to correct it. The layer 1836 begins with an arrowed connector 1844 indicating the logical beginning of the layer leading to event E 1848 representing the defect formally recognized in the workflow of axis C. The sequence leads to shaded email 1852 associated with the clutch system. This email 1852 includes three attachments a, b, c that can be appreciated on expanded axis G. The sequence layer is further reaching the last email sent regarding the defect with the clutch system to finally identify two clutch system maintenance manuals 1856.

Figure 23:
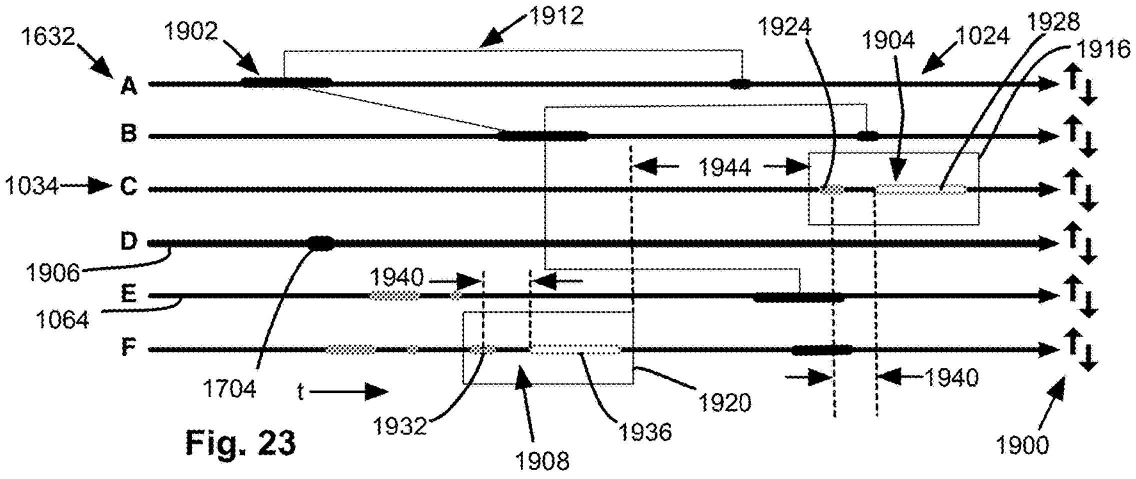
FIG. 23 is an exemplary schematic visual depicting a workspace of axes of information elements illustrating patterns in accordance with an illustrative embodiment of our work.

It is known pattern recognition allows the application of a pattern in a domain to another domain to bring attention to a situation that might not have been obvious at first with another domain. Appreciating patterns from one field to another is often nurturing innovative solutions. Moving now to FIG. 23 depicting a series of zoomed out schematic axes 1034 A-F removing the details of individual elements disposed thereon and focusing on groups and clusters of elements 1016 to illustrate patterns recognition within the AB-GUI 1024. The illustrative axes 1034 are disposed horizontally and parallel to each other, with the ability to re-order them 1900. The timeline of each axis is displayed with groups or clusters 1902 of elements superimposed thereon. Selected axis 1906 D, the foundational axis having the focus of the user, is illustrated with a darker timeline. A primary pattern 1904 can be appreciated by the AI system on axis C associated with, for example, a transmission system. The identified pattern is a sensed out of range input followed by an undesired mechanical effect, distanced by a period of time. A comparable secondary pattern 1908 can be found by an AI system on axis F associated with an engine system. In this embodiment, the AI system can graphically highlight these two patterns using a pattern recognition layer 1912 including a primary pattern identification frame 1916 bringing attention of the user to the primary pattern 1904 and the secondary pattern identification frame 1920 drawing attention to the similarity of the identified two comparable patterns. In that situation, the primary pattern is composed of abnormal vibrations 1924 captured with sensors of the transmission system and followed by a rupture 1928 of a particular transmission member. A pattern correspondence with the engine system illustrated on axis F is highlighted with second pattern identification frame 1920. The engine system sensors have sensed an unusual rise in temperature 1932 that has caused unusual vibrations 1936 in the engine. The AI pattern recognition system is also appreciating that a similar delay in time 1940 between the transmission vibration and the rupture of the member is analogous to the raise in temperature and the consequential vibrations of the engine. The layer is also allowing for graphically representing the engine system issues happened a moment 1944 before the transmission system issues. Of course, this mechanical example is for illustrating purposes, and a skilled reader would understand the pattern analogy could have been made with respect to another field, analyzed with different inputs and be otherwise presented graphically as long as the user can appreciate the highlighted patterns.

Figure 24:
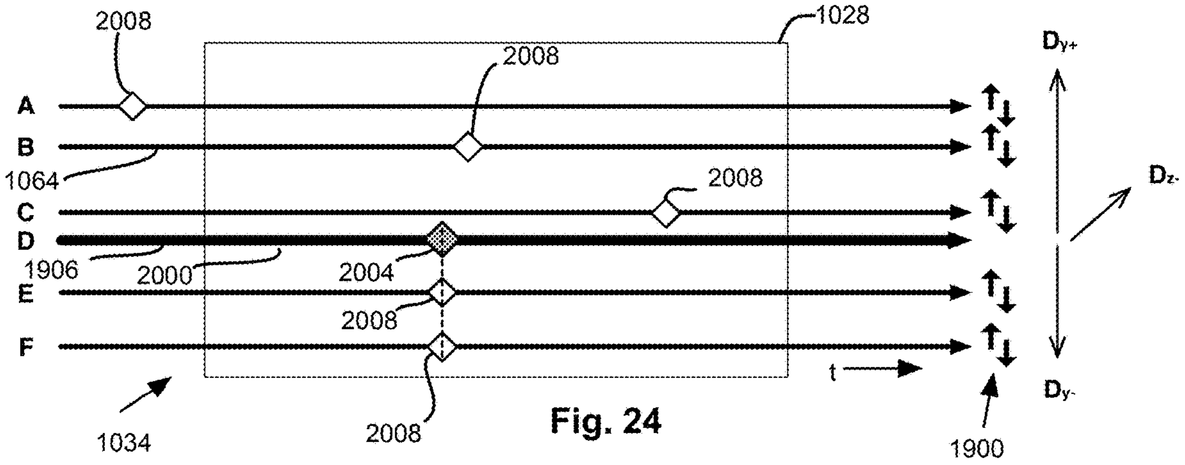
FIG. 24 is an exemplary schematic visual depicting a workspace of axes of information elements indicating clusters and patterns thereon in accordance with an illustrative embodiment of our work.

As briefly stated above, the proximity between axes can reflect the relevance with respect to the contextual work of the user and be analyzed and managed by the AI system. The distance between selected axis D 1906, illustrated with a bolder timeline 1064, and other axes can be considered three-dimensionally as indicated with coordinates Dx, Dy, Dz in FIG. 24. Axis D being the selected foundational reference axis D 2000, one can appreciate axis C is closer to axis D, hence reflecting a high level of relevancy. Axis B is farther from foundational reference axis D, indicating a reduced relevance. The direction in which the axes are displayed with respect to reference axis D can have other meanings. For instance, axes located on top of the foundational reference axis D 2000 could be reference documents related to the topic expressed with axis D, axes disposed below the reference axis D 2000 could be technical reference documents, and axes toward the depth of the display portion 1028 could be older historical versions of the elements present on the reference axis D 2000, however, not illustrated.

Figure 25:
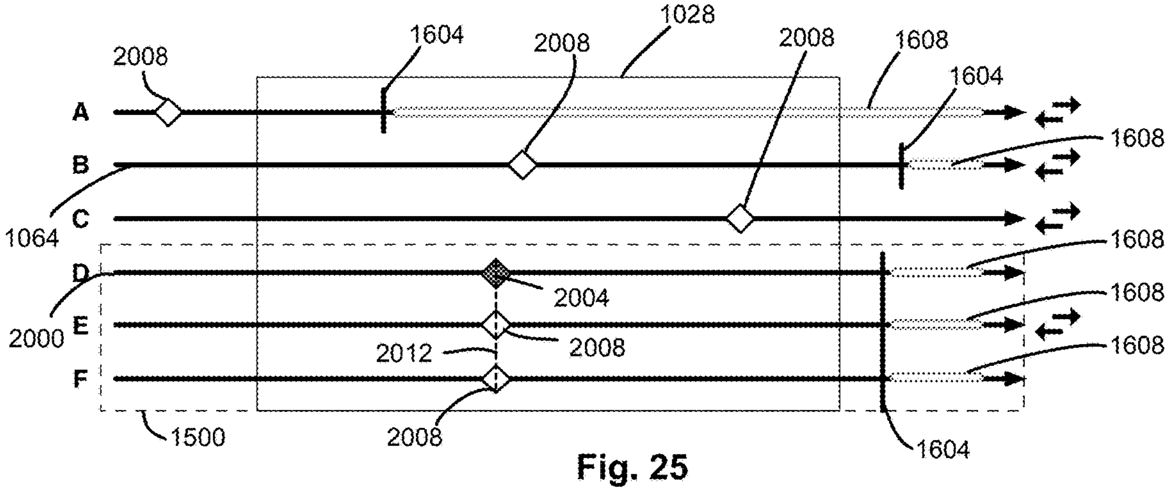
FIG. 25 is an exemplary schematic visual depicting a workspace of axes of information elements indicating positions of relevant information elements in accordance with an illustrative embodiment of our work.

An element is selected 2004 by the user on foundational reference axis D. The AI system can analyze the context, the user's behaviors, content specifics and attributes of the selected element 2004 and axis D, inter alia, to suggest useful contextual axes and proposing contextually relevant elements on other axes to support the work done by the user. The AI system has found one relevant element 2008 in each axis, as illustrated in FIG. 20, where one can appreciate the relevant element 2008 on axis A is outside the display area 1028. Conversely, the relevant element 2008 on axes B and C are not timely aligned on their respective timelines with respect to the selected element 2004 on axis D. Conversely, the AI system is suggesting a timely alignment 2012 of the relevant elements 2008 on axis E and F. FIG. 25 is exemplifying another workspace structure from FIG. 23 with axes A-F. In this embodiment, each axis includes a now-present-moment portion 1604 followed by respective future portion 1608. Axes D, E, F are forming a group 1500 sharing the same now-present-moment 1604.

Figure 26:
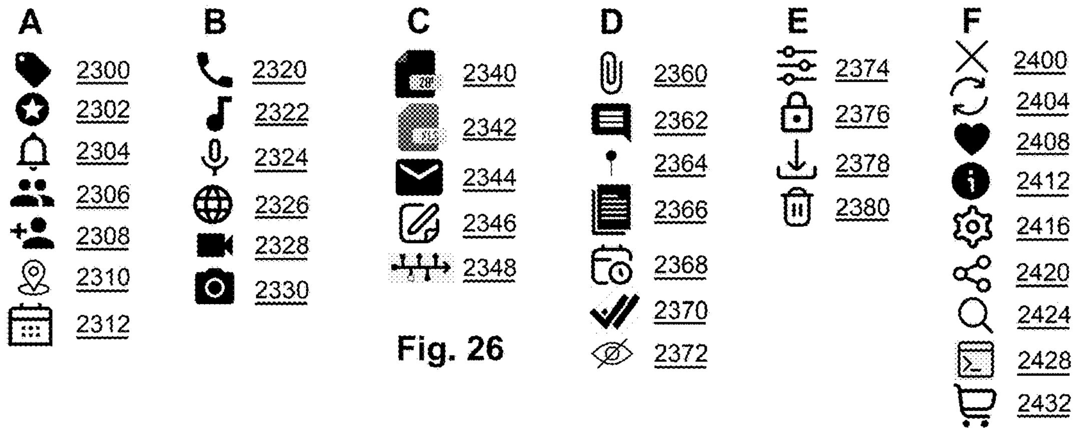
FIG. 26 is an exemplary illustrative icons depicting different statuses and functions associated with the user interface in accordance with illustrative embodiments of our work.
Figure 27:
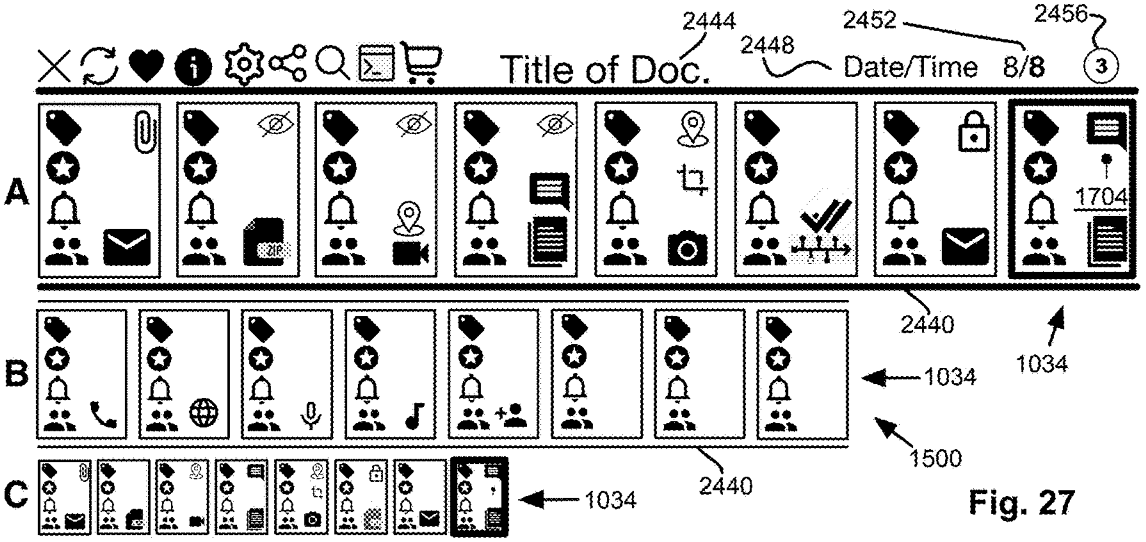
FIG. 27 is an exemplary schematic visual depicting three axes displayed with different zoom levels in accordance with an illustrative embodiment of our work.

Each document 1016 can be embodied with different notifications or alert signals. FIG. 26 illustrates different icons representing different attributes, which provide meanings and functions, associated with the documents. Column A is displaying a series of icons that can be generally associated with the documents: attributes 2300; importance 2302; alarm 2304; shared with other users 2306; sharing with a new user 2308; geo-localization 2310 and time-sensitive log 2312 associated with the document. Column B is generally presenting multimedia icons associated with content like; phone call 2320; music 2322; voice memo 2324; weblink 2326; videos 2328 and photos 2330. Column C is exemplifying some document types like Zip files 2340; spreadsheet files 2342; emails 2344; notes 2346 and workflow settings 2348. Column D is generally displaying icons associated with a document like; an attachment 2360; a note 2362; a pinpoint 2364 applied within a graphical document; copies of the document 2366; time associated to the document such as insertion and modification dates 2368, properties of the document 2370 and seen/unseen 2372. Column E is associated with icons for general settings like: settings 2374, lock access 2376; download 2378 and put in trash 2380. Column F is associated with functions related to an axis or a group of axes, as illustrated in FIG. 27. More precisely, close axis 2400; refresh axis 2404; favorite 2408; information about the axis 2412; settings 2416; sharing 2420; search 2424; prompt 2428 and shop 2432 tools, AI agents, and among others. One can appreciate the icons are usable in toolbar 2460 disposed on top of axis A in FIG. 27. The toolbar 2460 is allowing users to interact with the group of axes A, B and C according to the illustrated embodiment.

Axis A in FIG. 27 is shown with bold axis borders 2440 indicating it is the selected axis that is including the focused element 1704. Axis B and axis C are illustrated with different zoom levels in accordance with embodiments. Each document in axis A, B, and C is illustrated with an arbitrary paper sheet format including different relevant icons respectively associated therewith. It can be appreciated the title 2444 of the focused element 1704 and its associated date and time of insertion 2448 are indicated on top of Axis A. Additional information related to the position 2452 of the focused element 1704 along its axis is indicated at the far right of the upper portion of the group of axes. Circled no. 3, 2456 indicates there are three unseen documents along the active axis.

Figure 28:
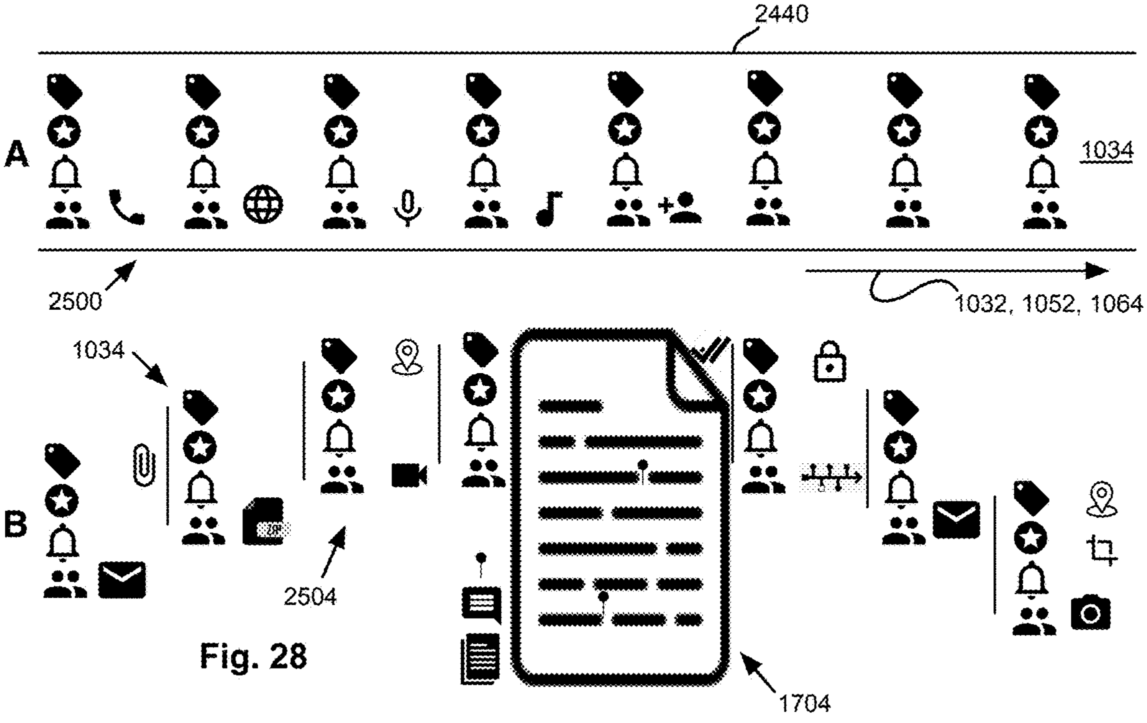
FIG. 28 is an exemplary schematic visual depicting two axes displayed with different designs in accordance with an illustrative embodiment of our work.

FIG. 28 illustrates axis A and axis B in lighter graphical embodiments that could be more suited for spatial computing and screen-less environments. Axis A is exemplified with a rectilinear shape 2500, whereas axis B is embodied as a semi-circular shape 2504 that could be more convenient with AR/VR following the natural line of sight around the user.

Narrative Productivity Suite

A narrative structure and a storytelling framework provide a human-centric context that is universally usable for sharing knowledge. The narrative structure supports logical sequences of artifacts in association with respective other components along a timeline. Actions of the user in the AB-GUI are contextualized within a narrative structure, hence providing contextualized user behavioral data, as illustrated in FIG. 29. This contextualized user behavioral data can be used in data training sets for AI model training.

Embodiments are generally presenting digital storytelling, allowing interactions with different information elements accessible through a graphical user interface. Other embodiments are concerned with a natural narrative evolution provided by user's actions and behaviors that are not necessarily in connection with direct user-computer interactions through a graphical user interface. In the former case, the narrative structure becomes the landscape in which users perform their work in a digital environment. Selection, navigation, and other actions and behaviors of the user are associated with respective temporal references, tracked and analyzed within the context of the displayed narrative structure. In the situation of a natural narrative, movements of the user, language, communications with other people, recording image/sound, biometrics and other user actions could serve as a base for natural behavioral user data that are mostly independent from direct user interactions with a user-interface adapted to receive physical inputs from the user. Natural behavioral data could be used independently or collectively with other types of behavioral data.

It is desirable to consider as many types of information elements as possible to get an optimal perception of a story. Embodiments of the inventions could provide a productivity suite that integrates a range of application types, including email clients, document editing tools, spreadsheets, presentations, video conferencing, file storage, and calendaring, among others. Additionally, various AI tools, such as LLMs, agents and other AI tools would be part of the suite to generally cover the user's experience. The suite might be architected to support seamless collaboration and automation through deep integration of its constituent tools, all of which could be underpinned by a cloud infrastructure. This infrastructure may provide centralized storage, distributed computation, and real-time data synchronization across users and devices, thereby enabling a comprehensive, fluid and responsive user experience.

At the heart of such a suite, a comprehensive behavioral data collection framework could be implemented. The system might capture behavioral data, user interactions and engagement data at multiple levels of granularity using available input signals, with telemetry or not. For instance, user interactions could be logged through JavaScript event listeners embedded within the adaptive AB-GUI, capturing events and actions such as clicks, scrolls, file accesses, navigation between interface elements and applications interactions. Keystroke-level data may be collected, particularly in the context of AI-powered features such as predictive text and pattern recognition, thereby enabling the system to refine natural language processing (NLP) models. Collaboration patterns might be tracked by monitoring document edit histories, comment threads, the temporal dynamics of multi-user editing sessions and other collaborators' interactions.

Device and operating system data could also be collected, including screen resolution, browser type, and crash logs, which might be transmitted via client-side telemetry modules. For voice and video interactions, the system could capture quality metrics, speech recognition data, and expression cues, which may be processed by audio and video AI models to enhance user experience in conferencing scenarios, among other applications. Behavioral data acquisition could occur through a combination of APT call logging, analytics frameworks, and administrative telemetry feeds. This multi-channel data acquisition might enable the system to build a rich behavioral profile for each user and organization, while supporting de-identification and anonymization protocols to comply with ethics, privacy regulations and organizational policies.

The technical purposes for collecting behavioral data could be diverse. For example, the data might be used to optimize user experience (UX) by analyzing usage patterns, such as time spent in specific documents, applications, frequency of feature usage, selection of axes and navigation flows along axes. Collaboration data may inform the development of smart suggestions and team efficiency models. Search and navigation telemetry could be leveraged to improve relevance scoring and simplify user interfaces. Voice and video data might be used to enhance speech recognition and video quality, while system telemetry could support platform stability and diagnostics.

Input behavior data, such as typing speed, grammar edits, and suggestion acceptance rates, may be used to train and refine NLP models. The system could also track interface navigation events (e.g., axes scrolling, element selection and uprooting, communications with users, tab switches, menu selections), graphical actions (e.g., drag-and-drop, icon usage), and feedback mechanisms (e.g., dismissals, undo actions, bug reports). Cognitive and psychological cues, such as hesitation, repeated edits, and sentiment in text, might be analyzed to trigger adaptive AI responses. Conversational data, including reply tone, response time, and chat interactions, could be used to tune conversational AI models.

The data collected generally falls into several comprehensive categories in which atomic actions are the basic operations representing a single user input or interaction. Examples include: click events (e.g., single clicks, double-clicks on buttons or timeline nodes), drag and drop (e.g., Initiating and completing a drag operation on timeline artifacts or GUI elements), hover (e.g., Dwell events such as hovering over a timeline node or toolbar item), scroll and zoom (e.g., Navigational events along the timeline axes or within panels), typing and editing (e.g., keypresses, text input, deletions, and modifications) and annotation actions (e.g., Adding notes, comments, or marks on timeline events or documents.) Atomic events are usually accompanied by metadata such as the timestamp of the event, user ID or session, position coordinates, and the specific interface element involved.

Composite behaviors represent high-level interactions that are derived from sequences or clusters of atomic events. They capture patterns indicative of user intent or specific modes of interaction. Examples include: hesitant click (e.g., A prolonged hover (e.g., more than 2 seconds) followed by a click), rapid navigation (e.g., A series of quick scroll or jump actions between timeline nodes), collaborative editing (e.g., Simultaneous edits by multiple users on a shared document or timeline event), error correction patterns (e.g., Multiple consecutive undo/redo actions or repeated edits indicating confusion). These behaviors require aggregation rules that combine several atomic events, including interalia temporal relationships (e.g., how events follow each other), spatial relationships (e.g., adjacent timeline nodes), and contextual conditions (e.g., the active view or tool).

For each recorded event, key contextual elements should be logged as metadata: timestamp and duration (e.g., precise time and duration of each action), user and session identity (e.g., to link behavior to a specific user or flow), device and environment information (e.g., hardware type, screen resolution, input method (touch, mouse, or keyboard), and location if available), current application state (e.g., active timeline, workspace, viewed display area, viewed document, and UT state) and, environmental conditions (e.g., background events (e.g., system performance, network latency) that might affect interaction).

The following outlines several GUI elements that form the context in which user interactions can be captured: GUI components like: interactive widgets (e.g., Controls such as buttons, sliders, checkboxes, and dropdown menus that enable direct manipulation), dynamic toolbars and menus (e.g., Context-sensitive menus that adjust based on the current timeline state or selected node. These toolbars may display predictive prompts or shortcuts to frequently used functions), panels and views (e.g., Different sections of the interface such as document views, collaboration panels, and metadata panels. These are often combined with or overlaid on the timeline view), and collaboration elements (e.g., avatars, notification indicators, chat, and live comment threads that reflect multi-user interactions and shared engagement with timeline elements).

Timeline components like axis timeline (e.g., The narrative backbone along which events, milestones, and artifacts are arranged), timeline nodes/events (e.g., Each node represents an information artifact such as a document snippet, image, video, or other multimedia content. Nodes also incorporate start/end markers, milestones, and intermediate events), adaptive rendering elements (e.g., Widgets that change based on usage frequency and context—from immersive AR/VR components to simplified interfaces on mobile or wearable devices), interaction artifacts (e.g., graphical representations used to mark actions (e.g., annotation highlights, selection borders) that provide visual feedback on user actions).

A series of actions the user can perform within the graphical interface could be separated between: direct manipulation (e.g., The primary set of physical interactions involves clicking, dragging, and resizing interface elements. This includes connecting or disconnecting timeline nodes), navigation actions (e.g., Actions such as scrolling, panning, zooming, and using timeline scrubbers to jump between different narrative phases), data input and text editing (e.g., Typing, selecting text, inputting annotations, and using in-line prompts for predictive text or AI-generated suggestions), feedback and correction (e.g., Actions like accepting suggestions, using undo/redo features, and submitting error reports), collaboration features (e.g., Simultaneous editing, commenting, mentioning other users, and managing document versions in group sessions). Each action generates not only the primary data (e.g., a click event) but is interwoven with contextual cues that define its purpose and consequence within the narrative timeline.

Behavioral data elements are valuable when combined to reveal complex interactions. Sequential combinations: temporal sequences (e.g., Recording the order of actions (e.g., select→drag→drop) enables identifying patterns like hesitation or rapid switching), and action aggregates (e.g., Summarizing averages such as time per interaction, scroll speed, editing frequency, and the number of nodes interacted with). Conditional and contextual triggers: conditional behavior events (e.g., if a user hovers over a timeline node for a specified duration (for example, more than 2 seconds) before clicking, the system logs a "hesitant click." Similar triggers can be set up to capture frustration or exploration modes), and multi-user interactions (e.g., in collaboration scenarios, testing for simultaneous edits or comment overlaps provides insight into group dynamics and shared focus). Aggregation and pattern recognition: composite behavior models (e.g., higher-order functions detect behavior such as "rapid navigation" by evaluating the aggregate movement speed and frequency of timeline jumps), and anomaly detection (e.g., Aggregating data to flag unusual patterns—like unexpected sequences or frequency spikes—helps identify issues that may require adaptive UI responses.)

For the system to capture these intricate interactions effectively, it is useful to define a structured algorithmic model. Below is an overview of an exemplary data model and functions for capturing and classifying behavioral events. A generic event structure may be defined in pseudocode as exemplified in FIG. 30. Composite behaviors can be modeled mathematically as a function over a sequence of atomic events. For instance, a "hesitant click" may be modeled as:

$$B_{hwxitant\_click} = f(\text{hover}(t > 2s), \text{click}) \qquad \text{Equation 1}$$

This is interpreted as: if there is a hover event with a duration t greater than 2 seconds that is immediately followed by a click action, the composite behavior $B_{hesitant\_click}$ is triggered. A general model for composite behavior B can be expressed as:

$$B = f(e_1, e_2, \ldots, e_n \mid \text{conditions}) \qquad \text{Equation 2}$$

where e1, e2, . . . , en are sequential atomic events satisfying defined temporal and conditional relationships. Each composite behavior can be associated with a time of occurrence thereof and a graphical localization in the AB-GUI, should a GUI be utilized.

Table 1 is concerned with information relationships taxonomy associated with interactions with the AB-GUI per se. Portions of the AB-GUI comprise workspaces, timelines, artifacts, among others, each portion adapted to interact with user's actions.

TABLE 1

| Interactions | | |
|---|---|---|
| Class | Subtype | Description |
| Associative | Related concept, thematically linked ("see also") | Lateral relationships—neither hierarchical nor causal |
| Classification | Attribute, value, description | Descriptive or classificatory links |
| Conditional | Applies if, invalidates if, coexists if | Relationships exist under certain conditions/tiggers |
| Elemental | Component of/ contains, aggregation/ extraction | Part-whole, structural hierarchy, parent-child, excerpt relationships |
| Equivalence | Alias, alternate version, synonym | Documents are functionally or operationally equivalent |
| Functional | Supersedes, amends, implements, depends on | Activity, change, or dependency relationships |
| Temporal | Precedes/follows, overlaps, concurrent | How documents are ordered or active in time |

At this point, relationships taxonomy would become apparent to a person skilled in the art. These relationships may be expressed as various logical equations or mathematical statements, all of which are intended to be encompassed within the scope of the present application despite not exhaustively enumerated to lighten the text of this description.

FIGS. 31A and 31B are presenting a detailed list of behaviors that could be performed in conjunction with the AB-GUI and used as in the example above. The behaviors have been separated into different categories to group behaviors with similarities that might cover most user behaviors. The type of behavior is also detailed for categories that are significantly broad. Column C in FIGS. 31A and 31B presents an example of such behavior. Possible ways to collect the behaviors as well as possible inputs and metrics are also provided in FIGS. 31A and 31B. Possible adaptations to story points of view and perspectives are indicated in the last column F. The behaviors falling within FIGS. 31A and 31B and other behaviors not explicitly listed but applicable to user interactions with a digital environment are considered within the scope of the present description.

The AB-GUI might employ this behavioral data to continuously tune features such as autocomplete, search, and smart suggestions. AI and machine learning models could be iteratively trained and improved using this data, enabling the system to provide increasingly personalized and context-aware assistance. Model training could be made locally on the computer system of a collaborator, which could be desirable for confidentiality and independence purpose. Alternatively, model training could be made in a network-centered environment to maximize computing power usage. Administrators might be provided with usage insights and alerts, while A/B testing frameworks could leverage behavioral data to optimize UX layouts and feature rollouts. The system may also employ anomaly detection algorithms to identify and respond to unusual behavior patterns, supporting both security and usability objectives.

The AB-GUI envisions the use of behavioral data to power predictive and prescriptive user experiences. The system could be designed to anticipate user intent, proactively draft communications, suggest meetings, survey similar matters, timely provide alternative perspective timelines and surface relevant files based on observed behavioral cues. Interfaces might be dynamically adapted to individual user habits and environmental contexts, with prescriptive actions triggered by delays, repeated errors, or signs of cognitive strain. The integration of advanced AI assistants could enable continuous learning and support, further enhancing the adaptability of the platform.

The AB-GUI could support the concept of "Behavior-as-a-Service" (BaaS), wherein anonymized behavioral datasets and real-time insight streams might be offered as a service to enterprises. This could enable third parties to build optimized user flows, train custom AI models, benchmark behavior patterns, and detect friction points across digital tools. Example use cases might include UX firms analyzing onboarding drop-off rates, health startups detecting cognitive strain in telehealth interactions, biometrics and HR platforms integrating behavioral data into productivity scoring.

The system architecture could be designed to address several technical limitations, including compliance with privacy regulations (such as General Data Protection Regulation (GDPR), Health Insurance Portability and Accountability Act (HIPAA), and California Consumer Privacy Act (CCPA)), support for user and organizational opt-out mechanisms, data anonymization to prevent user-level identification, and adaptation to enterprise firewall constraints. Device variability might also be accounted for, with behavioral models adjusted to accommodate differences in user behavior across platforms and devices.

AB-GUI logic could be a central component of the system, enabling the platform to respond visually to behavioral data. The AB-GUI might be designed to be context-sensitive, with dynamic toolbars, layout suggestions, predictive in-line prompts, and modular rendering based on usage frequency. The AB-GUI could be further optimized for emerging modalities, including voice/UI blending on mobile and desktop, and adaptive rendering for augmented and virtual reality environments.

The AB-GUI is also adapted to the evolution of ambient computing, wearables, screenless interactions, and mood-adaptive layouts. The suite could be positioned as an intuitive, adaptive nervous system for digital work, capable of supporting a wide range of user experiences through narrative intelligence, integration of behavioral data, AI, and advanced GUI logic.

According to embodiments, narrative/storytelling and behaviors are co-analyzed to improve narrative/storytelling, to provide additional context to documents, information elements and other artifacts part of or excluded from the narrative/storytelling. Enrichment of data and determination of behavior associated therewith is a process of contextualizing data and behaviors, which contextualized data and behaviors can be provided as a product, e.g. dataset(s), that can be used to train AI such as LLMs not related to storytelling.

Furthermore, content of dataset(s) may be anonymized for privacy reasons and/or tokenized for value itemization reasons, for marking ownership, and/or providing monetary returns for participations in data training as illustrated in FIG. 11. Datasets may further be curated, cleaned from unnecessary data, standardized, and/or modified for storage purpose and/or based on downstream use of the dataset(s). For instance, data of datasets may be subject to annotating, and structuring, with attention to reproducibility, bias mitigation, and explainability. Automated testing routines may be employed to check for corrupt entries, missing timestamps, or incorrect session identifiers. Processes may be put in place for ensuring that every logged event conforms to predetermined formats to mitigating downstream errors in feature extraction. Curating may include data processing regarding noise and limiting redundancy impact.

Individual Behavior vs. Grouped Behaviors in Storytelling Systems

In some embodiments, systems and methods for interactive storytelling could be designed to distinguish and model both individual and grouped behaviors within a narrative structure. While traditional adaptive systems may focus on the linear, preference-driven actions of a single user, the present approach recognizes that group engagement introduces a layered dynamic characterized by negotiation, shared focus, and collective decision-making. By capturing and profiling group behavioral signatures—distinct from those of individuals—the storytelling platform can be enhanced to deliver narratives shaped not only by personal engagement, but also by the evolving rhythm and consensus of the group as a whole. This distinction could enable the development of more immersive, collaborative, and contextually adaptive digital experiences.

Individual behavior within such systems may refer to the unique patterns, preferences, and interactions of a single user. This can include selection, navigation paths, content focus, search queries, command inputs, and emotional or cognitive responses to narrative content. The system could leverage these signals to personalize the storytelling experience, dynamically adapting pacing, tone, and content structure to align with the user's intentions and engagement style. For example, if a user repeatedly interacts with financial data or issues voice queries about budgets, the system may prioritize and visually expand related content along a narrative axis.

In contrast, group behavior may emerge when multiple users interact with shared content or interfaces, such as during collaborative editing or team-based decision-making. Group behavior analysis could identify patterns of common interest, conflict, collaboration rhythms, and social signals—such as frequency of comments or levels of agreement on specific topics. The AI system can be designed to construct narratives that reflect group consensus, highlight points of divergence, and adapt to the evolving dynamics of the collective, rather than optimizing solely for individual perspectives.

The distinction between individual and group behavior is significant. Individual behavior typically generates linear, personal data trails, while group behavior produces multi-threaded data, including co-edits, response times, and inter-comment alignment. Group systems may require mediation between multiple, sometimes conflicting, inputs and priorities, and must visualize not just personal journeys but the shared flow and memory of the group.

By modeling group behavior, storytelling systems could provide several utilities: surfacing consensus-driven story paths, visualizing alignment or disagreement, resolving conflict and ambiguity by highlighting tension zones, replaying shared memory of group interactions, and optimizing collaboration flow by identifying blockers or successful decision pathways. These capabilities can enable more effective, transparent, and engaging collaborative storytelling experiences.

The amount of behavioral data could be quite high, and curating the raw data might be desirable. There are however pros & cons regarding raw vs massaged behavioral events. For instance, raw behavioral events pros could a) preserve all data; retains full detail and nuance, b) enable the AI system to uncover unexpected patterns, c) no preprocessing overhead: saves time and resources by skipping data cleaning or structuring, d) real-time suitability; ideal for streaming data or immediate analysis, and e) model flexibility: allows advanced AI models to learn directly from unfiltered data. Raw behavioral events cons could a) provide noisy data; contains irrelevant or redundant information, potentially reducing output quality, b) demand complex prompting; requires sophisticated prompts to guide the AI through unstructured data, c) be resource intensive: processing raw data demands more computational power, and d) deal with inconsistent formats; varied data structures can hinder consistent AI performance.

Massaged behavioral events pros could provide a) cleaner data; structured and filtered data improves AI output accuracy and relevance, b) simpler prompting; easier to craft effective prompts with standardized inputs, c) efficient processing; lower data volume reduces computational demands, and d) consistency; uniform formats enhance reliability across tasks. In turn, massaged AB-GUI for all events cons could provide a) data loss; preprocessing may remove valuable details or context, b) preprocessing effort, c) require time, expertise, and resources to clean and structure data, d) bias risk; human-defined preprocessing can introduce assumptions or biases, and e) limited flexibility; tailored data may restrict the AI's ability to explore alternative insights. Raw behavioral events would be best for exploratory tasks, real-time applications, or when using advanced models capable of handling noise. Massaged events would be preferred for specific, well-defined tasks, efficiency, or when working with simpler models. A hybrid approach could suggest light preprocessing that can balance detail retention with usability. An example of a pseudo-code of a short routine that could massage raw events data of document clicking and generate meaningful curated data usable in an AI prompt is illustrated in FIG. 32.

LLM, LDM and LBM, Description of Model Types and their Interactions

Embodiments of the present invention use contextual data for instructing and training AI models. Contextual data includes user behavior information, element content and metadata, information about the axes displayed on the AB-GUI among other possible contextual information. In the context of the present application, a "model" generally refers to a standardized representation of information, thereby enabling consistent processing, storage, and retrieval of data. An "AI model" or "large model" denotes a foundational component of modern AI systems, capable of processing vast quantities of data and supporting advanced reasoning, language understanding, and behavioral adaptation.

Figure 33:
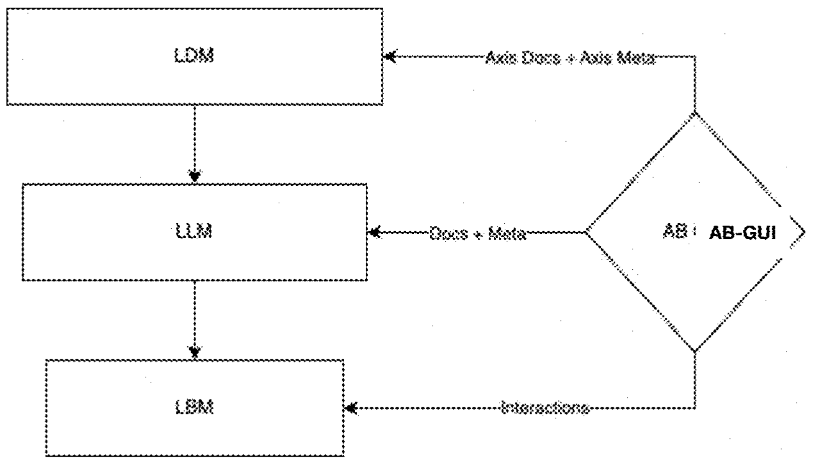
FIG. 33 is an exemplary schematic visual depicting interactions between the user interface, a large document model, a large language model, and a large behavioral model in accordance with an illustrative embodiment of our work.

Within AI systems embodiments, particularly those employing large-scale models for documents, workflow management and user behaviors and interactions, three principal model types can be defined: Large Language Models (LLM), Large Document Models (LDM), and Large Behavioral Models (LBM) as illustrated in FIG. 33. While an LLM may be suitable for a broad range of uses, the volume of data and the speed requirements for optimal system performance may make it desirable to partition the AI system into more specialized model types. Specialized model types might be desirable to prevent the LLM from considering data from different users (or specialized fields) as general knowledge and leeching data between different users (or specialized fields). Each model type may serve a distinct function within the overall architecture, thereby enabling a comprehensive, adaptive, rapid, and context-aware system for information processing and user interaction. The present application describes these different model configurations. Although an LLM may function adequately as a standalone solution, the alternative model configurations described herein may offer improvements in computational efficiency, operating speed, user-friendliness, and model precision.

The LDM can be described as a high-level conceptual model configured to represent documents and their associated metadata, attributes, and thematic structures. The LDM operates at the level of document concepts, themes, temporal sequences, and inter-document relationships. It maintains standardized representations of information, including document identifiers, cross-domain links, and metadata such as creation dates, authorship, and document type. The LDM provides a global perspective of the document corpus, enabling the system to comprehend the overarching structure, temporal evolution, and thematic organization of the information space. The LDM is particularly suited for tasks involving document sequencing, timeline navigation, and the suggestion of relational axis and documents based on global context.

The LLM generally operates at a finer level of granularity, focusing on the content of documents, linguistic structures, and references within the text. The LLM is responsible for parsing, generating, and understanding natural language content, thereby providing detailed analysis and synthesis of document information. The LLM leverages large-scale, foundational AI models, such as those developed by OpenAI™, to process and generate human language with high fidelity. While the LLM excels at content-level tasks, it may exhibit limitations in handling temporal information, user-specific context and user behaviors, which may be more effectively addressed by the LDM and LBM, respectively.

The LBM is generally specialized in user contextualization, capturing and modeling the habits, preferences, and behavioral tendencies of individual users or user groups. In the case of local models, the LBM maintains a personalized context, which may be propagated or shared with other users or groups as required. The LBM enables the system to efficiently adapt its suggestions, actions, and document navigation strategies to the specific needs and patterns of the user, possibly making it the primary source for user-centric decision-making. The LBM is particularly effective in predicting user actions, suggesting relevant documents, and tailoring the user experience based on historical behaviors.

Figure 34:
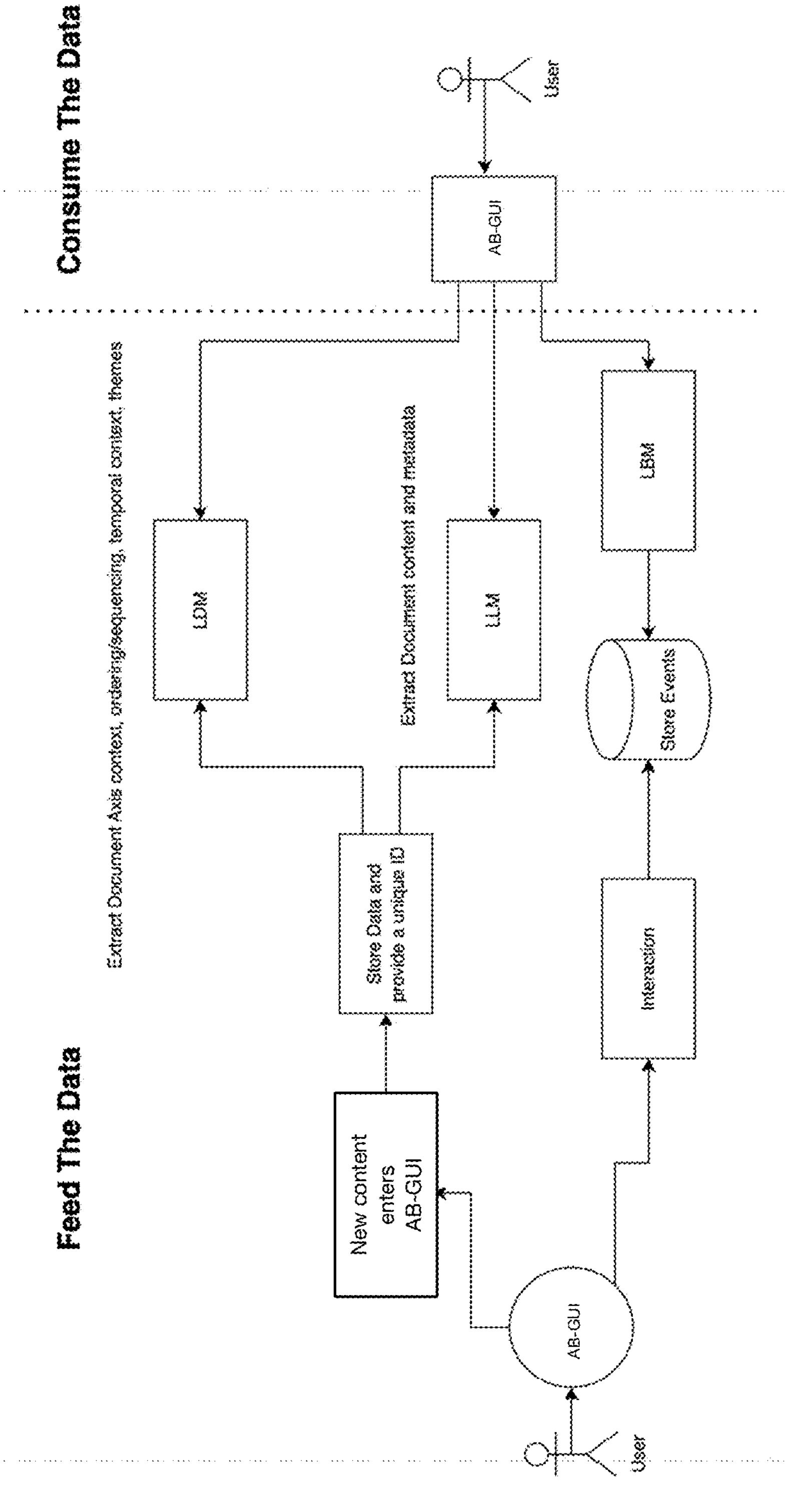
FIG. 34 is an exemplary schematic visual depicting interactions between a user, the user interface, the large document model, the large language model, and the large behavioral model in accordance with an illustrative embodiment of our work.

A flow chart exemplifying the interaction of a user feeding the data and consuming the data throughout the AB-GUI and potentially using an LLM, LDM, and LBM as illustrated in FIG. 33. The user is exemplified with two roles. The user illustrated on the left of FIG. 34 "feeds" information through the AB-GUI by adding new content or having interactions through the AB-GUI, both stored in respective storage that are operatively connected to the different models. Conversely, the user on the right "consumes" information through the AB-GUI, accessing the different models according to the AB-GUI requests. A "tool" or a Retrieval-Augmented Generation (RAG), could be placed between the store and the models. The tool offering more abstraction to connect various resources, parameters and databases with a variety of contexts. The RAG being more adapted for text data corpus. Contextual behavioral data is different than simple text because it includes time, parameters and attributes associated with the user's actions. A simple prompt can be enriched with contextual behavioral data using a tool prior to submitting the enriched prompt to the models.

The system architecture may incorporate a state machine or decision logic to determine which model should be invoked for a given task. Factors influencing model selection may include the nature of the query (conceptual, content-based, or behavioral), the required level of granularity, and the temporal or contextual requirements of the operation. For example, when suggesting the next document in a workflow, the LDM may provide a global document-based perspective, while the LBM may refine the suggestion based on user-specific, behavior-based trends. The LLM may be engaged for detailed content analysis or generation tasks.

While LLMs are capable of processing and reasoning about dates expressed in a variety of formats—including absolute dates (e.g., "Apr. 3, 2025", "03/04/2025") and relative references (e.g., "yesterday", "next week")—there exist certain practical limitations inherent to their operation. LLMs rely on the explicit context provided within the user's query or the surrounding AB-GUI layout. In cases where date expressions are ambiguous, such as "02/03" (which may refer to either February 3rd or March 2nd depending on regional conventions), the model may require additional clarification to ensure accurate interpretation.

Furthermore, LLMs do not possess real-time temporal awareness. Their understanding of dates is generally derived from the data available at the time of training and from contextual information supplied during inference. As such, while an LLM may be able to reference the current date or perform calculations based on provided temporal data, it does not have an intrinsic perception of the passage of time. Complex or culturally specific temporal references may also present challenges, particularly if such expressions fall outside the scope of the model's training corpus.

Additionally, the precision of an LLM's responses regarding historical or future events is contingent upon the breadth and depth of its training data. For obscure or hypothetical events not covered within its dataset, the model may be unable to provide detailed or accurate information. In general, LLMs are effective at handling date-related queries when the input is clear and sufficiently contextualized but may prompt the user for clarification in cases of ambiguity or insufficient context. To facilitate seamless information flow and maintain context across different model layers within the system, each content item is assigned a unique identifier (such as an elementId or binaryId). When a query is processed, the initial model layer returns a list of documents that match the specified criteria, each referenced by its unique identifier.

Subsequent models in the reasoning chain leverage these identifiers to retrieve the relevant document content. This is achieved through the integration of dynamic tools or functionalities within the LLM, enabling the model to access and incorporate the contents of referenced files into the active memory context of the query. This mechanism ensures that each model in the processing pipeline can efficiently access, utilize, and build upon the outputs of preceding models, thereby supporting robust, context-aware reasoning and information retrieval throughout the system.

Three techniques can generally be used to optimize the performance of a model: prompting multi-hyphen shot, chaining and tools, RAG and fine-tuning. These techniques have pros and cons listed in Table 2 below:

TABLE 2

| Performance optimization techniques | | |
|---|---|---|
| Prompting | RAG | Fine-tuning |
| Pros | | |
| Fast to implement | Accuracy improvement with low data needs | Deep expertise and specialist knowledge |
| Low cost | Scalable | Nuance |
| After an immediate improvement | Efficient | Learn a different tone/style |
| | | Faster and cheaper inference |
| Cons | | |
| Limited by context length | Harder to implement | Significant effort to implement |
| Diminishing returns | Requires up-to-date, accurate data | High data needs |
| Slower, more expensive inference | Lacks nuance | Training cost |
| | | Risk of "catastrophic forgetting" |

Figure 35:
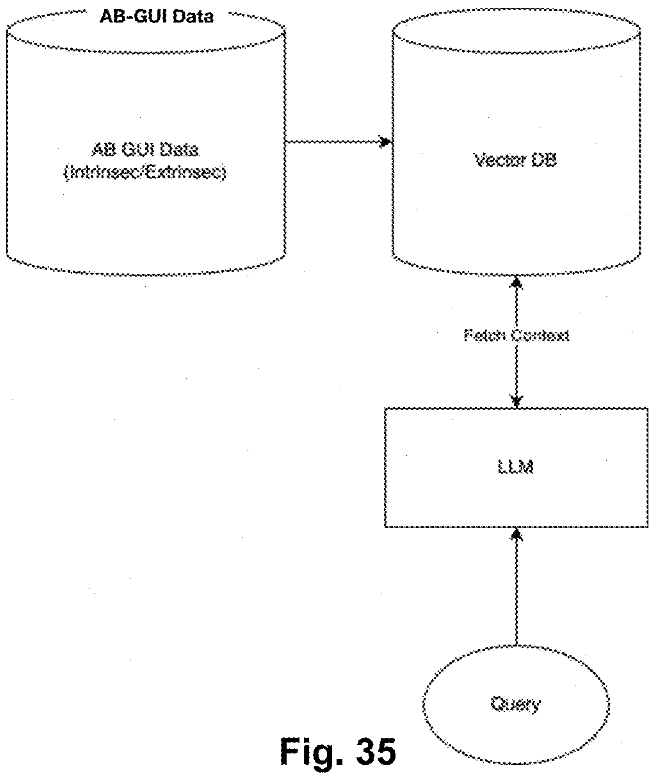
FIG. 35 is an exemplary schematic visual depicting a possible Retrieval-Augmented Generation (RAG) system configuration in accordance with an illustrative embodiment of our work.

An illustrative RAG system is depicted in FIG. 35 where the RAG is connecting to the AB-GUI data. Alternatively, a tool would be more appropriate to connect the LLM to a wider variety of external resources.

Construction and Training of Models

According to embodiments therein, the construction of each model type—LLM, LDM, and LBM—should a multi-model architecture be utilized, follows a systematic, multi-stage process designed to optimize the model's performance for its intended function within the overall system architecture. The LLM is constructed through a pipeline that begins with the collection of raw text data from diverse sources, such as books, articles, web pages, and curated datasets. This data is gathered by a data collector module, which aggregates the text files for further processing. The collected text is then subjected to a preprocessing stage, wherein noise such as HTML tags, special characters, and typographical errors are removed, and the text is standardized (for example, by converting all characters to lowercase). The cleaned text is subsequently tokenized, breaking it down into smaller units—tokens—using algorithms such as Byte-Pair Encoding or WordPiece. A vocabulary is then constructed from these tokens, defining the set of unique tokens the model will recognize. The tokenized text is mapped to numerical identifiers, creating sequences of numbers suitable for machine processing. These sequences are input into a neural network architecture, typically a transformer model comprising embedding layers, attention mechanisms, and feed-forward networks. The model is trained on this numerical data using optimization techniques such as gradient descent, with a loss function guiding the adjustment of model weights. After initial training, the model is evaluated on a separate validation set to assess its performance. Based on evaluation results, the model may be further refined through additional training or hyperparameter tuning. Once finalized, the model is packaged, optimized for deployment (e.g., through quantization), and made available for use in applications such as chatbots or text generation tools, where it processes user input and generates output text.

The LDM construction process is initiated by collecting a wide variety of data and files, including text documents, PDFs, and web pages, which collectively form the knowledge base for the system. These files are cleaned and tokenized to prepare them for document-level embedding using algorithms such as Doc2Vec. Each document is assigned a unique label or identifier, enabling the model to learn document-specific representations. The labeled documents are processed by the Doc2Vec algorithm, which may operate in Distributed Memory or Distributed Bag of Words mode, to learn dense vector representations for both documents and their constituent words. These vectors, typically of fixed dimensionality (e.g., 300 dimensions), are stored in a vector database for subsequent use. The document vectors can be integrated into the LLM architecture, either by initializing the embedding layer of a transformer-based model or by serving as a retrieval mechanism during inference. The LLM may then be fine-tuned using these document embeddings in conjunction with a large text corpus, allowing the model to incorporate document-level context into its predictions. The performance of the integrated system is evaluated on relevant tasks and, once validated, the model is deployed for real-world use, capable of leveraging document vectors to enhance its understanding and generation of text.

The LBM is constructed by systematically recording user interactions within the AB-GUI, application environment, including the geospatial context of each event. Geographical localization and biometrics could also be included in the large behavior model. These interactions are stored in a structured database, forming a comprehensive log of user behavior. The recorded behavior-based events are then utilized to provide contextual input to an AI model, which is trained to infer the statistically most probable action a user might take in a given context. This behavioral modeling enables the system to anticipate user needs, personalize recommendations, and optimize user experience by leveraging patterns derived from historical user data.

The present description contemplates multiple approaches for training large-scale models, including both the reuse of existing models through embedding mechanisms and the construction of custom models trained from scratch. These approaches enable the system to be flexibly adapted to a wide range of tasks, domains, and user requirements. In one embodiment, the system may leverage pre-existing models by utilizing embedding mechanisms to incorporate proprietary or domain-specific data and context. This approach allows for the integration of new information into established model architectures, enabling the generation of outputs that are tailored to specific applications without the need for full retraining. By injecting custom embeddings or contextual vectors, the system can adapt the behavior of the underlying model to new data sources, user preferences, or operational contexts, thereby enhancing the relevance and accuracy of generated outputs.

Alternatively, the system may be configured to train custom models from the ground up. This process begins with the definition of the model's goal and scope, which determines the nature of the data required, the model architecture, and the computational resources necessary for training. A large and diverse dataset is then assembled, typically comprising terabytes of text from sources such as web crawls, books, articles, and user-generated content. The data is rigorously preprocessed, including tokenization, cleaning, deduplication, and shuffling, to ensure high quality and diversity.

The model architecture is selected based on the intended application, with transformer-based architectures being preferred for their ability to handle sequential data and complex language patterns. Key architectural parameters, such as the number of layers, attention heads, and vocabulary size, are determined in accordance with the desired model capacity. Training is conducted on high-performance hardware, utilizing parallelism and efficient storage solutions to manage the substantial computational demands. The training objective typically involves autoregressive language modeling, where the model learns to predict the next token in a sequence, with optimization performed using techniques such as AdamW and learning rate scheduling.

Throughout training, the model's performance is monitored using metrics such as perplexity and loss, with periodic evaluation on validation datasets to ensure generalization and prevent overfitting. The training process may span several weeks or months, depending on the scale of the model and dataset. Upon completion, the model is evaluated for coherence, factual accuracy, and bias, with further optimization steps such as quantization or distillation applied to enhance efficiency and deployability.

In another embodiment, the system may employ fine-tuning of pre-trained models to adapt them to specific tasks or domains. Fine-tuning involves exposing a pre-trained model to a smaller, targeted dataset relevant to the desired application, such as domain-specific documents or task-oriented examples. During this process, the model's parameters are adjusted to improve performance on the new data, typically using supervised learning or reinforcement learning techniques. Fine-tuning may involve updating all model parameters (full fine-tuning) or only a subset of layers (partial fine-tuning), depending on the requirements and available data. Regularization techniques, such as dropout and reduced learning rates, are employed to prevent overfitting and maintain the model's generalization capabilities. This flexible training framework allows the system to efficiently leverage both existing and custom-built models, ensuring adaptability, scalability, and high performance across a variety of information processing and user interaction scenarios. The ability to fine-tune or retrain models as needed further enhances the system's capacity to address evolving requirements and operational contexts.

An exemplary procedure to fine-tune a prompt with question and response could generate pseudo code that would fine tune a LLM with a series of document (pdf, doc, images) and their metadata. FIGS. 36A and 36B is an example of a high-level pseudocode outline for fine-tuning a large language model (LLM) using a series of documents (PDFs, DOCs, images) and their associated metadata. The process includes data preprocessing, metadata integration, and model fine-tuning. This assumes 1) access to a pre-trained LLM and a fine-tuning framework (e.g., PyTorch, Hugging Face Transformers); 2) Libraries handle file extraction (e.g., PyPDF2 for PDFs, pytesseract for OCR); 3) Training example combines metadata and content: target is content for auto-regressive tasks; and 4) Hyperparameters are minimal but sufficient for basic fine-tuning.

Mechanisms for Pattern Detection

The present system may incorporate a variety of mechanisms for detecting patterns within data, each tailored to the nature of the data and the objectives of the analysis. These mechanisms include, but are not limited to, machine learning algorithms, statistical analysis, data mining techniques, time series analysis, natural language processing, visualization tools, deep learning architectures, analytical lens analysis, analytical lens analysis and specialized pattern recognition algorithms.

Machine learning algorithms are employed to identify patterns within data without explicit programming. Supervised learning techniques, such as regression and classification, utilize labeled datasets to predict outcomes, while unsupervised learning methods, such as clustering and dimensionality reduction, uncover hidden structures in unlabeled data. Examples include decision trees, random forests, neural networks, and k-means clustering. These approaches are particularly effective for predicting user behavior, detecting anomalies, or grouping similar items. Complementary to Machine Learning (ML), statistical analysis techniques—such as correlation analysis, regression, and hypothesis testing—are used to identify relationships and trends within numerical data, supporting tasks such as trend detection and variable significance testing.

Data mining processes are leveraged to explore large datasets, discovering patterns, associations, or anomalies by combining machine learning, statistical methods, and database systems. Techniques such as association rule mining and sequential pattern mining enable the identification of relationships like "users who purchase X also purchase Y." For data collected over time, time series analysis methods—including ARIMA models, exponential smoothing, and Fourier transforms—are utilized to detect trends, seasonality, and cycles, supporting applications such as project management forecasting or health pattern analysis.

For textual data, natural language processing (NLP) techniques are applied to extract patterns such as sentiment, topics, or named entities. Methods such as tokenization, word embeddings, and topic modeling (e.g., Latent Dirichlet Allocation) enable the identification of common themes in due diligence reviews or other text corpora. Visualization tools, including workspace layers, element clusters on axes, visual distinctive features, charts, heatmaps, and scatter plots, facilitate the visual identification of patterns, outliers, or clusters within narrative datasets, enhancing human interpretability. Tools such as Tableau, Power BI, and Python libraries (e.g., Matplotlib, Seaborn) can be employed for this purpose.

Deep learning, a subset of machine learning, utilizes multi-layered neural networks to detect complex, non-linear patterns in large datasets. Convolutional neural networks (CNNs) are used for image recognition, while recurrent neural networks (RNNs) are suited for sequential data such as text or time series. Additionally, specialized pattern recognition algorithms—such as the Apriori algorithm, string matching (e.g., regular expressions), and principal component analysis (PCA)—are designed to detect repetitive structures or signatures in data, such as frequent genomic sequences.

The choice of pattern detection mechanism is determined by factors such as data type (numerical, textual, image, temporal), analysis objective (prediction, clustering, trend analysis), and dataset scale. Smaller datasets may be effectively analyzed using simple statistical methods, while larger or more complex datasets may require machine learning or deep learning techniques. The integration of large language models (LLMs) enables the AI system to leverage the advantages of these diverse techniques, although the memory context required for analyzing substantial volumes of information may present practical limitations.

To optimize the selection of pattern detection methods, a benchmarking process may be implemented, evaluating each scenario based on processing time, cost, implementation complexity, and required expertise. For many applications, the use of LLMs offers a practical and efficient solution, streamlining the pattern detection process while maintaining adaptability and scalability.

Analytical Models

Analytical models are conceptual frameworks or cognitive structures that individuals or systems use to understand, interpret, and analyze information, data, or problems. In the context of AI and machine learning, analytical models serve as abstract representations that guide reasoning, decision-making, and problem-solving processes. These models encapsulate prior knowledge, heuristics, and domain-specific rules, enabling both humans and AI systems to process complex information efficiently and to make informed predictions or judgments.

The application of analytical models allows for the systematic decomposition of raw data or unstructured questions into manageable components, facilitating the identification of relevant patterns, relationships, and causal mechanisms. By leveraging established analytical models—such as first principles analysis, systems thinking, mental models or the scientific method—an AI system can adapt its analytical approach to suit the nature of the problem or dataset at hand. This adaptability enhances the system's ability to generate meaningful insights, propose solutions, or recommend actions, even in the face of novel or ambiguous scenarios. Mental models, personal models, expert models, corporate models, and other models based on specific methods for establishing information models are generally referred to as "analytical lenses" within the scope of this application. These analytical lenses can be applied to the narrative structure, the storytelling framework and the behavioral data to provide an analysis mapping as illustrated in FIG. 37. Mappings could be alternatively achieved in different ways, like using heat maps over a workspace.

Furthermore, analytical lenses can be encoded within machine learning architectures or user interfaces to support knowledge transmission and management in addition to stories understanding. For example, a user interface may timelines or narrative flows that reflect underlying analytical lenses, thereby guiding users through complex information spaces in a manner that aligns with human cognitive processes. By integrating analytical lenses into the design and operation of AI systems, it is possible to achieve improved interpretability, user engagement, and overall system performance in tasks involving data analysis, knowledge transmission, and decision support. It is possible to appreciate from Table 3 below that the analytical lenses are separated into three different families further exemplifying how different analytical lens families can be defined. A thorough description and relevant exemplary information are provided in FIG. 38A and FIG. 38B.

TABLE 3

Analytical lenses families

| | Analytical Lenses Families | | |
|---|---|---|---|
| | Weighted elements | Element Sequencing | Human Interpretation/Prism/ Constraints |
| Wizard | Input: Axis | Input: Element Model Selection | Input: Why, what, how? |
| Strategy | An analytical lens has its set of criteria applied to each element (using content + meta) | An analytical lens has its set of criteria applied relatively to a reference element | An analytical lens has its set of dynamic criteria (prompt using content + metadata) |
| Algorithm | Iterate on each element of the axis | Iterate on each element of the axis | Axis Optional |
| Common Logic | Ask model to compute an importance factor between 0 and 100 using the element data + meta considering the strategies<br>(Optional) Filter elements with score too low<br>(Optional) Apply VDF to represent importance | | |

TABLE 3-continued

| Analytical lenses families |
|---|
| (Optional) Sort elements based on their score<br>(Optional) Sort element chronologically |

Figure 39:
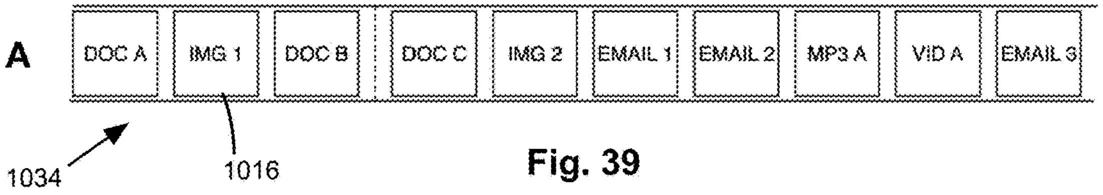
FIG. 39 is an exemplary axis illustrating information elements for supporting an analytical lens application in accordance with an illustrative embodiment of our work.
Figure 40:
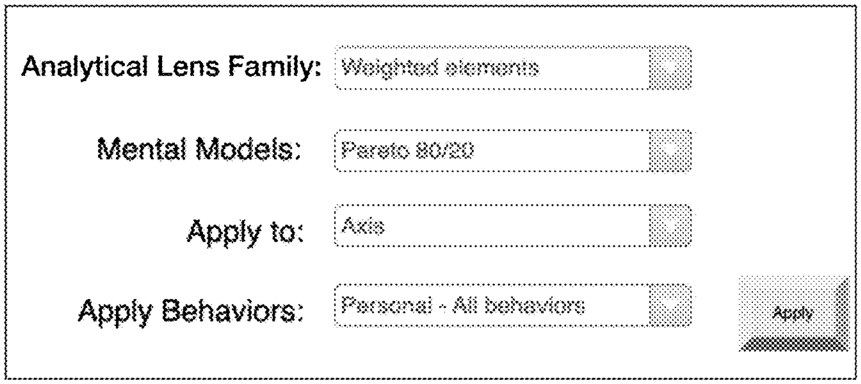
FIG. 40 is an exemplary dialogue illustrating information elements for supporting an analytical lens application in accordance with an illustrative embodiment of our work.
Figure 41:
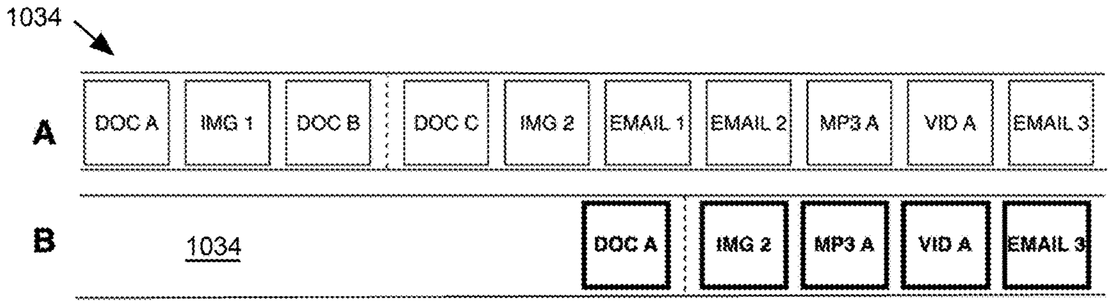
FIG. 41 is an exemplary pair of axes illustrating information elements for supporting an analytical lens application in accordance with an illustrative embodiment of our work.

Referring now to FIG. 39 to FIG. 41 illustrating a first example from the weighted element family using the Pareto 80/20 mental model. FIG. 39 is depicting reference axis A over which the analytical lens is going to be applied. FIG. 40 is illustrating is exemplifying a wizard to select which mental model to apply to axis A. FIG. 41 illustrates axis A and axis B. Axis A is the reference axis, and axis B is a new axis generated on the basis of the results from an applied weighted element model.

Figure 42:
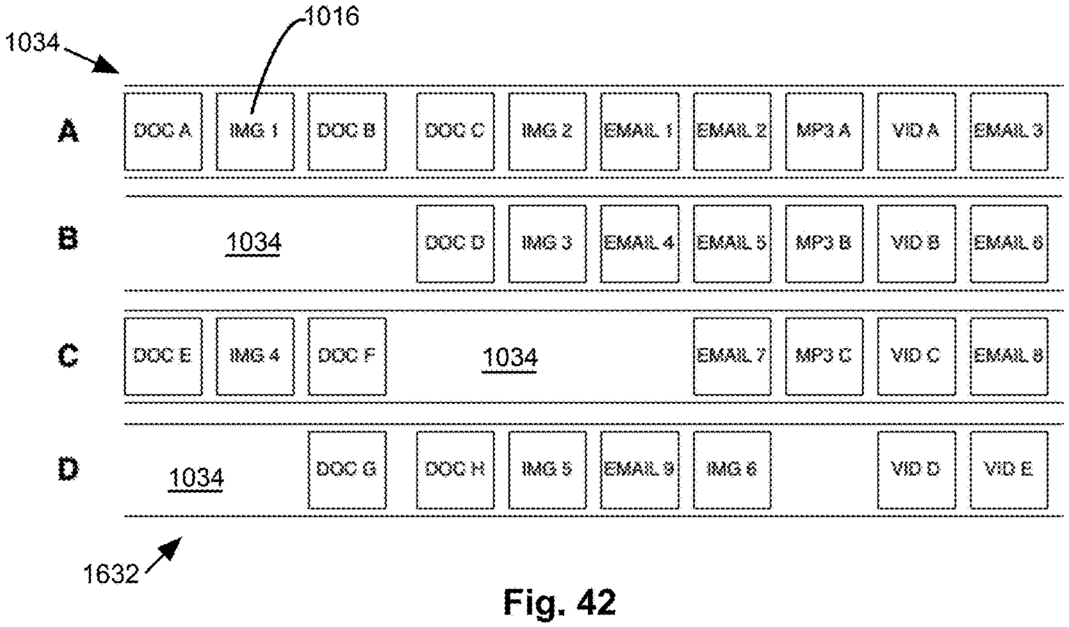
FIG. 42 is an exemplary set of axes illustrating information elements for supporting an analytical lens application in accordance with an illustrative embodiment of our work.
Figure 43:
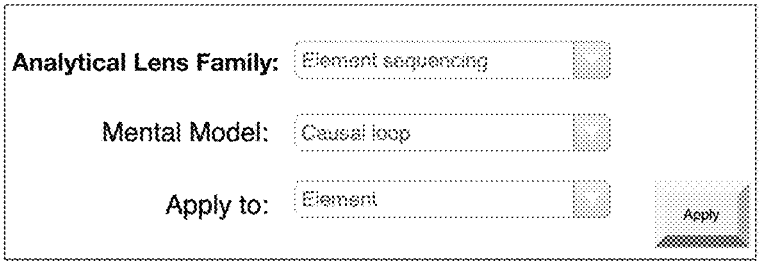
FIG. 43 is an exemplary dialogue illustrating information elements for supporting an analytical lens application in accordance with an illustrative embodiment of our work.
Figure 44:
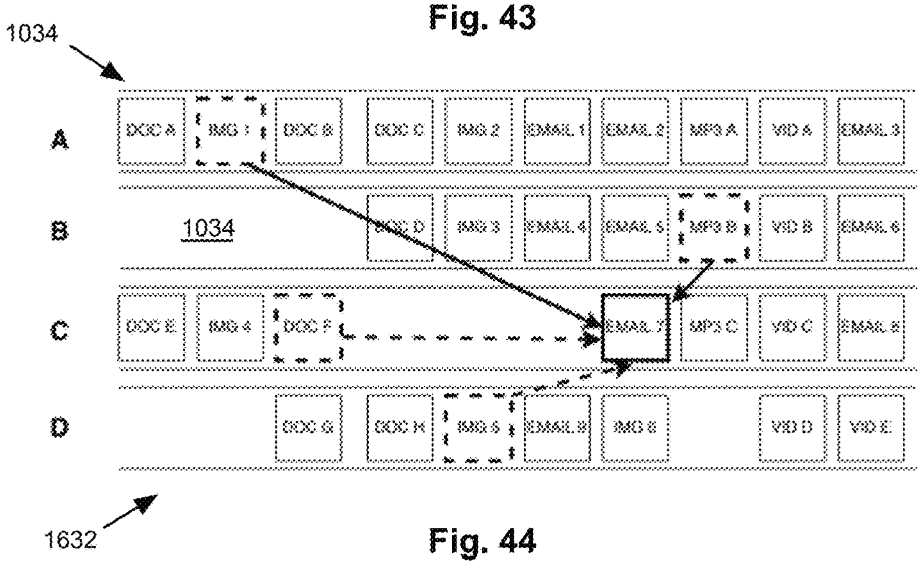
FIG. 44 is an exemplary set of axes illustrating information elements for supporting an analytical lens application in accordance with an illustrative embodiment of our work.
Figure 45:
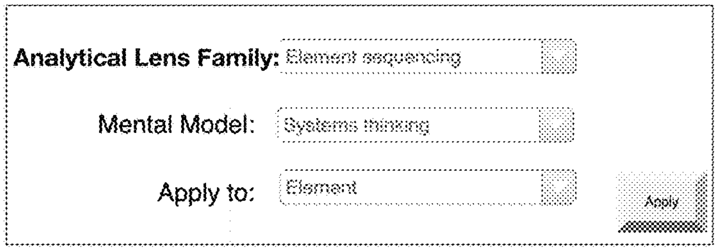
FIG. 45 is an exemplary dialogue illustrating information elements for supporting an analytical lens application in accordance with an illustrative embodiment of our work.
Figure 46:
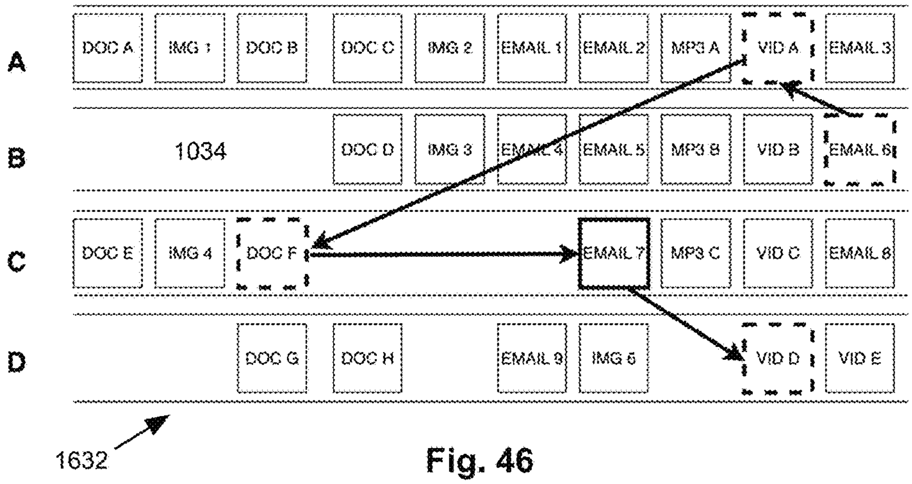
FIG. 46 is an exemplary set of axes illustrating information elements for supporting an analytical lens application in accordance with an illustrative embodiment of our work.
Figure 47:
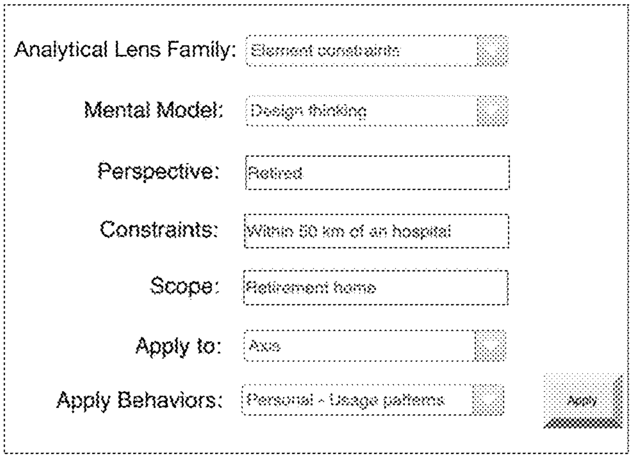
FIG. 47 is an exemplary dialogue illustrating information elements for supporting an analytical lens application in accordance with an illustrative embodiment of our work.
Figure 48:
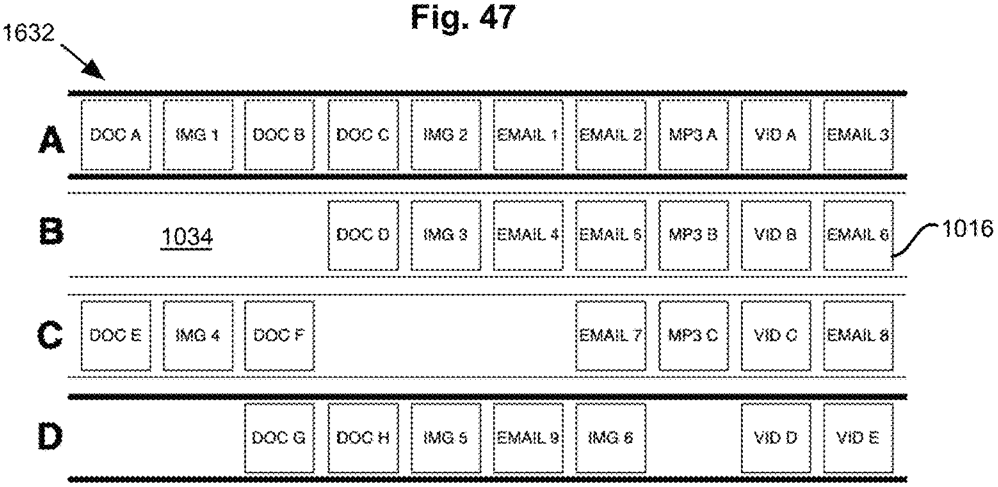
FIG. 48 is an exemplary set of axes illustrating information elements for supporting an analytical lens application in accordance with an illustrative embodiment of our work.

An example using the element sequencing analytical lens is illustrated in FIG. 43 to FIG. 45. A wizard 1632 is illustrating a layout of four axes 1034 in FIG. 42. FIG. 43 is exemplifying a wizard where the element sequencing family is selected with the casual loop analytical lens applied to the information elements 1016. The result suggests email 7 serves as a reference information element. The content of the reference information element is used as a source to identify information elements related thereto, supportive (or alternatively and/or also of close connection, of strong relevance, or of other narrative-based evaluation factor). In the illustrated example of FIG. 44, the arrows in dotted lines represent an unsupportive relationship, whereas the arrow in the solid line indicates a supportive relationship. The arrows could be provided on the workspace using different layers. Still based on the workspace of FIG. 42, using the element sequencing family and the selected systems thinking model from the wizard of FIG. 45 to be applied on the elements 1016. In this other example, email 7 is still the reference information element and its content is used as the source to identify supportive related information elements as exemplified in FIG. 47. Dotted frames indicate information having a supportive relationship.

Figure 49:
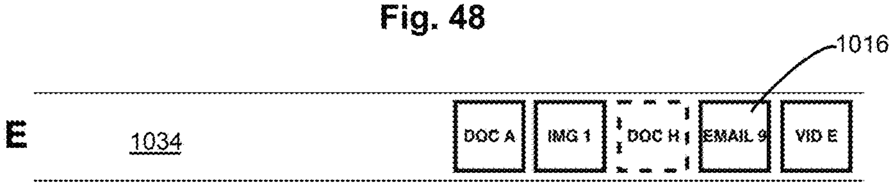
FIG. 49 is an exemplary axis illustrating information elements for supporting an analytical lens application in accordance with an illustrative embodiment of our work.
Figure 50:
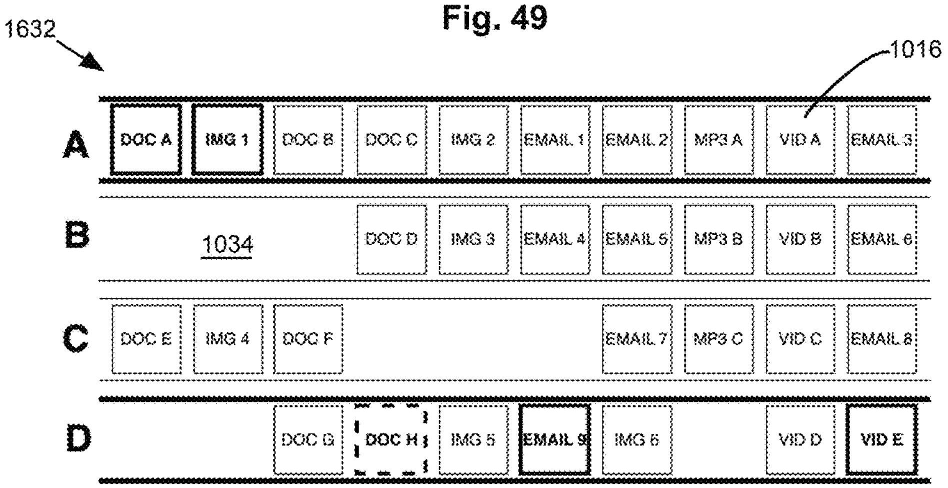
FIG. 50 is an exemplary set of axes illustrating information elements for supporting an analytical lens application in accordance with an illustrative embodiment of our work.

Another example of how to apply an analytical lens for supporting an individual for the selection of a retirement home is illustrated in FIG. 47 to FIG. 50. In this embodiment, the wizard of FIG. 47 keeps the same role as the previous examples and is allowed to choose the "element constraints" analytical lens family with the analytical lens "design thinking", the perspective is made from a person who is "retired", a constraint is applied "within 50 kilometers of a hospital" and the scope analytical lens analysis is to find a "retirement home". This is applied to axes and it could be applied to a specific behavior exemplified as "personal-usage patterns". Axis A and axis D are selected from the workspace 1632 in FIG. 48 and further identified with the bolder axis borders. In one embodiment. FIG. 49 is depicting axis E 1034 displaying the matching results from selected source axes A and D. In this example, document A is a contract, image 1 is a floor plan, document H is an addendum providing further information regarding the retirement home, email 9 is a communication between two parties, and video E is showing the actual retirement home property. Document H is identified with a dotted border Stressing there's a time-sensitive issue with this document. In a second embodiment illustrated in FIG. 50, the same original layout presented in FIG. 48 it is used as the template for illustrating the results of the analytical lens analysis. One can appreciate the same results are identified in the workspace of FIG. 50, including the results that have been isolated on axis E in the previous embodiment.

The narrative structure can be used to model empirical knowledge required for achieving a desired result as a consequence of specific knowledge rendered with state of the art competencies. A professional template, a personal template, even a corporate template is a contextual analytical construct generated from an information insertion, consultation, interactions, decisions, and workflow patterns within normal work process. These templates are layered over a narrative structure to model the narrative structure after a specific competence. This is a way to transfer practical knowledge by mapping an activity and translate that activity in a reusable template leading a user with a practical model to follow. The templates are applied to the narrative structure creating an intuitive story. As the user navigates the narrative structure selecting timeline segments, invoking tools, and opening or annotating artifacts, the system captures ordered events, dependencies, preferences, and contextual actions. The resulting template is encoded as mappings between narrative arcs, timeline segments, and artifacts, with associated conditions, constraints, and recommended sequences that reflect the user's evolving expertise along activity progression. Provenance is maintained so each evolution of the template is versioned, auditable, and attributable to its source interactions.

Construction occurs in situ as the user works: the system records step ordering, branching points, preconditions and outcomes, artifact usage, and timing across the timeline. These observations are bound to themes and attributes already present in the narrative, yielding a template that is both human-comprehensible and machine-actionable. The template is continuously refined through feedback loops—accepting, skipping, or reordering suggestions; adding or replacing artifacts; confirming outcomes—which update its mappings and confidence levels without disrupting the active narrative.

Sharing and governance are handled through the same narrative structure. A professional template can be retained privately as a personal template, published to a team or workspace, or made available to the broader organization subject to permissions and redaction policies. When shared, the template retains its provenance, scope, and applicability conditions, and may be templated into a reusable narrative arc with linked artifacts and recommended timeline segments. Collaborative improvements are tracked as new versions so that local adaptations can be merged or branched without loss of lineage.

Application and reuse occur when the system detects similar conditions in a new narrative—based on role, task intent, artifact, metadata, commonalities, timelines, and contextual circumstances. The corresponding professional template is proposed to the user as an adaptive guide: pre-populating timeline segments, recommending artifact sequences, surfacing relevant milestones, and highlighting likely decision points. As the new user proceeds, the system personalizes the template to their context and actions, capturing divergences as refinements. Over time, templates converge into robust patterns that accelerate onboarding, ensure consistency with best practices, and improve outcomes while remaining aligned with the narrative structure, timelines, and artifacts. It is also a means for transferring knowledge in a structured manner.

Example: an electrician completes a multi-panel service upgrade. The system records the verified sequence across the timeline—site assessment, lockout/tagout, feeder verification, panel mapping, conduit routing, inspections—and links each step to the artifacts actually used (i.e., schematics, permits, torque specs, photos . . . ) and the conditions under which the sequence succeeded. This professional template can be shared to the team. When another electrician starts a comparable upgrade, the system recognizes matching conditions and applies the templates to preassemble a task-specific narrative arc, compare to the model, recommend the artifact set, and lay out expected timeline segments with checkpoints. As the second electrician adapts steps to a different building code or layout, those adjustments are captured with provenance, updating the template for future reuse.

The present description emphasizes using AI upstream from a graphical interface, comprising e.g., identifying a narrative to be generated, identifying content of the narrative, selecting parameters of the narrative and storytelling such as participants, events, level of abstraction and pace. The present disclosure emphasizes furthermore on usage of AI in enriching artifacts through a storytelling perspective and witnessed behaviors in relation with the storytelling. The present disclosure emphasizes monitoring and collecting artifacts enrichment and behaviors of users in relation with the storytelling, aka contextualized artifacts and behaviors, allowing continual teaching of AI models and hence continual improvements of storytelling. The present disclosure finally emphasizes on the building and collecting contextualized datasets from contextualized artifacts and behaviors, and use of contextualized datasets as datasets used to train AI models, whether or not these AI models applying storytelling processes. The present disclosures further emphasizes on participation of AI Agents in providing the graphical interface, for instance selecting axes that may fit to the storytelling, and predict actions in the graphical interface to ease use, and propose complementary tools, such as external AI agents that is determines to fit to the short-term objectives of the user associated with the story telling. Finally, the present disclosure emphasizes on communicating storytelling to users, either through a graphical interface or through another communication means, in order to minimize the interpretation gap, thus maximize knowledge comprehension and retention by the user.

Following is an example of use of the technology of the present description. The following embodiment is for illustrative purposes only and is not intended to be limiting in terms of elements and combinations thereof: A medical case management system is described, wherein a plurality of heterogeneous medical documents is ingested, classified, curated, tokenized and organized along a patient-centric timeline, forming a dynamic narrative structure accessible via a graphical user interface (GUI). Upon initiation, the system receives a set of medical documents associated with a patient, such as laboratory reports, radiology images, physician notes, and discharge summaries. Each document is automatically classified using a machine learning-based classifier, which assigns a document type (e.g., "Lab Result", "Imaging Report", "Clinical Note") and associates relevant metadata, such as date, author, patient name, hospital location, and medical specialty. The classified documents are then subjected to a curation process. This process may include automated validation of document integrity, removal of duplicates, data anonymization and privacy, extraction of key medical entities (e.g., diagnoses, medications, procedures) using natural language processing, labeling and annotation and correction of detected errors or inconsistencies. The curation module may further enrich documents by linking referenced medical concepts to standardized ontologies (e.g., SNOMED CT, LOINC).

In the context of preparing information elements for advanced processing, such as tokenization and model training, a comprehensive curation pipeline could be implemented to ensure the quality, consistency, and utility of the underlying data. The curation process commences with the collection of data from a plurality of sources. The provenance of each data item is recorded, and appropriate permissions and compliance with applicable data protection regulations are verified. Subsequently, the collected data undergoes a cleaning and preprocessing phase. This phase encompasses the removal of duplicate, corrupted, or irrelevant entries, the standardization of data formats (including encoding and file types), and the handling of missing or incomplete values through imputation, removal, or explicit flagging. Noise and extraneous content are filtered out to enhance the signal-to-noise ratio of the dataset. Where applicable, data normalization procedures are applied to ensure uniformity across the dataset.

For supervised learning applications, the next step could involve the annotation and labeling of data. Annotation may be performed manually by domain experts, semi-automatically using heuristic or pre-trained models, or through a combination thereof. Quality control mechanisms, such as inter-annotator agreement checks and consensus validation, are employed to ensure the reliability and reproducibility of the labels. The annotation process is documented in detail, including the criteria and tools used, to facilitate traceability and future audits.

The curated and annotated data could then be structured and formatted for downstream processing. This includes the partitioning of the dataset into training, validation, and test subsets, with careful consideration given to stratification and representativeness. Data is organized into standardized file formats (such as CSV, JSON, or other domain-appropriate structures), and comprehensive metadata is generated to capture labels, source information, and the history of preprocessing steps. Versioning and traceability are ideally maintained throughout to support reproducibility and regulatory compliance.

In preparation for tokenization, additional preprocessing steps are applied to textual or sequential data. These steps may include text normalization (such as lowercasing, stemming, lemmatization, and punctuation removal), vocabulary construction at the word, subword, or character level, and the handling of special tokens required by the model architecture. Encoding schemes are applied to map tokens to numerical representations suitable for model ingestion. Where novel tokenization or preprocessing techniques are employed, these are described in detail as part of the technical solution. Tokenization of other types of content is also encompassed by the present application.

Optionally, data augmentation techniques may be utilized to enhance the diversity and robustness of the dataset. Such techniques may include the generation of synthetic data, the application of transformations (such as image rotation or text paraphrasing), and the balancing of class distributions through oversampling or undersampling. The final step in the curation pipeline involves the packaging of data into files or databases optimized for efficient access, the application of integrity checks, and the documentation of the entire data pipeline, including flowcharts and timelines where appropriate, to facilitate reproducibility and auditability.

Curated documents are disposed along a timeline within the narrative structure. The system determines the temporal position of each document based on its associated timestamp and contextual relevance to the patient's medical journey. The narrative structure can be dynamically constructed, allowing for the insertion, removal, or reordering of documents as new information becomes available or as the user interacts with the system. The graphical user interface presents the narrative timeline in a format adapted to the user (e.g. a clinician, a nurse, the patient), enabling intuitive navigation through the patient's medical history. The user may interact with the timeline by selecting documents, expanding narrative segments, annotating events, or filtering by document type, practitioner or medical concept. Each interaction is logged by the system, capturing behavioral data such as click events, dwell time on specific documents, annotation content and navigation paths. The system can continuously gather and analyze behavioral and contextual data from user interactions. For example, if a clinician repeatedly reviews a particular imaging report before making a diagnosis annotation, the system records this sequence, associating the behavioral pattern with the corresponding narrative segment. Contextual data, such as the clinical setting (e.g., emergency, outpatient), user role, and device type, are also captured.

Extracted behavioral and contextual data are curated and integrated into the narrative structure. The system may use this data to adapt the interface (e.g., highlighting frequently accessed documents, suggesting relevant prior cases) or to generate analytics for quality assurance and workflow optimization. In some embodiments, the curated behavioral data is used to train or refine machine learning models for predictive analytics or decision support. Throughout the process, the system ensures compliance with data privacy and security regulations, maintaining audit trails and access controls as required by medical standards.

The description and the drawings that are presented above are meant to be illustrative of the present invention. They are not meant to be limiting of the scope of the present invention. Modifications to the embodiments described may be made without departing from the present invention, the scope of which is defined by the following claims:

What is claimed is:

1. A non-transitory computer readable medium storing instructions that, when executed by a processor of a computer system, cause the processor to perform operations comprising:

(a) generating, within a graphical user interface, a dynamic narrative data structure that organizes a plurality of artifacts, the dynamic narrative data structure being adapted to provide (i) one or more timelines along which the plurality of artifacts are collated on a basis of a collation function by the computer system, the collated artifacts are disposed on the one or more timelines with respective artifacts temporal references; and (ii) graphical relational linkages adapted to reflect temporal relationships between the plurality of artifacts along the one or more timelines;

(b) associating at least some of the plurality of artifacts with attributes and displaying the plurality of artifacts in a graphical layout using the dynamic narrative data structure, the graphical layout being adapted to dynamically respond to collaborator interactions and to display constraints to provide an interactive representation of the timelines and of the graphical relational linkages;

(c) monitoring, by the computer system, (i) collaborator artifact interactions with respect to the plurality of artifacts to capture collaborator artifacts interaction data in association with respective artifacts temporal references, and (ii) collaborator navigation behaviors among the one or more timelines to capture collaborator navigation behavioral data, from collaborator interaction with the dynamic narrative data structure, associated with respective collaborator navigation behavioral temporal references following the collaborator navigation behavioral among the one or more timelines;

(d) generating, by the computer system, contextual collaborator behavioral data based at least in part on the collaborator artifacts interaction data and the collaborator navigation behavioral data within the dynamic narrative data structure; and (e) storing the contextual collaborator behavioral data in a data repository.

2. The non-transitory computer readable medium of claim 1, wherein the processor is further adapted to perform displaying an additional timeline adapted to display artifacts on the basis of metadata associated to the contextual collaborator behavioral data.

3. The non-transitory computer readable medium of claim 1, wherein the dynamic narrative data structure comprises an axis-based graphical layout adapted to represent at least some of the plurality of artifacts along the one or more timelines.

4. The non-transitory computer readable medium of claim 1, wherein the processor is further adapted to perform curating, by the computer system, at least some of the contextual collaborator behavioral data, wherein the curated contextual collaborator behavioral data are adapted to provide structured behavioral data training sets.

5. The non-transitory computer readable medium of claim 1, wherein the processor is further adapted to perform processing the captured contextual collaborator behavioral data using an AI-driven machine learning model adapted to analyze contextual cues on a basis of the collaborator artifacts interactions data and the collaborator navigation behavioral data to generate narrative contextual behavioral metadata on a basis of collaborator engagement with the artifacts and workflow dynamics among the timelines.

6. The non-transitory computer readable medium of claim 1, wherein the contextual collaborator behavioral data provides narrative-based collaborator behavioral context to at least some of the plurality of artifacts.

7. The non-transitory computer readable medium of claim 1, wherein the processor is further adapted to perform tokenizing, by the computer system, at least some of the plurality of artifacts and at least some of the contextual collaborator behavioral data into a collection of discrete, manageable, and identifiable units.

8. The non-transitory computer readable medium of claim 1, wherein the processor is further adapted to perform training, by the computer system, an AI model using the contextual collaborator behavioral data, the training comprises using structured collaborator behavioral data training sets for a transformer-based neural network, such that the AI model is adapted to process the contextual collaborator behavioral data.

9. The non-transitory computer readable medium of claim 1, wherein at least some of the plurality of artifacts and at least one timeline are used in conjunction with an analytical lens to model artifacts in conjunction with the contextual collaborator behavioral data within the dynamic narrative data structure.

10. The non-transitory computer readable medium of claim 1, wherein the processor is further adapted to perform graphically adapting the dynamic narrative data structure by managing at least some of the plurality of artifacts in the dynamic narrative data structure and modifying display parameters of at least some of the plurality of artifacts in response to the contextual collaborator behavioral data, thereby enhancing information retrieval and collaborative workflow efficiency.

11. A method of providing contextual collaborator behavioral data, the method comprising:

(a) generating, within a graphical user interface, a dynamic narrative data structure that organizes a plurality of artifacts, the dynamic narrative data structure being adapted to provide (i) one or more timelines along which the plurality of artifacts are collated on a basis of a collation function by the computer system, the collated artifacts are disposed on the one or more timelines with respective artifacts temporal references; and (ii) graphical relational linkages adapted to reflect temporal relationships between the plurality of artifacts along the one or more timelines;

(b) associating at least some of the plurality of artifacts with attributes and displaying the plurality of artifacts in a graphical layout using the dynamic narrative data structure, the graphical layout being adapted to dynamically respond to collaborator interactions and to display constraints to provide an interactive representation of the timelines and of the graphical relational linkages;

(c) monitoring, by the computer system, (i) collaborator artifact interactions with respect to the plurality of artifacts to capture collaborator artifacts interaction data in association with respective artifacts temporal references, and (ii) collaborator navigation behaviors among the one or more timelines to capture collaborator navigation behavioral, from collaborator interaction with the dynamic narrative data structure, data associated with respective collaborator navigation behavioral temporal references following the collaborator navigation behaviors among the one or more timelines;

(d) generating, by the computer system, contextual collaborator behavioral data based at least in part on the collaborator artifacts interaction data and the collaborator navigation behavioral data within the dynamic narrative data structure; and (e) storing the contextual collaborator behavioral data in a data repository.

12. The method of claim 11, wherein the processor is further adapted to perform displaying an additional timeline adapted to display artifacts on the basis of metadata associated to the contextual collaborator behavioral data.

13. The method of claim 11, wherein the dynamic narrative data structure comprises an axis-based graphical layout adapted to represent at least some of the plurality of artifacts along the one or more timelines.

14. The method of claim 11, wherein the processor is further adapted to perform curating, by the computer system, at least some of the contextual collaborator behavioral data, wherein the curated contextual collaborator behavioral data are adapted to provide structured behavioral data training sets.

15. The method of claim 11, wherein the processor is further adapted to perform processing the captured contextual collaborator behavioral data using an AI-driven machine learning model adapted to analyze contextual cues on a basis of the collaborator artifacts interactions data and the collaborator navigation behavioral data to generate narrative contextual behavioral metadata on a basis of collaborator engagement with the artifacts and workflow dynamics among the timelines.

16. The method of claim 11, wherein the contextual collaborator behavioral data provides narrative-based collaborator behavioral context to at least some of the plurality of artifacts.

17. The method of claim 11, wherein the processor is further adapted to perform tokenizing, by the computer system, at least some of the plurality of artifacts and at least some of the contextual collaborator behavioral data into a collection of discrete, manageable, and identifiable units.

18. The method of claim 11, wherein the processor is further adapted to perform training, by the computer system, an AI model using the contextual collaborator behavioral data, the training comprises using structured collaborator behavioral data training sets for a transformer-based neural network, such that the AI model is adapted to process the contextual collaborator behavioral data.

19. The method of claim 11, wherein at least some of the plurality of artifacts and at least one timeline are used in conjunction with an analytical lens to model artifacts in conjunction with the contextual collaborator behavioral data within the dynamic narrative data structure.

20. The method of claim 11, wherein the processor is further adapted to perform graphically adapting the dynamic narrative data structure by managing at least some of the plurality of artifacts in the dynamic narrative data structure and modifying display parameters of at least some of the plurality of artifacts in response to the contextual collaborator behavioral data, thereby enhancing information retrieval and collaborative workflow efficiency.

* * * * *